(12) United States Patent
Parker et al.

(10) Patent No.: US 9,598,802 B2
(45) Date of Patent: *Mar. 21, 2017

(54) ULTRAFILTRATION PROCESS FOR PRODUCING A SULFOPOLYESTER CONCENTRATE

(71) Applicant: Eastman Chemical Company, Kingsport, TN (US)

(72) Inventors: Kenny Randolph Parker, Afton, TN (US); Shane Kipley Kirk, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 399 days.

This patent is subject to a terminal disclaimer.

(21) Appl. No.: 14/108,389

(22) Filed: Dec. 17, 2013

(65) Prior Publication Data
US 2015/0166723 A1 Jun. 18, 2015

(51) Int. Cl.
B01D 12/00 (2006.01)
D04H 1/435 (2012.01)

(52) U.S. Cl.
CPC .................. D04H 1/435 (2013.01)

(58) Field of Classification Search
USPC .......................................... 162/146; 210/774
See application file for complete search history.

(56) References Cited

U.S. PATENT DOCUMENTS

| 1,814,155 | A | 7/1931 | Haughey |
| 2,862,251 | A | 12/1958 | Kalwaites |
| 2,999,788 | A | 9/1961 | Morgan |
| 3,018,272 | A | 1/1962 | Griffing et al. |
| 3,033,822 | A | 5/1962 | Kibler et al. |
| 3,049,469 | A | 8/1962 | Davison et al. |
| 3,075,952 | A | 1/1963 | Coover et al. |
| 3,372,084 | A | 3/1968 | Hanns |
| 3,485,706 | A | 12/1969 | Evans |
| 3,528,947 | A | 9/1970 | Lappin et al. |
| 3,556,932 | A | 1/1971 | Coscia et al. |
| 3,592,796 | A | 7/1971 | Trapasso et al. |

(Continued)

FOREIGN PATENT DOCUMENTS

| CA | 1290517 | 10/1991 |
| CN | 1824867 A | 8/2006 |

(Continued)

OTHER PUBLICATIONS

USPTO Office Action dated May 8, 2014 for copending U.S. Appl. No. 13/273,692.

(Continued)

Primary Examiner — Jacob Thomas Minskey
(74) Attorney, Agent, or Firm — Polly C. Owen

(57) ABSTRACT

A process for recovering a primary polymer concentrate stream is provided. The process comprises routing a second mother liquor stream to a primary concentration zone to remove water from the second mother liquor stream to produce the primary polymer concentrate stream; wherein the primary concentration zone comprises at least one ultrafiltration membrane. A process is also provided to recover sulfopolyester from the primary polymer concentrate stream and to produce articles therefrom.

20 Claims, 13 Drawing Sheets

(56) References Cited

U.S. PATENT DOCUMENTS

| | | |
|---|---|---|
| 3,772,076 A | 11/1973 | Keim |
| 3,779,993 A | 12/1973 | Kibler et al. |
| 3,783,093 A | 1/1974 | Gallacher et al. |
| 3,803,210 A | 4/1974 | Rod et al. |
| 3,833,457 A | 9/1974 | Misumi et al. |
| 3,846,507 A | 11/1974 | Thomm et al. |
| 3,985,502 A | 10/1976 | Boorujy et al. |
| 3,998,740 A | 12/1976 | Bost et al. |
| 4,008,344 A | 2/1977 | Okamoto et al. |
| 4,073,777 A | 2/1978 | O'Neill et al. |
| 4,073,988 A | 2/1978 | Nishida et al. |
| 4,100,324 A | 7/1978 | Anderson et al. |
| 4,104,262 A | 8/1978 | Schade |
| 4,121,966 A | 10/1978 | Amano et al. |
| 4,127,696 A | 11/1978 | Okamoto |
| 4,137,393 A | 1/1979 | Sidebotham et al. |
| 4,145,469 A | 3/1979 | Newkirk et al. |
| 4,226,672 A | 10/1980 | Absolon et al. |
| 4,233,355 A | 11/1980 | Sato et al. |
| 4,234,652 A | 11/1980 | Vanoni et al. |
| 4,239,720 A | 12/1980 | Gerlach et al. |
| 4,240,918 A | 12/1980 | Lagasse et al. |
| 4,243,480 A | 1/1981 | Hernandez et al. |
| 4,288,503 A | 9/1981 | Goldberg |
| 4,297,412 A | 10/1981 | Achard et al. |
| 4,299,654 A | 11/1981 | Tlach et al. |
| 4,302,495 A | 11/1981 | Marra |
| 4,304,901 A | 12/1981 | O'Neill et al. |
| 4,342,801 A | 8/1982 | Gerlach et al. |
| 4,350,006 A | 9/1982 | Okamoto et al. |
| 4,365,041 A | 12/1982 | Okamoto et al. |
| 4,381,335 A | 4/1983 | Okamoto |
| 4,410,579 A | 10/1983 | Johns |
| 4,427,557 A | 1/1984 | Stockburger |
| 4,460,649 A | 7/1984 | Park et al. |
| 4,480,085 A | 10/1984 | Larson |
| 4,496,619 A | 1/1985 | Okamoto |
| 4,517,715 A | 5/1985 | Yoshida et al. |
| 4,569,343 A | 2/1986 | Kimura et al. |
| 4,618,524 A | 10/1986 | Groitzsch et al. |
| 4,647,497 A | 3/1987 | Weeks |
| 4,652,341 A | 3/1987 | Prior |
| 4,699,845 A | 10/1987 | Oikawa et al. |
| 4,710,432 A | 12/1987 | Nishimura et al. |
| 4,738,785 A | 4/1988 | Langston et al. |
| 4,755,421 A | 7/1988 | Manning et al. |
| 4,795,668 A | 1/1989 | Krueger et al. |
| 4,804,719 A | 2/1989 | Weaver et al. |
| 4,810,775 A | 3/1989 | Bendix et al. |
| 4,863,785 A | 9/1989 | Berman et al. |
| 4,873,273 A | 10/1989 | Allan et al. |
| 4,910,292 A | 3/1990 | Blount |
| 4,921,899 A | 5/1990 | Phan et al. |
| 4,940,744 A | 7/1990 | Tortorici et al. |
| 4,943,477 A | 7/1990 | Kanamura et al. |
| 4,946,932 A | 8/1990 | Jenkins |
| 4,966,808 A | 10/1990 | Kawano |
| 4,973,656 A | 11/1990 | Blount |
| 4,990,593 A | 2/1991 | Blount |
| 4,996,252 A | 2/1991 | Phan et al. |
| 5,006,598 A | 4/1991 | Adams et al. |
| 5,039,339 A | 8/1991 | Phan et al. |
| 5,057,368 A | 10/1991 | Largman et al. |
| 5,069,970 A | 12/1991 | Largman et al. |
| 5,073,436 A | 12/1991 | Antonacci et al. |
| 5,108,820 A | 4/1992 | Kaneko et al. |
| 5,124,194 A | 6/1992 | Kawano |
| 5,158,844 A | 10/1992 | Hagens et al. |
| 5,162,074 A | 11/1992 | Hills |
| 5,162,399 A | 11/1992 | Sharma et al. |
| 5,171,767 A | 12/1992 | Buckley et al. |
| 5,176,952 A | 1/1993 | Joseph et al. |
| 5,218,042 A | 6/1993 | Kuo et al. |
| 5,242,640 A | 9/1993 | Butler et al. |
| 5,254,399 A | 10/1993 | Oku et al. |
| 5,258,220 A | 11/1993 | Joseph |
| 5,262,460 A | 11/1993 | Suzuki et al. |
| 5,274,025 A | 12/1993 | Stockl et al. |
| 5,277,976 A | 1/1994 | Hogle et al. |
| 5,281,306 A | 1/1994 | Kakiuchi et al. |
| 5,286,843 A | 2/1994 | Wood |
| 5,290,626 A | 3/1994 | Nishioi et al. |
| 5,290,631 A | 3/1994 | Fleury et al. |
| 5,290,654 A | 3/1994 | Sacripante et al. |
| 5,292,075 A * | 3/1994 | Bartlett .................. B03B 9/061 241/20 |
| 5,292,581 A | 3/1994 | Viazmensky et al. |
| 5,292,855 A | 3/1994 | Krutak et al. |
| 5,296,286 A | 3/1994 | Allen et al. |
| 5,308,697 A | 5/1994 | Muramoto et al. |
| 5,336,552 A | 8/1994 | Strack et al. |
| 5,338,406 A | 8/1994 | Smith |
| 5,342,863 A | 8/1994 | Buckley et al. |
| 5,366,804 A | 11/1994 | Dugan |
| 5,368,928 A | 11/1994 | Okamura et al. |
| 5,369,210 A | 11/1994 | George et al. |
| 5,369,211 A | 11/1994 | George et al. |
| 5,374,357 A | 12/1994 | Comstock et al. |
| 5,375,306 A | 12/1994 | Roussin-Moynier |
| 5,378,757 A | 1/1995 | Blount, Jr. et al. |
| 5,382,400 A | 1/1995 | Pike et al. |
| 5,386,003 A | 1/1995 | Greene et al. |
| 5,389,068 A | 2/1995 | Keck |
| 5,395,693 A | 3/1995 | Cho et al. |
| 5,405,698 A | 4/1995 | Dugan |
| 5,416,156 A | 5/1995 | Kamen |
| 5,423,432 A | 6/1995 | Krutak et al. |
| 5,431,994 A | 7/1995 | Kozulla |
| 5,446,079 A | 8/1995 | Buchanan et al. |
| 5,449,464 A | 9/1995 | El-Shall |
| 5,456,982 A | 10/1995 | Hansen et al. |
| 5,466,410 A | 11/1995 | Hills |
| 5,466,518 A | 11/1995 | Isaac et al. |
| 5,468,536 A | 11/1995 | Whitcomb et al. |
| 5,472,600 A | 12/1995 | Ellefson et al. |
| 5,482,772 A | 1/1996 | Strack et al. |
| 5,486,418 A | 1/1996 | Ohmory et al. |
| 5,496,627 A | 3/1996 | Bagrodia et al. |
| 5,498,468 A | 3/1996 | Blaney |
| 5,502,091 A | 3/1996 | Dasgupta |
| 5,508,101 A | 4/1996 | Patnode et al. |
| 5,509,913 A | 4/1996 | Yeo |
| 5,525,282 A | 6/1996 | Dugan |
| 5,530,059 A | 6/1996 | Blount, Jr. et al. |
| 5,536,811 A | 7/1996 | Wood |
| 5,543,488 A | 8/1996 | Miller et al. |
| 5,545,464 A | 8/1996 | Stokes |
| 5,545,481 A | 8/1996 | Harrington |
| 5,552,495 A | 9/1996 | Miller et al. |
| 5,559,171 A | 9/1996 | Buchanan et al. |
| 5,559,205 A | 9/1996 | Hansen et al. |
| 5,567,510 A | 10/1996 | Patnode et al. |
| 5,571,620 A | 11/1996 | George et al. |
| 5,575,918 A | 11/1996 | Virnig et al. |
| 5,580,911 A | 12/1996 | Buchanan et al. |
| 5,593,778 A | 1/1997 | Kondo et al. |
| 5,593,807 A | 1/1997 | Sacripante et al. |
| 5,599,858 A | 2/1997 | Buchanan et al. |
| 5,605,746 A | 2/1997 | Groeger et al. |
| 5,607,491 A | 3/1997 | Jackson et al. |
| 5,607,765 A | 3/1997 | Hansen et al. |
| 5,620,785 A | 4/1997 | Watt et al. |
| 5,630,972 A | 5/1997 | Patnode et al. |
| 5,635,071 A | 6/1997 | Al-Samadi |
| 5,637,385 A | 6/1997 | Mizuki et al. |
| 5,643,662 A | 7/1997 | Yeo et al. |
| 5,646,237 A | 7/1997 | George et al. |
| 5,652,048 A | 7/1997 | Haynes et al. |
| 5,654,086 A | 8/1997 | Nishijima et al. |
| 5,658,704 A | 8/1997 | Patel et al. |
| 5,660,965 A | 8/1997 | Mychajlowskij et al. |
| 5,672,415 A | 9/1997 | Sawyer et al. |
| 5,688,582 A | 11/1997 | Nagaoka et al. |
| 5,698,331 A | 12/1997 | Matsumura et al. |

(56) References Cited

U.S. PATENT DOCUMENTS

| | | |
|---|---|---|
| 5,709,940 A | 1/1998 | George et al. |
| 5,736,083 A | 4/1998 | Dugan |
| 5,750,605 A | 5/1998 | Blumenthal et al. |
| 5,753,351 A | 5/1998 | Yoshida et al. |
| 5,759,926 A | 6/1998 | Pike et al. |
| 5,762,758 A | 6/1998 | Hoffman |
| 5,763,065 A | 6/1998 | Patnode et al. |
| 5,779,736 A | 7/1998 | Frederick et al. |
| 5,783,503 A | 7/1998 | Gillespie et al. |
| 5,785,725 A | 7/1998 | Cusick et al. |
| 5,798,078 A | 8/1998 | Myers |
| 5,817,740 A | 10/1998 | Anderson et al. |
| 5,820,982 A | 10/1998 | Salsman |
| 5,837,658 A | 11/1998 | Stork |
| 5,843,311 A | 12/1998 | Richter et al. |
| 5,853,701 A | 12/1998 | George et al. |
| 5,853,944 A | 12/1998 | Foucher et al. |
| 5,871,845 A | 2/1999 | Dahringer et al. |
| 5,883,181 A | 3/1999 | Cicchiello et al. |
| 5,888,916 A | 3/1999 | Tadokoro et al. |
| 5,895,710 A | 4/1999 | Sasse et al. |
| 5,916,678 A | 6/1999 | Jackson et al. |
| 5,916,687 A | 6/1999 | Takanashi et al. |
| 5,916,725 A | 6/1999 | Patel et al. |
| 5,916,935 A | 6/1999 | Wiggins et al. |
| 5,935,880 A | 8/1999 | Wang et al. |
| 5,935,883 A | 8/1999 | Pike |
| 5,935,884 A | 8/1999 | Williams et al. |
| 5,948,710 A | 9/1999 | Pomplun et al. |
| 5,952,251 A | 9/1999 | Jackson et al. |
| 5,954,967 A | 9/1999 | Egraz et al. |
| 5,970,583 A | 10/1999 | Groten et al. |
| 5,976,694 A | 11/1999 | Tsai et al. |
| 5,993,668 A | 11/1999 | Duan |
| 5,993,834 A | 11/1999 | Shah et al. |
| 6,004,673 A | 12/1999 | Nishijima |
| 6,007,910 A | 12/1999 | Miller et al. |
| 6,020,420 A | 2/2000 | George |
| 6,037,055 A | 3/2000 | Aneja et al. |
| 6,057,388 A | 5/2000 | Wiggins et al. |
| 6,080,471 A | 6/2000 | Shigematsu et al. |
| 6,090,731 A | 7/2000 | Pike et al. |
| 6,110,249 A | 8/2000 | Medcalf et al. |
| 6,110,588 A | 8/2000 | Perez et al. |
| 6,110,636 A | 8/2000 | Foucher et al. |
| 6,114,407 A | 9/2000 | Myers |
| 6,120,889 A | 9/2000 | Turner et al. |
| 6,121,170 A | 9/2000 | Tsai et al. |
| 6,162,340 A | 12/2000 | Zakikhani |
| 6,162,890 A | 12/2000 | George et al. |
| 6,168,719 B1 | 1/2001 | Shimokawa et al. |
| 6,171,685 B1 | 1/2001 | George et al. |
| 6,174,602 B1 | 1/2001 | Matsui et al. |
| 6,177,193 B1 | 1/2001 | Tsai et al. |
| 6,177,607 B1 | 1/2001 | Blaney et al. |
| 6,183,648 B1 | 2/2001 | Kozak et al. |
| 6,194,517 B1 | 2/2001 | Pomplun et al. |
| 6,200,669 B1 | 3/2001 | Marmon et al. |
| 6,211,309 B1 | 4/2001 | McIntosh et al. |
| 6,218,321 B1 | 4/2001 | Lorcks et al. |
| 6,225,243 B1 | 5/2001 | Austin |
| 6,235,392 B1 | 5/2001 | Luo et al. |
| 6,248,809 B1 | 6/2001 | Buckley et al. |
| 6,294,645 B1 | 9/2001 | Allen et al. |
| 6,296,933 B1 | 10/2001 | Goda et al. |
| 6,300,306 B1 | 10/2001 | Firkins et al. |
| 6,316,592 B1 | 11/2001 | Bates et al. |
| 6,322,887 B1 | 11/2001 | Matsui et al. |
| 6,331,606 B1 | 12/2001 | Sun |
| 6,332,994 B1 | 12/2001 | Karageorgiou |
| 6,335,092 B1 | 1/2002 | Takeda et al. |
| 6,348,679 B1 | 2/2002 | Ryan et al. |
| 6,352,948 B1 | 3/2002 | Pike et al. |
| 6,355,137 B1 | 3/2002 | Staib |
| 6,361,784 B1 | 3/2002 | Brennan et al. |
| 6,365,697 B1 | 4/2002 | Kim et al. |
| 6,369,136 B2 | 4/2002 | Sorriero et al. |
| 6,381,817 B1 | 5/2002 | Moody, III |
| 6,384,108 B1 | 5/2002 | Breton et al. |
| 6,402,870 B1 | 6/2002 | Groten et al. |
| 6,403,677 B1 | 6/2002 | Walker |
| 6,417,251 B1 | 7/2002 | Brady |
| 6,420,024 B1 | 7/2002 | Perez et al. |
| 6,420,027 B2 | 7/2002 | Kimura et al. |
| 6,428,900 B1 | 8/2002 | Wang |
| 6,429,253 B1 | 8/2002 | Guerro et al. |
| 6,430,348 B1 | 8/2002 | Asano et al. |
| 6,432,532 B2 | 8/2002 | Perez et al. |
| 6,432,850 B1 | 8/2002 | Takagi et al. |
| 6,436,855 B1 | 8/2002 | Iwata et al. |
| 6,440,556 B2 | 8/2002 | Matsui et al. |
| 6,441,267 B1 | 8/2002 | Dugan |
| 6,471,910 B1 | 10/2002 | Haggard |
| 6,488,731 B2 | 12/2002 | Schultheiss et al. |
| 6,506,853 B2 | 1/2003 | Duan |
| 6,509,092 B1 | 1/2003 | Dugan |
| 6,512,024 B1 | 1/2003 | Lundgard et al. |
| 6,533,938 B1 | 3/2003 | Dillorio et al. |
| 6,541,175 B1 | 4/2003 | Jiang et al. |
| 6,548,592 B1 | 4/2003 | Lang et al. |
| 6,550,622 B2 | 4/2003 | Koslow |
| 6,551,353 B1 | 4/2003 | Baker et al. |
| 6,552,123 B1 | 4/2003 | Katayama et al. |
| 6,552,162 B1 | 4/2003 | Wang et al. |
| 6,554,881 B1 | 4/2003 | Healey |
| 6,573,204 B1 | 6/2003 | Philipp et al. |
| 6,576,716 B1 | 6/2003 | Wo |
| 6,579,466 B1 | 6/2003 | David et al. |
| 6,583,075 B1 | 6/2003 | Dugan |
| 6,586,529 B2 | 7/2003 | Mumick et al. |
| 6,589,426 B1 | 7/2003 | Husain et al. |
| 6,602,386 B1 | 8/2003 | Takeuchi et al. |
| 6,602,955 B2 | 8/2003 | Soerens et al. |
| H2086 H | 10/2003 | Amsler |
| 6,638,677 B2 | 10/2003 | Patel et al. |
| 6,657,017 B2 | 12/2003 | Wo et al. |
| 6,664,437 B2 | 12/2003 | Sawyer et al. |
| 6,692,825 B2 | 2/2004 | Qin et al. |
| 6,706,652 B2 | 3/2004 | Groten et al. |
| 6,720,063 B2 | 4/2004 | Kobayashi et al. |
| 6,730,387 B2 | 5/2004 | Rezai et al. |
| 6,743,506 B2 | 6/2004 | Bond et al. |
| 6,746,766 B2 | 6/2004 | Bond et al. |
| 6,746,779 B2 | 6/2004 | Hayes et al. |
| 6,759,124 B2 | 7/2004 | Royer et al. |
| 6,764,802 B2 | 7/2004 | Maric et al. |
| 6,767,498 B1 | 7/2004 | Talley, Jr. et al. |
| 6,776,858 B2 | 8/2004 | Bansal et al. |
| 6,780,560 B2 | 8/2004 | Farrugia et al. |
| 6,780,942 B2 | 8/2004 | Leon et al. |
| 6,787,245 B1 | 9/2004 | Hayes |
| 6,787,425 B1 | 9/2004 | Rotondaro et al. |
| 6,815,382 B1 | 11/2004 | Groten et al. |
| 6,821,672 B2 | 11/2004 | Zguris |
| 6,838,172 B2 | 1/2005 | Yoon et al. |
| 6,838,403 B2 | 1/2005 | Tsai et al. |
| 6,841,038 B2 | 1/2005 | Horenziak et al. |
| 6,844,062 B2 | 1/2005 | Matsui et al. |
| 6,844,063 B2 | 1/2005 | Matsui et al. |
| 6,849,329 B2 | 2/2005 | Perez et al. |
| 6,855,422 B2 | 2/2005 | Magill et al. |
| 6,860,906 B2 | 3/2005 | Malisz et al. |
| 6,861,142 B1 | 3/2005 | Wilkie et al. |
| 6,890,649 B2 | 5/2005 | Hobbs et al. |
| 6,893,711 B2 | 5/2005 | Williamson et al. |
| 6,900,148 B2 | 5/2005 | Yoneda et al. |
| 6,902,796 B2 | 6/2005 | Morell et al. |
| 6,946,506 B2 | 9/2005 | Bond et al. |
| 6,949,288 B2 | 9/2005 | Hodge et al. |
| 6,953,622 B2 | 10/2005 | Tsai et al. |
| 6,989,193 B2 | 1/2006 | Haile et al. |
| 6,989,194 B2 | 1/2006 | Bansal et al. |
| 7,008,485 B2 | 3/2006 | Heikkila et al. |
| 7,011,653 B2 | 3/2006 | Imsangjan et al. |

(56) References Cited

U.S. PATENT DOCUMENTS

| | | |
|---|---|---|
| 7,011,885 B2 | 3/2006 | Chang et al. |
| 7,014,803 B2 | 3/2006 | Perez et al. |
| 7,022,201 B2 | 4/2006 | Anderson et al. |
| 7,025,885 B2 | 4/2006 | Cote et al. |
| 7,026,033 B2 | 4/2006 | Fujimori et al. |
| 7,070,695 B2 | 7/2006 | Husain et al. |
| 7,087,301 B2 | 8/2006 | Musgrave et al. |
| 7,091,140 B1 | 8/2006 | Ferencz et al. |
| 7,097,904 B2 | 8/2006 | Ochi et al. |
| 7,112,389 B1 | 9/2006 | Arora et al. |
| 7,144,614 B2 | 12/2006 | Nakajima et al. |
| 7,160,612 B2 | 1/2007 | Magill et al. |
| 7,163,744 B2 | 1/2007 | Nightingale et al. |
| 7,166,225 B2 | 1/2007 | Pitt et al. |
| 7,179,376 B2 | 2/2007 | Kaleem et al. |
| 7,186,343 B2 | 3/2007 | Rabie et al. |
| 7,186,344 B2 | 3/2007 | Hughes |
| 7,193,029 B2 | 3/2007 | Hayes |
| 7,194,788 B2 | 3/2007 | Clark et al. |
| 7,195,814 B2 | 3/2007 | Ista et al. |
| 7,214,765 B2 | 5/2007 | Ringeisen et al. |
| 7,220,815 B2 | 5/2007 | Hayes |
| 7,238,415 B2 | 7/2007 | Rodriguez et al. |
| 7,238,423 B2 | 7/2007 | Calhoun et al. |
| 7,241,497 B2 | 7/2007 | Magill et al. |
| 7,276,139 B2 | 10/2007 | Katai et al. |
| 7,285,209 B2 | 10/2007 | Yu et al. |
| 7,291,270 B2 | 11/2007 | Gibson et al. |
| 7,291,389 B1 | 11/2007 | Bitler et al. |
| 7,304,125 B2 | 12/2007 | Ibar |
| 7,306,735 B2 | 12/2007 | Baggott et al. |
| 7,309,372 B2 | 12/2007 | Kahlbaugh et al. |
| 7,314,497 B2 | 1/2008 | Kahlbaugh et al. |
| 7,329,723 B2 | 2/2008 | Jernigan et al. |
| 7,338,664 B2 | 3/2008 | Tseng et al. |
| 7,344,775 B2 | 3/2008 | Stevens et al. |
| 7,347,947 B2 | 3/2008 | Nakamura et al. |
| 7,357,985 B2 | 4/2008 | Kurian et al. |
| 7,358,022 B2 | 4/2008 | Farrugia et al. |
| 7,358,323 B2 | 4/2008 | Maeda et al. |
| 7,358,325 B2 | 4/2008 | Hayes |
| 7,361,700 B2 | 4/2008 | Sunamori et al. |
| 7,365,118 B2 | 4/2008 | McCleskey et al. |
| 7,371,701 B2 | 5/2008 | Inagaki |
| 7,387,976 B2 | 6/2008 | Baba et al. |
| 7,388,058 B2 | 6/2008 | Kaku et al. |
| 7,405,171 B2 | 7/2008 | Tsujiyama et al. |
| 7,405,266 B2 | 7/2008 | Bentley et al. |
| 7,432,219 B2 | 10/2008 | Strandqvist et al. |
| 7,442,277 B2 | 10/2008 | Kupper et al. |
| 7,462,386 B2 | 12/2008 | Yamasaki et al. |
| 7,497,895 B2 | 3/2009 | Sabottke |
| 7,513,004 B2 | 4/2009 | Luckman et al. |
| 7,544,444 B2 | 6/2009 | Adachi et al. |
| 7,560,159 B2 | 7/2009 | Goda et al. |
| 7,576,019 B2 | 8/2009 | Bond et al. |
| 7,588,688 B2 | 9/2009 | Butters et al. |
| 7,622,188 B2 | 11/2009 | Kamiyama et al. |
| 7,635,745 B2 | 12/2009 | Gupta et al. |
| 7,655,070 B1 | 2/2010 | Dallas et al. |
| 7,660,040 B2 | 2/2010 | Starry et al. |
| 7,666,500 B2 | 2/2010 | Magill et al. |
| 7,666,502 B2 | 2/2010 | Magill et al. |
| 7,666,504 B2 | 2/2010 | Ochi et al. |
| 7,674,510 B2 | 3/2010 | Kamiya |
| 7,687,143 B2 | 3/2010 | Gupta et al. |
| 7,695,812 B2 | 4/2010 | Peng et al. |
| 7,696,111 B2 | 4/2010 | Mangold et al. |
| 7,704,595 B2 | 4/2010 | Morin |
| 7,718,104 B2 | 5/2010 | MacDonald et al. |
| 7,727,627 B2 | 6/2010 | Sen et al. |
| 7,732,357 B2 | 6/2010 | Annis et al. |
| 7,732,557 B2 | 6/2010 | Phelps et al. |
| 7,736,737 B2 | 6/2010 | Van Dun et al. |
| 7,737,060 B2 | 6/2010 | Strickler et al. |
| 7,744,807 B2 | 6/2010 | Berrigan et al. |
| 7,754,123 B2 | 7/2010 | Verdegan et al. |
| 7,757,811 B2 | 7/2010 | Fox et al. |
| 7,765,647 B2 | 8/2010 | Smith et al. |
| 7,772,456 B2 | 8/2010 | Zhang et al. |
| 7,820,568 B2 | 10/2010 | Horiguchi et al. |
| 7,837,814 B2 | 11/2010 | Minami et al. |
| 7,858,732 B2 | 12/2010 | Bruchmann et al. |
| 7,883,604 B2 | 2/2011 | Dyer et al. |
| 7,884,037 B2 | 2/2011 | Sirovatka et al. |
| 7,887,526 B2 | 2/2011 | Van Gompel et al. |
| 7,892,672 B2 | 2/2011 | Nishikawa |
| 7,892,992 B2 | 2/2011 | Kamada et al. |
| 7,892,993 B2 | 2/2011 | Gupta et al. |
| 7,896,940 B2 | 3/2011 | Sundet et al. |
| 7,897,078 B2 | 3/2011 | Petersen et al. |
| 7,897,248 B2 | 3/2011 | Barrera et al. |
| 7,902,094 B2 | 3/2011 | Haile et al. |
| 7,902,096 B2 | 3/2011 | Brandner et al. |
| 7,910,207 B2 | 3/2011 | Kamiyama et al. |
| 7,914,866 B2 | 3/2011 | Shannon et al. |
| 7,918,313 B2 | 4/2011 | Gross et al. |
| 7,919,419 B2 | 4/2011 | Hurley et al. |
| 7,922,959 B2 | 4/2011 | Jones et al. |
| 7,923,143 B2 | 4/2011 | Tanaka et al. |
| 7,928,025 B2 | 4/2011 | Shipley et al. |
| 7,931,457 B2 | 4/2011 | Johnson et al. |
| 7,932,192 B2 | 4/2011 | Fujisawa et al. |
| 7,935,645 B2 | 5/2011 | Pourdeyhimi et al. |
| 7,947,142 B2 | 5/2011 | Fox et al. |
| 7,947,864 B2 | 5/2011 | Damay et al. |
| 7,951,313 B2 | 5/2011 | Matsubayashi et al. |
| 7,951,452 B2 | 5/2011 | Nakayama et al. |
| 7,959,848 B2 | 6/2011 | Reneker et al. |
| 8,021,457 B2 | 9/2011 | Dema et al. |
| 8,057,567 B2 | 11/2011 | Webb et al. |
| 8,129,019 B2 | 3/2012 | Pourdeyhimi et al. |
| 8,148,278 B2 | 4/2012 | Gupta et al. |
| 8,158,244 B2 | 4/2012 | Gupta et al. |
| 8,163,385 B2 | 4/2012 | Gupta et al. |
| 8,178,199 B2 | 5/2012 | Gupta et al. |
| 8,216,953 B2 | 7/2012 | Haile et al. |
| 8,227,362 B2 | 7/2012 | Haile et al. |
| 8,236,713 B2 | 8/2012 | Haile et al. |
| 8,247,335 B2 | 8/2012 | Haile et al. |
| 8,257,628 B2 | 9/2012 | Gupta et al. |
| 8,262,958 B2 | 9/2012 | Haile et al. |
| 8,273,451 B2 | 9/2012 | Gupta et al. |
| 8,277,706 B2 | 10/2012 | Gupta et al. |
| 8,314,041 B2 | 11/2012 | Gupta et al. |
| 8,388,877 B2 | 3/2013 | Gupta et al. |
| 8,398,907 B2 | 3/2013 | Gupta et al. |
| 8,435,908 B2 | 5/2013 | Haile et al. |
| 8,444,895 B2 | 5/2013 | Haile et al. |
| 8,444,896 B2 | 5/2013 | Haile et al. |
| 8,465,565 B2 | 6/2013 | Calis et al. |
| 8,512,519 B2 | 8/2013 | Gupta et al. |
| 8,513,147 B2 | 8/2013 | Gupta et al. |
| 8,557,374 B2 | 10/2013 | Gupta et al. |
| 8,613,363 B2 | 12/2013 | Koslow |
| 8,623,247 B2 | 1/2014 | Haile et al. |
| 8,840,757 B2 * | 9/2014 | Parker ................ C08G 63/6886 162/146 |
| 8,840,758 B2 * | 9/2014 | Parker ................ C08G 63/6886 162/146 |
| 8,871,052 B2 * | 10/2014 | Parker ................ C08G 63/6886 162/146 |
| 8,882,963 B2 * | 11/2014 | Parker ................ C08G 63/6886 162/146 |
| 9,175,440 B2 * | 11/2015 | Parker ................ C08G 63/6886 |
| 9,273,417 B2 | 3/2016 | Gupta et al. |
| 9,303,357 B2 | 4/2016 | Clark et al. |
| 2002/0009590 A1 | 1/2002 | Matsui et al. |
| 2002/0030016 A1 | 3/2002 | Schmidt |
| 2002/0079121 A1 | 6/2002 | Ryan et al. |
| 2002/0100728 A1 | 8/2002 | Poncelet |
| 2002/0106510 A1 | 8/2002 | Deguchi et al. |
| 2002/0123290 A1 | 9/2002 | Tsai et al. |
| 2002/0127937 A1 | 9/2002 | Lange et al. |

(56) References Cited

U.S. PATENT DOCUMENTS

| | | |
|---|---|---|
| 2002/0127939 A1 | 9/2002 | Hwo et al. |
| 2002/0146552 A1 | 10/2002 | Mumick et al. |
| 2002/0187329 A1 | 12/2002 | Ista et al. |
| 2003/0024878 A1 | 2/2003 | Baltussen et al. |
| 2003/0026986 A1 | 2/2003 | Matsui et al. |
| 2003/0057155 A1 | 3/2003 | Husain et al. |
| 2003/0077444 A1 | 4/2003 | Bond et al. |
| 2003/0091822 A1 | 5/2003 | Bond et al. |
| 2003/0092343 A1 | 5/2003 | Bond et al. |
| 2003/0104204 A1 | 6/2003 | Bond et al. |
| 2003/0111763 A1 | 6/2003 | Jen |
| 2003/0166370 A1 | 9/2003 | Harris et al. |
| 2003/0166371 A1 | 9/2003 | Fingal et al. |
| 2003/0168191 A1 | 9/2003 | Hansen et al. |
| 2003/0176132 A1 | 9/2003 | Moriyasu et al. |
| 2003/0194558 A1 | 10/2003 | Anderson |
| 2003/0196955 A1 | 10/2003 | Hughes |
| 2004/0054331 A1 | 3/2004 | Hamilton et al. |
| 2004/0081829 A1 | 4/2004 | Klier et al. |
| 2004/0157037 A1 | 8/2004 | Yamaguchi et al. |
| 2004/0194558 A1 | 10/2004 | Nagase |
| 2004/0209058 A1 | 10/2004 | Chou et al. |
| 2004/0211729 A1 | 10/2004 | Sunkara et al. |
| 2004/0214495 A1 | 10/2004 | Foss et al. |
| 2004/0242106 A1 | 12/2004 | Rabasco et al. |
| 2004/0242838 A1 | 12/2004 | Duan |
| 2004/0258910 A1 | 12/2004 | Haile et al. |
| 2004/0260034 A1 | 12/2004 | Haile et al. |
| 2005/0026527 A1 | 2/2005 | Schmidt |
| 2005/0027098 A1 | 2/2005 | Hayes |
| 2005/0032450 A1 | 2/2005 | Haggard et al. |
| 2005/0079781 A1 | 4/2005 | Tsujimoto et al. |
| 2005/0115902 A1 | 6/2005 | Kaleem et al. |
| 2005/0125908 A1 | 6/2005 | Pourdeyhimi |
| 2005/0148261 A1 | 7/2005 | Close et al. |
| 2005/0171250 A1 | 8/2005 | Hayes |
| 2005/0208300 A1 | 9/2005 | Magill et al. |
| 2005/0215157 A1 | 9/2005 | Dugan et al. |
| 2005/0221709 A1 | 10/2005 | Jordan et al. |
| 2005/0222956 A1 | 10/2005 | Bristow et al. |
| 2005/0227068 A1 | 10/2005 | Dugan |
| 2005/0239359 A1 | 10/2005 | Jones et al. |
| 2005/0282008 A1 | 12/2005 | Haile et al. |
| 2005/0287895 A1 | 12/2005 | Bansal |
| 2006/0011544 A1 | 1/2006 | Sharma et al. |
| 2006/0019570 A1 | 1/2006 | Groten et al. |
| 2006/0021938 A1 | 2/2006 | Diallo |
| 2006/0030230 A1 | 2/2006 | Nagaoka et al. |
| 2006/0035556 A1 | 2/2006 | Yokoi et al. |
| 2006/0049386 A1 | 3/2006 | Kody et al. |
| 2006/0051575 A1 | 3/2006 | Yoon et al. |
| 2006/0057350 A1 | 3/2006 | Ochi et al. |
| 2006/0057373 A1 | 3/2006 | Inagaki et al. |
| 2006/0060529 A1 | 3/2006 | Cote et al. |
| 2006/0065600 A1 | 3/2006 | Sunkara et al. |
| 2006/0081330 A1 | 4/2006 | Minami et al. |
| 2006/0083917 A1 | 4/2006 | Dugan |
| 2006/0093814 A1 | 5/2006 | Chang |
| 2006/0093819 A1 | 5/2006 | Atwood et al. |
| 2006/0113033 A1 | 6/2006 | Bruner |
| 2006/0128247 A1 | 6/2006 | Skoog et al. |
| 2006/0135020 A1 | 6/2006 | Weinberg et al. |
| 2006/0147709 A1 | 7/2006 | Mizumura et al. |
| 2006/0155094 A1 | 7/2006 | Meckel et al. |
| 2006/0159918 A1 | 7/2006 | Dugan et al. |
| 2006/0177656 A1 | 8/2006 | Kolmes et al. |
| 2006/0189956 A1 | 8/2006 | Catalan |
| 2006/0194027 A1 | 8/2006 | Pourdeyhimi et al. |
| 2006/0194047 A1 | 8/2006 | Gupta et al. |
| 2006/0204753 A1 | 9/2006 | Simmonds et al. |
| 2006/0210797 A1 | 9/2006 | Masuda et al. |
| 2006/0230731 A1 | 10/2006 | Kalayci et al. |
| 2006/0234049 A1 | 10/2006 | Van Dun et al. |
| 2006/0234050 A1 | 10/2006 | Frankel |
| 2006/0234587 A1 | 10/2006 | Horiguchi et al. |
| 2006/0263601 A1 | 11/2006 | Wang et al. |
| 2006/0281383 A1 | 12/2006 | Schmitt et al. |
| 2007/0009736 A1 | 1/2007 | Chuang et al. |
| 2007/0020453 A1 | 1/2007 | Sen et al. |
| 2007/0021021 A1 | 1/2007 | Verdegan et al. |
| 2007/0031637 A1 | 2/2007 | Anderson |
| 2007/0031668 A1 | 2/2007 | Hietpas et al. |
| 2007/0039889 A1 | 2/2007 | Ashford |
| 2007/0048523 A1 | 3/2007 | Pollet et al. |
| 2007/0056906 A1 | 3/2007 | Kaleem et al. |
| 2007/0062872 A1 | 3/2007 | Parker et al. |
| 2007/0074628 A1 | 4/2007 | Jones et al. |
| 2007/0077427 A1 | 4/2007 | Dugan |
| 2007/0098982 A1 | 5/2007 | Nishida et al. |
| 2007/0102361 A1 | 5/2007 | Kiefer et al. |
| 2007/0110980 A1 | 5/2007 | Shah |
| 2007/0110998 A1 | 5/2007 | Steele et al. |
| 2007/0114177 A1 | 5/2007 | Sabottke |
| 2007/0122613 A1 | 5/2007 | Stevens et al. |
| 2007/0122614 A1 | 5/2007 | Peng et al. |
| 2007/0128404 A1 | 6/2007 | Tung et al. |
| 2007/0167096 A1 | 7/2007 | Scott |
| 2007/0179275 A1 | 8/2007 | Gupta et al. |
| 2007/0182040 A1 | 8/2007 | Suzuki et al. |
| 2007/0190319 A1 | 8/2007 | Kalayci |
| 2007/0232179 A1 | 10/2007 | Polat et al. |
| 2007/0232180 A1 | 10/2007 | Polat et al. |
| 2007/0243377 A1 | 10/2007 | Nishida et al. |
| 2007/0254153 A1 | 11/2007 | Nadkarni et al. |
| 2007/0258935 A1 | 11/2007 | McEntire et al. |
| 2007/0259029 A1 | 11/2007 | McEntire et al. |
| 2007/0259177 A1 | 11/2007 | Gupta et al. |
| 2007/0264520 A1 | 11/2007 | Wood et al. |
| 2007/0278151 A1 | 12/2007 | Musale |
| 2007/0278152 A1 | 12/2007 | Musale |
| 2008/0000836 A1 | 1/2008 | Wang et al. |
| 2008/0003400 A1 | 1/2008 | Tseng |
| 2008/0003905 A1 | 1/2008 | Tseng et al. |
| 2008/0003912 A1 | 1/2008 | Pourdeyhimi et al. |
| 2008/0009574 A1 | 1/2008 | Huenefeld et al. |
| 2008/0009650 A1 | 1/2008 | Sluijmers et al. |
| 2008/0011680 A1 | 1/2008 | Partridge et al. |
| 2008/0038974 A1 | 2/2008 | Eagles |
| 2008/0039540 A1 | 2/2008 | Reitz |
| 2008/0064285 A1 | 3/2008 | Morton et al. |
| 2008/0134652 A1 | 6/2008 | Lim et al. |
| 2008/0152282 A1 | 6/2008 | Ouderkirk et al. |
| 2008/0160278 A1 | 7/2008 | Cheng et al. |
| 2008/0160856 A1 | 7/2008 | Chen et al. |
| 2008/0160859 A1 | 7/2008 | Gupta et al. |
| 2008/0170982 A1 | 7/2008 | Zhang et al. |
| 2008/0188151 A1 | 8/2008 | Yokoi et al. |
| 2008/0207833 A1 | 8/2008 | Bear et al. |
| 2008/0229672 A1 | 9/2008 | Woo et al. |
| 2008/0233850 A1 | 9/2008 | Woo et al. |
| 2008/0245037 A1 | 10/2008 | Rogers et al. |
| 2008/0264586 A1 | 10/2008 | Likitalo et al. |
| 2008/0287026 A1 | 11/2008 | Chakravarty et al. |
| 2008/0305389 A1 | 12/2008 | Arora et al. |
| 2008/0311815 A1* | 12/2008 | Gupta .................. D01D 5/0985 442/351 |
| 2009/0025895 A1 | 1/2009 | Cowman |
| 2009/0036015 A1 | 2/2009 | Nhan et al. |
| 2009/0042475 A1 | 2/2009 | Pourdeyhimi et al. |
| 2009/0163449 A1 | 6/2009 | Wempe |
| 2009/0249956 A1 | 10/2009 | Chi et al. |
| 2009/0258182 A1 | 10/2009 | Okamoto et al. |
| 2009/0274862 A1 | 11/2009 | Nakayama et al. |
| 2009/0294435 A1 | 12/2009 | Nhan et al. |
| 2009/0305592 A1 | 12/2009 | Shi et al. |
| 2010/0018660 A1 | 1/2010 | Varnell |
| 2010/0035500 A1 | 2/2010 | Kimura et al. |
| 2010/0044289 A1 | 2/2010 | Koslow |
| 2010/0072126 A1 | 3/2010 | Tsujimoto et al. |
| 2010/0112325 A1 | 5/2010 | Iwamoto et al. |
| 2010/0133173 A1 | 6/2010 | Inagaki |
| 2010/0133197 A1* | 6/2010 | Langner .................. D21B 1/327 210/703 |
| 2010/0136312 A1 | 6/2010 | Inagaki |

(56) References Cited

U.S. PATENT DOCUMENTS

| | | |
|---|---|---|
| 2010/0143717 A1 | 6/2010 | Sakamoto et al. |
| 2010/0173154 A1 | 7/2010 | Shimotsu et al. |
| 2010/0180558 A1 | 7/2010 | Ito et al. |
| 2010/0187712 A1 | 7/2010 | Gupta et al. |
| 2010/0197027 A1 | 8/2010 | Zhang et al. |
| 2010/0200512 A1 | 8/2010 | Chase et al. |
| 2010/0203788 A1 | 8/2010 | Kimura et al. |
| 2010/0247894 A1 | 9/2010 | Beard |
| 2010/0272938 A1 | 10/2010 | Mitchell et al. |
| 2010/0273947 A1 | 10/2010 | Miyauchi et al. |
| 2010/0282682 A1 | 11/2010 | Eaton et al. |
| 2010/0285101 A1 | 11/2010 | Moore et al. |
| 2010/0291213 A1 | 11/2010 | Berrigan et al. |
| 2010/0310921 A1 | 12/2010 | Hayakawa et al. |
| 2011/0020590 A1 | 1/2011 | Yoneda et al. |
| 2011/0030885 A1 | 2/2011 | Anneaux et al. |
| 2011/0033705 A1 | 2/2011 | Komura et al. |
| 2011/0036487 A1 | 2/2011 | Rajala et al. |
| 2011/0039055 A1 | 2/2011 | Fujisawa et al. |
| 2011/0039468 A1 | 2/2011 | Baldwin, Jr. et al. |
| 2011/0040277 A1 | 2/2011 | Rajala et al. |
| 2011/0041471 A1 | 2/2011 | Sebastian et al. |
| 2011/0045042 A1 | 2/2011 | Sasaki et al. |
| 2011/0045231 A1 | 2/2011 | Kajiwara et al. |
| 2011/0045261 A1 | 2/2011 | Sellars |
| 2011/0046461 A1 | 2/2011 | McKenna |
| 2011/0049769 A1 | 3/2011 | Duchoslav et al. |
| 2011/0054429 A1 | 3/2011 | Lademann et al. |
| 2011/0056638 A1 | 3/2011 | Rosset |
| 2011/0059669 A1 | 3/2011 | He et al. |
| 2011/0064928 A1 | 3/2011 | Bonneh |
| 2011/0065573 A1 | 3/2011 | McEneany et al. |
| 2011/0065871 A1 | 3/2011 | Nagano et al. |
| 2011/0067369 A1 | 3/2011 | Chung et al. |
| 2011/0068507 A1 | 3/2011 | Warren et al. |
| 2011/0074060 A1 | 3/2011 | Angadjivand et al. |
| 2011/0076250 A1 | 3/2011 | Belenkaya et al. |
| 2011/0084028 A1 | 4/2011 | Stanfel et al. |
| 2011/0091761 A1 | 4/2011 | Miller et al. |
| 2011/0094515 A1 | 4/2011 | Duffy |
| 2011/0104493 A1 | 5/2011 | Barnholtz et al. |
| 2011/0114274 A1 | 5/2011 | Takano et al. |
| 2011/0117176 A1 | 5/2011 | Klun et al. |
| 2011/0117353 A1 | 5/2011 | Henshaw et al. |
| 2011/0117439 A1 | 5/2011 | Yamada et al. |
| 2011/0123584 A1 | 5/2011 | Seidling et al. |
| 2011/0124769 A1 | 5/2011 | Moen et al. |
| 2011/0124835 A1 | 5/2011 | DeWeijer et al. |
| 2011/0129510 A1 | 6/2011 | Liebmann et al. |
| 2011/0130063 A1 | 6/2011 | Matsubayashi et al. |
| 2011/0139386 A1 | 6/2011 | Gupta et al. |
| 2011/0142900 A1 | 6/2011 | Ohta et al. |
| 2011/0143110 A1 | 6/2011 | Tsuchiya et al. |
| 2011/0147299 A1 | 6/2011 | Stanfel et al. |
| 2011/0168625 A1 | 7/2011 | Gupta et al. |
| 2011/0171535 A1 | 7/2011 | Ohnishi et al. |
| 2011/0171890 A1 | 7/2011 | Nakayama et al. |
| 2012/0015577 A1 | 1/2012 | Rudman et al. |
| 2012/0175074 A1 | 7/2012 | Gupta et al. |
| 2012/0175298 A1 | 7/2012 | Gupta et al. |
| 2012/0180968 A1 | 7/2012 | Gupta et al. |
| 2012/0181720 A1 | 7/2012 | Gupta et al. |
| 2012/0183861 A1 | 7/2012 | Gupta et al. |
| 2012/0183862 A1 | 7/2012 | Gupta et al. |
| 2012/0184164 A1 | 7/2012 | Gupta et al. |
| 2012/0219766 A1 | 8/2012 | Gupta et al. |
| 2012/0302120 A1 | 11/2012 | Clark et al. |
| 2013/0123409 A1 | 5/2013 | Clark et al. |
| 2013/0193086 A1 | 8/2013 | Parker et al. |
| 2013/0337712 A1 | 12/2013 | Zhang et al. |
| 2014/0273704 A1 | 9/2014 | Baer et al. |
| 2014/0311694 A1 | 10/2014 | Clark et al. |
| 2014/0311695 A1 | 10/2014 | Clark et al. |
| 2015/0007955 A1 | 1/2015 | Parker et al. |

FOREIGN PATENT DOCUMENTS

| | | |
|---|---|---|
| EP | 0193798 A1 | 9/1986 |
| EP | 0235820 A1 | 9/1987 |
| EP | 0 340 763 A1 | 11/1989 |
| EP | 0 396 771 A1 | 11/1990 |
| EP | 0 610 894 A1 | 8/1994 |
| EP | 0 610 897 A1 | 8/1994 |
| EP | 0 618 317 A1 | 10/1994 |
| EP | 0 830 466 A1 | 3/1998 |
| EP | 0 836 656 A1 | 4/1998 |
| EP | 0 859 073 A1 | 8/1998 |
| EP | 0 880 909 A1 | 12/1998 |
| EP | 0 666 344 B1 | 9/1999 |
| EP | 1 161 576 A1 | 12/2001 |
| EP | 1 243 675 A1 | 9/2002 |
| EP | 0 645 480 B1 | 11/2002 |
| EP | 0 961 847 B1 | 12/2002 |
| EP | 1359632 A2 | 4/2003 |
| EP | 0 935 682 B1 | 9/2003 |
| EP | 1 416 077 A2 | 5/2004 |
| EP | 1457591 A1 | 9/2004 |
| EP | 0 905 292 B1 | 10/2004 |
| EP | 1538686 A1 | 6/2005 |
| EP | 1 550 746 A1 | 7/2005 |
| EP | 1 322 802 B1 | 8/2005 |
| EP | 1 314 808 B1 | 1/2006 |
| EP | 1252219 B1 | 8/2006 |
| EP | 1 325 184 B1 | 9/2006 |
| EP | 1 715 089 A2 | 10/2006 |
| EP | 1 319 095 B1 | 11/2006 |
| EP | 1 731 634 A | 12/2006 |
| EP | 1 149 195 B1 | 1/2007 |
| EP | 1 412 567 B1 | 1/2007 |
| EP | 1 404 905 B1 | 4/2007 |
| EP | 0 842 310 B1 | 1/2008 |
| EP | 1 894 609 A1 | 3/2008 |
| EP | 1 903 134 A1 | 3/2008 |
| EP | 1 938 883 A1 | 7/2008 |
| EP | 2 082 082 A2 | 7/2009 |
| EP | 1 516 079 B1 | 12/2009 |
| EP | 2 135 984 A1 | 12/2009 |
| EP | 1 224 900 B1 | 6/2010 |
| EP | 2 243 872 A1 | 10/2010 |
| EP | 2283796 A1 | 2/2011 |
| EP | 2287374 A1 | 2/2011 |
| EP | 1 620 506 B1 | 3/2011 |
| EP | 0847263 B2 | 3/2011 |
| EP | 2292309 A1 | 3/2011 |
| EP | 1474555 B1 | 4/2011 |
| EP | 2308579 A1 | 4/2011 |
| EP | 2311542 A1 | 4/2011 |
| EP | 2311543 A1 | 4/2011 |
| FR | 2654674 A1 | 5/1991 |
| GB | 1073640 | 6/1967 |
| JP | 52-066719 | 6/1977 |
| JP | 58-83046 A | 5/1983 |
| JP | 58174625 A | 10/1983 |
| JP | 58-220818 | 12/1983 |
| JP | 61-047822 | 3/1986 |
| JP | 61-296120 A | 12/1986 |
| JP | 62-078213 | 4/1987 |
| JP | 63-159523 A | 7/1988 |
| JP | S63-227898 A | 9/1988 |
| JP | 01-162825 A | 6/1989 |
| JP | 1-229899 A | 9/1989 |
| JP | 1-272820 A | 10/1989 |
| JP | 1-289838 A | 11/1989 |
| JP | 02-026920 A | 1/1990 |
| JP | 02-210092 A | 8/1990 |
| JP | 3-16378 B2 | 3/1991 |
| JP | H0390675 A | 4/1991 |
| JP | 3-180587 A | 8/1991 |
| JP | 04-057918 A | 2/1992 |
| JP | 4327209 A | 11/1992 |
| JP | 5-18334 B2 | 3/1993 |
| JP | H05214649 A | 8/1993 |
| JP | 05-263316 | 10/1993 |
| JP | 1993-263316 A | 10/1993 |

(56) References Cited

FOREIGN PATENT DOCUMENTS

| | | |
|---|---|---|
| JP | 5321106 | 12/1993 |
| JP | 6-002221 A | 1/1994 |
| JP | 6-25396 A | 2/1994 |
| JP | 9-77963 A | 3/1997 |
| JP | 9-100397 A | 4/1997 |
| JP | 9-249742 A | 9/1997 |
| JP | 09-291472 | 11/1997 |
| JP | 09-310230 | 12/1997 |
| JP | 2000-95850 | 4/2000 |
| JP | 3131100 B2 | 1/2001 |
| JP | 2001-123335 | 5/2001 |
| JP | 2002-151040 A | 5/2002 |
| JP | 2003-020524 A | 1/2003 |
| JP | 2003-253555 A | 9/2003 |
| JP | 2004-137319 | 5/2004 |
| JP | 2004-137418 A | 5/2004 |
| JP | 2005-002510 | 1/2005 |
| JP | 2005-154450 A | 6/2005 |
| JP | 2005-330612 A | 12/2005 |
| JP | 2006-233365 A | 9/2006 |
| JP | 2007-092235 | 12/2007 |
| JP | 2008-127694 A | 6/2008 |
| JP | 2010-070870 A | 4/2010 |
| JP | 2010-255173 A | 11/2010 |
| JP | 4648815 B2 | 3/2011 |
| KR | 2001-0044145 | 6/2001 |
| KR | 531939 B1 | 11/2005 |
| KR | 2011-031744 A | 3/2011 |
| KR | 2011-031746 A | 3/2011 |
| RU | 2414950 C1 | 3/2011 |
| RU | 2414960 C1 | 3/2011 |
| TW | 230212 B | 4/2005 |
| WO | WO 93/07197 A1 | 4/1993 |
| WO | WO 9414885 A1 | 7/1994 |
| WO | WO 94/24218 A | 10/1994 |
| WO | WO 95/03172 A1 | 2/1995 |
| WO | WO 99/47621 A1 | 9/1999 |
| WO | WO 99/48668 | 9/1999 |
| WO | WO 01/66666 A2 | 9/2001 |
| WO | WO 02/060497 A2 | 8/2002 |
| WO | WO 03/069038 A1 | 8/2003 |
| WO | WO 2004/067818 A2 | 8/2004 |
| WO | WO 2004/099314 A1 | 11/2004 |
| WO | WO 2004/113598 A2 | 12/2004 |
| WO | WO 2005/066403 A1 | 7/2005 |
| WO | WO 2005/103354 A1 | 11/2005 |
| WO | WO 2005/103357 A1 | 11/2005 |
| WO | WO 2006/001739 A1 | 1/2006 |
| WO | WO 2006/034070 A1 | 3/2006 |
| WO | WO 2006/052732 A2 | 5/2006 |
| WO | WO 2006/098851 A2 | 9/2006 |
| WO | WO 2006/107695 A2 | 10/2006 |
| WO | WO 2007/089423 A2 | 8/2007 |
| WO | WO 2007/112443 A2 | 10/2007 |
| WO | WO 2008/028134 A1 | 3/2008 |
| WO | WO 2008/085332 A2 | 7/2008 |
| WO | WO 2009/024836 A1 | 2/2009 |
| WO | WO 2009/051283 A1 | 4/2009 |
| WO | WO 2009/076401 A1 | 6/2009 |
| WO | WO 2009/088564 A1 | 7/2009 |
| WO | WO 2009/140381 A1 | 11/2009 |
| WO | WO 2009/152349 A1 | 12/2009 |
| WO | WO 2010/114820 A2 | 10/2010 |
| WO | WO 2010/117612 A2 | 10/2010 |
| WO | WO 2010/125239 A2 | 11/2010 |
| WO | WO 2010/140853 A2 | 12/2010 |
| WO | WO 2010/146240 A2 | 12/2010 |
| WO | WO 2011/015709 A1 | 2/2011 |
| WO | WO 2011/018459 A1 | 2/2011 |
| WO | WO 2011/008481 A3 | 3/2011 |
| WO | WO 2011/027732 A1 | 3/2011 |
| WO | WO 2011/028661 A2 | 3/2011 |
| WO | WO 2011/034523 A1 | 3/2011 |
| WO | WO 2011/047966 A1 | 4/2011 |
| WO | WO 2011/049831 A2 | 4/2011 |
| WO | WO 2011/049927 A2 | 4/2011 |
| WO | WO 2011/052173 A1 | 5/2011 |
| WO | WO 2011/054932 A1 | 5/2011 |
| WO | WO 2011/062761 A1 | 5/2011 |
| WO | WO 2011/063372 A2 | 5/2011 |
| WO | WO 2011/066224 A2 | 6/2011 |
| WO | WO 2011/070233 A1 | 6/2011 |
| WO | WO 2011/104427 A1 | 9/2011 |
| WO | WO 2011/157892 A1 | 12/2011 |
| WO | WO 2012/054669 A1 | 4/2012 |
| WO | WO 2012/138552 A2 | 10/2012 |
| WO | WO 2013/116067 A2 | 8/2013 |

OTHER PUBLICATIONS

USPTO Office Action dated May 8, 2014 for copending U.S. Appl. No. 13/273,648.
USPTO Notice of Allowance dated May 8, 2014 for copending U.S. Appl. No. 13/687,478.
USPTO Notice of Allowance dated May 13, 2014 for copending U.S. Appl. No. 13/687,472.
USPTO Notice of Allowance dated May 14, 2014 for copending U.S. Appl. No. 13/687,466.
USPTO Notice of Allowance dated May 23, 2014 for copending U.S. Appl. No. 13/687,493.
USPTO Office Action dated Jun. 19, 2014 for copending U.S. Appl. No. 13/671,682.
USPTO Notice of Allowance dated Jun. 19, 2014 for copending U.S. Appl. No. 13/687,505.
USPTO Officce Action dated Jul. 15, 2014 for copending U.S. Appl. No. 13/273,737.
USPTO Office Action dated Jul. 18, 2014 for copending U.S. Appl. No. 13/944,458.
USPTO Office Action dated Jul. 31, 2014 for co-pending U.S. Appl. No. 13/273,937.
USPTO Office Action dated Aug. 4, 2014 for co-pending U.S. Appl. No. 13/352,362.
Extended European Search Report dated Aug. 6, 2014 for Application No./Patent No. 11835104.8-1308 / 2630284 PCT/US2011056984.
Extended European Search Report dated Aug. 6, 2014 for Application No./Patent No. 11835106.3-1308 / 2629950 PCT/US2011056986.
Extended European Search Report dated Aug. 6, 2014 for Application No./Patent No. 11835107.1-1308 / 2630288 PCT/US2011056987.
PCT International Search Report dated Aug. 28, 2014 for International Application No. PCT/US2014/033771.
New Co-pending U.S. Appl. No. 14/490,084, filed Sep. 18, 2014.
USPTO Office Action dated Sep. 26, 2014 for co-pending U.S. Appl. No. 13/273,727.
USPTO Office Action dated Nov. 20, 2014 for co-pending U.S. Appl. No. 14/249,868.
USPTO Office Action dated Nov. 21, 2014 for co-pending U.S. Appl. No. 14/249,858.
USPTO Office Action dated Dec. 4, 2014 for co-pending U.S. Appl. No. 14/490,084.
USPTO Office Action dated Dec. 15, 2014 for co-pending U.S. Appl. No. 13/433,854.
USPTO Office Action dated Feb. 11, 2015 for co-pending U.S. Appl. No. 13/273,692.
USPTO Office Action dated Feb. 11, 2105 for co-pending U.S. Appl. No. 13/273,648.
Notification of Transmittal of the International Search Report and the Written Opinion of the International Search Report and the Written Opinion of the International Searching Authority, or the Declaration—International Application No. PCT/US2014/069888 with a Mailing Date of Mar. 2, 2015.
PCT International Search Report dated Feb. 4, 2008 for International Application No. PCT/US2007/001082.
U.S. Appl. No. 08/550,042, filed Oct. 30, 1995, Michael C. Cook.
PCT International Search Report dated Nov. 6, 2008 for International Application No. PCT/US2007/025661.

(56) References Cited

OTHER PUBLICATIONS

PCT International Search Report dated Jul. 26, 2007 for International Application No. PCT/US2007/001083.
Office Action with Mail Date of Mar. 30, 2009 for related U.S. Appl. No. 11/204,868.
Office Action with Mail Date of Mar. 26, 2009 for related U.S. Appl. No. 11/344,320.
U.S. Appl. No. 61/172,257, filed Apr. 24, 2009, Rakesh Kumar Gupta, et al.
Lydall Filtration and Separation; "Nonwoven Liquid Filtration Media Construction and Performance"; Accessed from the web: http://www.lydallfiltration.com/tech/documents/Nonwovenliquidfiltration.pdf.
PCT International Search Report dated Jul. 3, 2009 for International Application No. PCT/US2009/001717.
PCT International Search Report dated Feb. 28, 2012 for International Application No. PCT/US2011/056990.
PCT International Search Report dated Feb. 28, 2012 for International Application No. PCT/US2011/056994.
PCT International Search Report dated Feb. 14, 2012 for International Application No. PCT/US2011/056989.
PCT International Search Report dated Feb. 28, 2012 for International Application No. PCT/US2011/056995.
PCT International Search Report dated Feb. 28, 2012 for International Application No. PCT/US2011/056991.
PCT International Search Report dated Feb. 28, 2012 for International Application No. PCT/US2011/057002.
USPTO Notice of Allowance dated Nov. 9, 2009 for copending U.S. Appl. No. 11/648,955.
USPTO Office Action dated Dec. 24, 2009 for copending U.S. Appl. No. 11/344,320.
USPTO Office Action dated Dec. 22, 2009 for copending U.S. Appl. No. 11/204,868.
USPTO Notice of Allowance dated Jun. 9, 2010 for copending U.S. Appl. No. 11/344,320.
USPTO Notice of Allowance dated Jun. 9, 2010 for copending U.S. Appl. No. 11/204,868.
USPTO Office Action dated Aug. 6, 2010 for copending U.S. Appl. No. 11/648,953.
USPTO Office Action dated Dec. 21, 2004 for U.S. Appl. No. 10/850,548, published as 2004-0258910.
USPTO Notice of Allowance dated Jun. 8, 2005 for U.S. Appl. No. 10/850,548.
DIN STD 54900 (in German, no English translation available).
ASTM D6340-98 (Reapproved 2007) ASTM International, copyright Sep. 15, 2010.
PCT International Search Report dated Feb. 7, 2005 for International Application No. PCT/US2004/018682.
Copending U.S. Appl. No. 12/765,461, filed Apr. 22, 2010, Rakesh Kumar Gupta, et al.
Smook, G.A., "Handbook for Pulp and Paper Technologist", Angus Wilde Publications, $2^{nd}$ Ed.', 1992, pp. 194-195, 211-212.
PCT International Search Report dated Dec. 30, 2008 for International Application No. PCT/US2007/025770.
Ke Qinfei, et al., "Non-woven Science", Donghau University Press, 2004.9, Catalog, p. 115-132 (unavailable).
USPTO Notice of Allowance dated Nov. 9, 2009 for U.S. Appl. No. 11/648,955.
USPTO Office Action dated Sep. 27, 2010 for U.S. Appl. No. 12/199,304.
USPTO Notice of Allowance dated Sep. 30, 2010 for U.S. Appl. No. 11/344,320.
USPTO Notice of Allowance dated Oct. 14, 2010 for U.S. Appl. No. 11/204,868.
Copending U.S. Appl. No. 12/909,574, filed Oct. 21, 2010, Rakesh Kumar Gupta, et al.
Copending U.S. Appl. No. 12/966,483, filed Dec. 13, 2010, William Alston Haile, et al.
Copending U.S. Appl. No. 12/966,487, filed Dec. 13, 2010, William Alston Haile, et al.
Copending U.S. Appl. No. 12/966,494, filed Dec. 13, 2010, William Alston Haile, et al.
Copending U.S. Appl. No. 12/966,502, filed Dec. 13, 2010, William Alston Haile, et al.
Copending U.S. Appl. No. 12/966,507, filed Dec. 13, 2010, William Alston Haile, et al.
Copending U.S. Appl. No. 12/966,512, filed Dec. 13, 2010, William Alston Haile, et al.
Copending U.S. Appl. No. 12/966,518, filed Dec. 13, 2010, William Alston Haile, et al.
Copending U.S. Appl. No. 12/966,521, filed Dec. 13, 2010, William Alston Haile, et al.
Copending U.S. Appl. No. 12/975,443, filed Dec. 22, 2010, Rakesh Kumar Gupta, et al.
Copending U.S. Appl. No. 12/975,447, filed Dec. 22, 2010, Rakesh Kumar Gupta, et al.
Copending U.S. Appl. No. 12/975,450, filed Dec. 22, 2010, Rakesh Kumar Gupta, et al.
Copending U.S. Appl. No. 12/975,452, filed Dec. 22, 2010, Rakesh Kumar Gupta, et al.
Copending U.S. Appl. No. 12/975,456, filed Dec. 22, 2010, Rakesh Kumar Gupta, et al.
Copending U.S. Appl. No. 12/975,459, filed Dec. 22, 2010, Rakesh Kumar Gupta, et al.
Copending U.S. Appl. No. 12/975,463, filed Dec. 22, 2010, Rakesh Kumar Gupta, et al.
Copending U.S. Appl. No. 12/975,482, filed Dec. 22, 2010, Rakesh Kumar Gupta, et al.
Copending U.S. Appl. No. 12/975,484, filed Dec. 22, 2010, Rakesh Kumar Gupta, et al.
Copending U.S. Appl. No. 12/975,487, filed Dec. 22, 2010, Rakesh Kumar Gupta, et al.
Copending U.S. Appl. No. 12/981,950, filed Dec. 30, 2010, William Alston Haile, et al.
Copending U.S. Appl. No. 12/981,960, filed Dec. 30, 2010, William Alston Haile, et al.
Copending U.S. Appl. No. 12/981,982, filed Dec. 30, 2010, William Alston Haile, et al.
Copending U.S. Appl. No. 12/982,001, filed Dec. 30, 2010, William Alston Haile, et al.
New copending U.S. Appl. No. 13/352,362, filed Jan. 18, 2012, Rakesh Kumar Gupta et al.
USPTO Notice of Allowance dated Apr. 4, 2011 for copending U.S. Appl. No. 12/199,304.
USPTO Office Action dated Mar. 18, 2011 for copending U.S. Appl. No. 11/648,953.
USPTO Office Action dated Apr. 6, 2011 for copending U.S. Appl. No. 12/975,487.
USPTO Office Action dated Apr. 4, 2011 for copending U.S. Appl. No. 12/981,960.
USPTO Office Action dated Apr. 6, 2011 for copending U.S. Appl. No. 12/975,482.
USPTO Office Action dated Jun. 7, 2011 for copending U.S. Appl. No. 12/982,001.
USPTO Office Action dated Jun. 9, 2011 for copending U.S. Appl. No. 12/975,459.
USPTO Office Action dated May 27, 2011 for copending U.S. Appl. No. 12/975,452.
USPTO Office Action dated Jun. 23, 2011 for copending U.S. Appl. No. 12/966,487.
USPTO Office Action dated Jun. 23, 2011 for copending U.S. Appl. No. 12/966,502.
USPTO Office Action dated May 10, 2012 for copending U.S. Appl. No. 12/966,521.
USPTO Office Action dated Mar. 16, 2012 for copending U.S. Appl. No. 12/966,483.
USPTO Notice of Allowance dated Apr. 2, 2012 for copending U.S. Appl. No. 12/966,502.
USPTO Office Action dated Jun 23, 2011 for copending U.S. Appl. No. 12/975,443.
USPTO Notice of Allowance dated Jul. 18, 2011 for copending U.S. Appl. No. 12/199,304.

(56) References Cited

OTHER PUBLICATIONS

USPTO Office Action dated Aug. 10, 2011 for copending U.S. Appl. No. 12/966,512.
USPTO Office Action dated Sep. 15, 2011 for copending U.S. Appl. No. 11/648,953.
USPTO Office Action dated May 3, 2012 for copending U.S. Appl. No. 12/765,461.
USPTO Office Action dated Sep. 8, 2011 for copending U.S. Appl. No. 12/966,494.
USPTO Notice of Allowance dated Apr. 18, 2012 for copending U.S. Appl. No. 12/966,494.
USPTO Office Action dated Sep. 26, 2011 for copending U.S. Appl. No. 12/966,507.
USPTO Office Action dated Apr. 23, 2012 for copending U.S. Appl. No. 12/966,507.
USPTO Office Action dated Sep. 1, 2011 for copending U.S. Appl. No. 12/975,450.
USPTO Office Action dated Aug. 24, 2011 for copending U.S. Appl. No. 12/975,456.
USPTO Office Action dated Apr. 19, 2012 for copending U.S. Appl. No. 12/975,456.
USPTO Office Action dated Sep. 27, 2011 for copending U.S. Appl. No. 12/975,463.
USPTO Office Action dated Apr. 19, 2012 for copending U.S. Appl. No. 12/975,463.
USPTO Office Action dated Aug. 31, 2011 for copending U.S. Appl. No. 13/053,615.
Coons, R., "Eastman Chemical Core Focus Delivers Value," Chemical Week, Aug. 15/22, 2011, pp. 19-22.
USPTO Office Action dated Nov. 10, 2011 for copending U.S. Appl. No. 12/981,950.
USPTO Office Action dated Jan. 25, 2012 for copending U.S. Appl. No. 12/981,982.
USPTO Notice of Allowance dated Jan. 3, 2012 for copending U.S. Appl. No. 12/975,487.
USPTO Notice of Allowance dated Dec. 23, 2011 for copending U.S. Appl. No. 12/975,452.
USPTO Notice of Allowance dated Apr. 2, 2012 for copending U.S. Appl. No. 12/975,452.
USPTO Notice of Allowance dated Dec. 8, 2011 for copending U.S. Appl. No. 12/981,960.
USPTO Notice of Allowance dated Mar. 15, 2012 for copending U.S. Appl. No. 12/981,960.
USPTO Notice of Allowance dated Dec. 13, 2011 for copending U.S. Appl. No. 12/966,487.
USPTO Notice of Allowance dated Apr. 13, 2012 for copending U.S. Appl. No. 12/966,487.
USPTO Notice of Allowance dated Dec. 12, 2011 for copending U.S. Appl. No. 12/966,502.
USPTO Notice of Allowance dated Dec. 9, 2011 for copending U.S. Appl. No. 12/966,512.
USPTO Notice of Allowance dated Mar. 21, 2012 for copending U.S. Appl. No. 12/966,512.
USPTO Notice of Allowance dated Jan. 9, 2012 for copending U.S. Appl. No. 12/975,482.
USPTO Office Action dated Jan. 30, 2012 for copending U.S. Appl. No. 12/975,443.
USPTO Office Action dated Nov. 10, 2011 for copending U.S. Appl. No. 12/975,484.
USPTO Notice of Allowance dated Apr. 18, 2012 for copending U.S. Appl. No. 12/975,484.
U.S. Appl. No. 61/405,306, filed Oct. 21, 2010, Rakesh Kumar Gupta, et al.
U.S. Appl. No. 61/405,312, filed Oct. 21, 2010, Rakesh Kumar Gupta, et al.
U.S. Appl. No. 61/588,744, filed Nov. 11, 2011, Clark et al.
U.S. Appl. No. 61/592,854, filed Jan. 31, 2012, Parker et al.
U.S. Appl. No. 61/592,867, filed Jan. 31, 2012, Parker et al.
U.S. Appl. No. 61/592,876, filed Jan. 31, 2012, Parker et al.
U.S. Appl. No. 61/592,917, filed Jan. 31, 2012, Parker et al.
U.S. Appl. No. 61/592,974, filed Jan. 31, 2012, Parker et al.
New copending U.S. Appl. No. 13/273,692, filed Oct. 14, 2011, Rakesh Kumar Gupta, et al.
New copending U.S. Appl. No. 13/273,648, filed Oct. 14, 2011, Rakesh Kumar Gupta, et al.
New copending U.S. Appl. No. 13/273,710, filed Oct. 14, 2011, Rakesh Kumar Gupta, et al.
New copending U.S. Appl. No. 13/273,720, filed Oct. 14, 2011, Rakesh Kumar Gupta, et al.
New copending U.S. Appl. No. 13/273,929, filed Oct. 14, 2011, Rakesh Kumar Gupta, et al.
New copending U.S. Appl. No. 13/273,937, filed Oct. 14, 2011, Rakesh Kumar Gupta, et al.
New copending U.S. Appl. No. 13/273,727, filed Oct. 14, 2011, Rakesh Kumar Gupta, et al.
New copending U.S. Appl. No. 13/273,737, filed Oct. 14, 2011, Rakesh Kumar Gupta, et al.
New copending U.S. Appl. No. 13/273,745, filed Oct. 14, 2011, Rakesh Kumar Gupta, et al.
New copending U.S. Appl. No. 13/273,749, filed Oct. 14, 2011, Rakesh Kumar Gupta, et al.
New copending U.S. Appl. No. 13/433,812, filed Mar. 29, 2012, Clark et al.
New copending U.S. Appl. No. 13/433,854, filed Mar. 29, 2012, Clark et al.
Investigation of the utility of islands-in-the-stream bicomponent fiber technology in the spunbound process. Fedorova, Dec. 2006 (retrieved on Mar. 20, 2012 from internet) pp. 22-23, 74 <URL: http://repository.lib.ncsu.edu/ir/bitstream/1840.16/5145/1/etd.pdf>.
"Choosing the Proper Short Cut Fiber", technical data sheet, MiniFibers, Inc., [online] pp. 1-2, 2006, [retrieved on Feb. 15, 2006], Retrieved from the Inernet: <URL: htts://www.minifibers.com/Literature/choosing_fiber.htm>.
USPTO Notice of Allowance dated Feb. 7, 2012 for copending U.S. Appl. No. 12/975,459.
USPTO Notice of Allowance dated Feb. 17, 2012 for copending U.S. Appl. No. 12/982,001.
USPTO Notice of Allowance dated Feb. 21, 2012 for copending U.S. Appl. No. 12/975,450.
USPTO Notice of Allowance dated Feb. 23, 2012 for copending U.S. Appl. No. 13/053,615.
USPTO Office Action dated Nov. 10, 2011 for copending U.S. Appl. No. 12/975,447.
USPTO Office Action dated Mar. 2, 2012 for copending U.S. Appl. No. 12/966,518.
Keith, James M., "Dispersions fo Synthetic Fibers in Wet-Lay Nonwovens". MiniFIBERS, Inc., originally published in the Tappi Journal, vol. 77, No. 6, Jun. 1994, entire document.
USPTO Office Action dated Jan. 25, 2008 for copending U.S. Appl. No. 11/343,955.
USPTO Office Action dated Oct. 10, 2008 for copending U.S. Appl. No. 11/343,955.
USPTO Notice of Allowance dated Mar. 9, 2009 for copending U.S. Appl. No. 11/343,955.
USPTO Notice of Allowance dated Aug. 7, 2009 for copending U.S. Appl. No. 11/343,955.
Copending U.S. Appl. No. 11/648,955, filed Jan. 3, 2007, Rakesh Kumar Gupta, et al.
USPTO Office Action dated May 21, 2012 for copending U.S. Appl. No. 12/981,982.
USPTO Office Action dated Oct. 4, 2012 for copending U.S. Appl. No. 13/273,745.
USPTO Office Action dated Nov. 26, 2012 for copending U.S. Appl. No. 13/273,648.
USPTO Office Action dated Nov. 20, 2012 for copending U.S. Appl. No. 13/273,710.
USPTO Office Action dated Nov. 7, 2012 for copending U.S. Appl. No. 13/273,720.
Database WPI Thomson Scientific, London, GB AN2004/520211 XP002639794 & JP 2004/137418 Dated May 13, 2004—abstract.
USPTO Notice of Allowance dated Jun. 4, 2012 for copending U.S. Appl. No. 12/981,960.

(56) References Cited

OTHER PUBLICATIONS

USPTO Notice of Allowance dated Jun. 7, 2012 for copending U.S. Appl. No. 12/966,487.
USPTO Notice of Allowance dated Jun. 11, 2012 for copending U.S. Appl. No. 12/966,512.
USPTO Notice of Allowance dated Jun. 13, 2012 for copending U.S. Appl. No. 12/966,502.
USPTO Notice of Allowance dated Jun. 29, 2012 for copending U.S. Appl. No. 12/981,950.
USPTO Notice of Allowance dated Jul. 3, 2012 for copending U.S. Appl. No. 12/974,452.
USPTO Office Action dated Jul. 5, 2012 for copending U.S. Appl. No. 12/966,507.
USPTO Notice of Allowance dated Jul. 6, 2012 for copending U.S. Appl. No. 12/975,456.
USPTO Notice of Allowance dated Jul. 27, 2012 for copending U.S. Appl. No. 12/981,982.
USPTO Office Action dated Aug. 14, 2012 for copending U.S. Appl. No. 12/199,304.
USPTO Notice of Allowance dated Jul. 19, 2012 for copending U.S. Appl. No. 12/981,950.
USPTO Notice of Allowance dated Aug. 10, 2012 for copending U.S. Appl. No. 12/975,487.
USPTO Notice of Allowance dated Jul. 31, 2012 for copending U.S. Appl. No. 12/975,456.
USPTO Office Action dated Aug. 27, 2012 for copending U.S. Appl. No. 12/975,443.
USPTO Office Action dated Aug. 28, 2012 for copending U.S. Appl. No. 12/975,447.
USPTO Notice of Allowance dated Oct. 11, 2012 for copending U.S. Appl. No. 12/975,487.
USPTO Notice of Allowance dated Oct. 22, 2012 for copending U.S. Appl. No. 12/966,518.
USPTO Notice of Allowance dated Nov. 2, 2012 for copending U.S. Appl. No. 12/966,507.
USPTO Office Action dated Nov. 2, 2012 for copending U.S. Appl. No. 13/273,692.
New co-pending U.S. Appl. No. 13/671,682, filed Nov. 8, 2012.
New co-pending U.S. Appl. No. 13/687,466, filed Nov. 28, 2012.
New co-pending U.S. Appl. No. 13/687,472, filed Nov. 28, 2012.
New co-pending U.S. Appl. No. 13/687,478, filed Nov. 28, 2012.
New co-pending U.S. Appl. No. 13/687,493, filed Nov. 28, 2012.
New co-pending U.S. Appl. No. 13/687,505, filed Nov. 28, 2012.
USPTO Office Action dated Dec. 4, 2012 for copending U.S. Appl. No. 13/273,749.
USPTO Notice of Allowance dated Dec. 10, 2012 for copending U.S. Appl. No. 12/966,521.
USPTO Notice of Allowance dated Jan. 8, 2013 for copending U.S. Appl. No. 12/966,483.
USPTO Notice of Allowance dated Jan. 10, 2013 for copending U.S. Appl. No. 12/975,447.
USPTO Notice of Allowance dated Jan. 15, 2013 for copending U.S. Appl. No. 12/975,463.
PCT International Search Report dated Jan. 23, 2013 for International Application No. PCT/US2012/064272.
USPTO Notice of Allowance dated Jan. 25, 2013 for copending U.S. Appl. No. 12/966,521.
USPTO Notice of Allowance dated Jan. 28, 2013 for copending U.S. Appl. No. 12/765,461.
USPTO Notice of Allowance dated Mar. 21, 2013 for copending U.S. Appl. No. 12/975,482.
USPTO Notice of Allowance dated Mar. 22, 2013 for copending U.S. Appl. No. 12/966,518.
PCT International Search Report dated Mar. 29, 2013 for International Application No. PCT/US2013/022830.
PCT International Search Report dated Mar. 27, 2013 for International Application No. PCT/US2013/022832.
PCT International Search Report dated Mar. 27, 2013 for International Application No. PCT/US2013/022834.
PCT International Search Report dated Mar. 27, 2013 for International Application No. PCT/US2013/022835.
PCT International Search Report dated Mar. 27, 2013 for International Application No. PCT/US2013/022838.
USPTO Notice of Allowance dated Mar. 28, 2013 for copending U.S. Appl. No. 12/966,521.
PCT International Search Report dated Mar. 29, 2013 for International Application No. PCT/US2013/021804.
USPTO Notice of Allowance dated Apr. 8, 2013 for copending U.S. Appl. No. 12/966,483.
USPTO Notice of Allowance dated Apr. 16, 2013 for copending U.S. Appl. No. 12/765,461.
USPTO Notice of Allowance dated Apr. 24, 2013 for copending U.S. Appl. No. 12/199,304.
USPTO Notice of Allowance dated May 1, 2013 for copending U.S. Appl. No. 12/975,482.
CFF Acrylic Pulps/Fibrillated Fibers, Datasheet [Online], Sterling Fibers, Feb. 7, 2011 [retrieved Mar. 4, 2013], <url: http://www.sterlingfibers.com/wetlaid.htm>.
USPTO Office Action dated Jul. 19, 2013 for copending U.S. Appl. No. 12/909,574.
New co-pending U.S. Appl. No. 13/941,816, filed Jul. 15, 2013.
USPTO Office Action dated Jul. 19, 2013 for copending U.S. Appl. No. 13/433,854.
USPTO Office Action dated Jul. 22, 2013 for copending U.S. Appl. No. 13/433,812.
USPTO Office Action dated Jul. 30, 2013 for copending U.S. Appl. No. 13/273,749.
USPTO Office Action dated Aug. 19, 2013 for copending U.S. Appl. No. 13/273,745.
Pettersson, Patrick, "Fluid Flow in Wood Fiber Networks," Lulea University of Technology, 2006:34, ISSN: 1402-1757.
USPTO Notice of Allowance dated Sep. 5, 2013 for copending U.S. Appl. No. 12/966,507.
USPTO Office Action dated Sep. 6, 2013 for copending U.S. Appl. No. 12/966,494.
USPTO Office Action dated Sep. 20, 2013 for copending U.S. Appl. No. 13/687,472.
USPTO Office Action dated Sep. 20, 2013 for copending U.S. Appl. No. 13/687,478.
USPTO Office Action dated Sep. 20, 2013 for copending U.S. Appl. No. 13/687,505.
USPTO Office Action dated Sep. 24, 2013 for copending U.S. Appl. No. 13/687,466.
USPTO Office Action dated Sep. 25, 2013 for copending U.S. Appl. No. 13/273,692.
USPTO Office Action dated Sep. 25, 2013 for copending U.S. Appl. No. 13/273,648.
USPTO Office Action dated Sep. 25, 2013 for copending U.S. Appl. No. 13/687,493.
USPTO Office Action dated Oct. 9, 2013 for copending U.S. Appl. No. 13/944,458.
USPTO Office Action dated Dec. 3, 2013 for copending U.S. Appl. No. 13/273,937.
USPTO Notice of Allowance dated Dec. 4, 2013 for copending U.S. Appl. No. 12/975,484.
USPTO Office Action dated Dec. 31, 2013 for copending U.S. Appl. No. 13/352,362.
USPTO Notice of Allowance dated Feb. 4, 2014 for copending U.S. Appl. No. 12/975,484.
USPTO Office Action dated Feb. 10, 2014 for copending U.S. Appl. No. 13/433,854.
Extended European Search Report dated Feb. 25, 2014 for Application No./Patent No. 11835114.7-1303 / 2630297 PCT/US2011056997.
USPTO Office Action dated Mar. 7, 2014 for copending U.S. Appl. No. 12/966,494.
USPTO Office Action dated Mar. 13, 2014 for copending U.S. Appl. No. 12/909,574.
USPTO Office Action dated Mar. 25, 2014 for copending U.S. Appl. No. 13/273,727.
New Co-pending U.S. Appl. No. 14/249,858, filed Apr. 10, 2014.
New Co-pending U.S. Appl. No. 14/249,868, filed Apr. 10, 2014.

(56) References Cited

OTHER PUBLICATIONS

USPTO Office Action dated Oct. 26, 2015 for co-pending U.S. Appl. No. 14/108,390.
USPTO Office Action dated Nov. 2, 2015 for co-pending U.S. Appl. No. 12/909,574.
USPTO Notice of Allowance dated Nov. 13, 2015 for co-pending U.S. Appl. No. 13/273,937.
USPTO Notice of Allowance dated Feb. 18, 2016 for co-pending U.S. Appl. No. 14/249,858.
USPTO Office Action dated Mar. 17, 2016 for co-pending U.S. Appl. No. 13/352,362.
USPTO Office Action dated Mar. 28, 2016 for co-pending U.S. Appl. No. 13/273,929.
USPTO Office Action dated Mar. 30, 2016 for co-pending U.S. Appl. No. 13/273,737.
USPTO Office Action dated Apr. 12, 2016 for co-pending U.S. Appl. No. 14/249,868.
USPTO Office Action dated May 25, 2016 for co-pending U.S. Appl. No. 14/108,390.
USPTO Office Action dated Jun. 13, 2016 for co-pending U.S. Appl. No. 13/433,854.
USPTO Office Action dated Aug. 26, 2016 for co-pending U.S. Appl. No. 13/273,648.
USPTO Office Action dated Aug. 26, 2016 for co-pending U.S. Appl. No. 13/273,692.

* cited by examiner

ULTRAFILTRATION PROCESS FOR PRODUCING A SULFOPOLYESTER CONCENTRATE

FIELD OF THE INVENTION

The present invention pertains to a process for recovering a primary polymer concentrate comprising sulfopolyester from a second mother liquor stream generated from a short-cut microfiber process. The invention also pertains to the recovery of sulfopolyester polymer from the primary polymer concentrate and the use of the recovered sulfopolyester to produce articles.

BACKGROUND OF THE INVENTION

Fibers, melt blown webs and other melt spun fibrous articles have been made from thermoplastic polymers, such as poly(propylene), polyamides, and polyesters. One common application of these fibers and fibrous articles are nonwoven fabrics and, in particular, in personal care products such as wipes, feminine hygiene products, baby diapers, adult incontinence briefs, hospital/surgical and other medical disposables, protective fabrics and layers, geotextiles, industrial wipes, and filter media. Unfortunately, the personal care products made from conventional thermoplastic polymers are difficult to dispose of and are usually placed in landfills. One promising alternative method of disposal is to make these products or their components "flushable", i.e., compatible with public sewerage systems. The use of water-dispersible or water-soluble materials also improves recyclability and reclamation of personal care products. The various thermoplastic polymers now used in personal care products are not inherently water-dispersible or soluble and, hence, do not produce articles that readily disintegrate and can be disposed of in a sewerage system or recycled easily.

The desirability of flushable personal care products has resulted in a need for fibers, nonwovens, and other fibrous articles with various degrees of water-responsivity. Various approaches to addressing these needs have been described, for example, in U.S. Pat. Nos. 6,548,592; 6,552,162; 5,281, 306; 5,292,581; 5,935,880; and 5,509,913; U.S. patent application Ser. Nos. 09/775,312; and 09/752,017; and PCT International Publication No. WO 01/66666 A2. These approaches, however, suffer from a number of disadvantages and do not provide a fibrous article, such as a fiber or nonwoven fabric, that possesses a satisfactory balance of performance properties, such as tensile strength, absorptivity, flexibility, and fabric integrity under both wet or dry conditions.

For example, typical nonwoven technology is based on the multidirectional deposition of fibers that are treated with a resin binding adhesive to form a web having strong integrity and other desirable properties. The resulting assemblies, however, generally have poor water-responsivity and are not suitable for flushable applications. The presence of binder also may result in undesirable properties in the final product, such as reduced sheet wettability, increased stiffness, stickiness, and higher production costs. It is also difficult to produce a binder that will exhibit adequate wet strength during use and yet disperse quickly upon disposal. Thus, nonwoven assemblies using these binders may either disintegrate slowly under ambient conditions or have less than adequate wet strength properties in the presence of body fluids. To address this problem, pH and ion-sensitive water-dispersible binders, such as lattices containing acrylic or methacrylic acid with or without added salts, are known and described, for example, in U.S. Pat. No. 6,548,592 B1. Ion concentrations and pH levels in public sewerage and residential septic systems, however, can vary widely among geographical locations and may not be sufficient for the binder to become soluble and disperse. In this case, the fibrous articles will not disintegrate after disposal and can clog drains or sewer laterals.

Multicomponent fibers containing a water-dispersible component and a thermoplastic water non-dispersible component have been described, for example, in U.S. Pat. Nos. 5,916,678; 5,405,698; 4,966,808; 5,525,282; 5,366,804; 5,486,418. For example, these multicomponent fibers may be a bicomponent fiber having a shaped or engineered transverse cross section such as, for example, an islands-in-the-sea, sheath core, side-by-side, or segmented pie configuration. The multicomponent fiber can be subjected to water or a dilute alkaline solution where the water-dispersible component is dissolved away to leave the water non-dispersible component behind as separate, independent fibers of extremely small fineness. Polymers which have good water dispersibility, however, often impart tackiness to the resulting multicomponent fibers, which causes the fiber to stick together, block, or fuse during winding or storage after several days, especially under hot, humid conditions. To prevent fusing, often a fatty acid or oil-based finish is applied to the surface of the fiber. In addition, large proportions of pigments or fillers are sometimes added to water dispersible polymers to prevent fusing of the fibers as described, for example, in U.S. Pat. No. 6,171,685. Such oil finishes, pigments, and fillers require additional processing steps and can impart undesirable properties to the final fiber. Many water-dispersible polymers also require alkaline solutions for their removal which can cause degradation of the other polymer components of the fiber such as, for example, reduction of inherent viscosity, tenacity, and melt strength. Further, some water-dispersible polymers can not withstand exposure to water during hydroentanglement and, thus, are not suitable for the manufacture of nonwoven webs and fabrics.

Alternatively, the water-dispersible component may serve as a bonding agent for the thermoplastic fibers in nonwoven webs. Upon exposure to water, the fiber to fiber bonds come apart such that the nonwoven web loses its integrity and breaks down into individual fibers. The thermoplastic fiber components of these nonwoven webs, however, are not water-dispersible and remain present in the aqueous medium and, thus, must eventually be removed from municipal wastewater treatment plants. Hydroentanglement may be used to produce disintegratable nonwoven fabrics without or with very low levels (<5 weight %) of added binder to hold the fibers together. Although these fabrics may disintegrate upon disposal, they often utilize fibers that are not water soluble or water-dispersible and may result in entanglement and plugging within sewer systems. Any added water-dispersible binders also must be minimally affected by hydroentangling and not form gelatinous buildup or cross-link, and thereby contribute to fabric handling or sewer related problems.

A few water-soluble or water-dispersible polymers are available, but are generally not applicable to melt blown fiber forming operations or melt spinning in general. Polymers, such as polyvinyl alcohol, polyvinyl pyrrolidone, and polyacrylic acid are not melt processable as a result of thermal decomposition that occurs at temperatures below the point where a suitable melt viscosity is attained. High molecular weight polyethylene oxide may have suitable thermal stability, but would provide a high viscosity solution at the polymer interface resulting in a slow rate of disintegration. Water-dispersible sulfopolyesters have been described, for example, in U.S. Pat. Nos. 6,171,685; 5,543,488; 5,853,701; 4,304,901; 6,211,309; 5,570,605; 6,428,900; and 3,779,993. Typical sulfopolyesters, however, are low molecular weight thermoplastics that are brittle and lack the flexibility to withstand a winding operation to yield a roll of material that does not fracture or crumble. Sulfopolyesters also can exhibit blocking or fusing during processing into film or fibers, which may require the use of oil finishes or large amounts of pigments or fillers to avoid. Low molecular weight polyethylene oxide (more commonly known as polyethylene glycol) is a weak/brittle polymer that also does not have the required physical properties for fiber applications. Forming fibers from known water-soluble polymers via solution techniques is an alternative, but the added complexity of removing solvent, especially water, increases manufacturing costs.

Accordingly, there is a need for a water-dispersible fiber and fibrous articles prepared therefrom that exhibit adequate tensile strength, absorptivity, flexibility, and fabric integrity in the presence of moisture, especially upon exposure to human bodily fluids. In addition, a fibrous article is needed that does not require a binder and completely disperses or dissolves in residential or municipal sewerage systems. Potential uses include, but are not limited to, melt blown webs, spunbond fabrics, hydroentangled fabrics, wet-laid nonwovens, dry-laid non-wovens, bicomponent fiber components, adhesive promoting layers, binders for cellulosics, flushable nonwovens and films, dissolvable binder fibers, protective layers, and carriers for active ingredients to be released or dissolved in water. There is also a need for multicomponent fiber having a water-dispersible component that does not exhibit excessive blocking or fusing of filaments during spinning operations, is easily removed by hot water at neutral or slightly acidic pH, and is suitable for hydroentangling processes to manufacture nonwoven fabrics. These multicomponent fibers can be utilized to produce microfibers that can be used to produce various articles. Other extrudable and melt spun fibrous materials are also possible.

The process for producing microfibers produces a second mother liquor stream comprising sulfopolyester and water. The sulfopolyester in the second mother liquor stream is at low concentrations. In most industrial processes, the sulfopolyester present in the second mother liquor stream has been considered to be of little economic value and is typically discarded. There is a need in the industry for an efficient and economical process to concentrate the sulfopolyester to produce a primary polymer concentrate and/or a melted polymer stream such that it can be utilized for other purposes.

SUMMARY OF THE INVENTION

In one embodiment of the invention, a process for recovering a primary polymer concentrate stream is provided. The process comprises:

(A) contacting cut multicomponent fibers having a length of less than 25 millimeters with a treated aqueous stream in a fiber slurry zone to produce a cut multicomponent fiber slurry; wherein the cut multicomponent fibers comprise at least one water dispersible sulfopolyester and at least one water non-dispersible synthetic polymer immiscible with the water dispersible sulfopolyester; and wherein the treated aqueous stream is at a temperature of less than 40° C.;

(B) contacting the cut multicomponent fiber slurry with a heated aqueous stream in a mix zone to produce a heated multicomponent fiber slurry;

(C) routing the heated multicomponent fiber slurry to a fiber opening zone to remove a portion of the water dispersible sulfopolyester to produce an opened microfiber slurry;

(D) routing the opened microfiber slurry to a primary solid liquid separation zone to produce the microfiber product stream and a first mother liquor stream; wherein the first mother liquor stream comprises water and the water dispersible sulfopolyester;

(E) routing at least a portion of the first mother liquor stream to a second solid liquid separation zone to produce a secondary wet cake stream and a second mother liquor stream; wherein the second mother liquor stream comprises water and water dispersible sulfopolyester; and wherein the secondary wet cake stream comprises microfiber; and (F) routing the second mother liquor stream to a primary concentration zone to remove water from the second mother liquor stream to produce the primary polymer concentrate stream and a primary recovered water stream; wherein the primary concentration zone comprises at least one ultrafiltration membrane.

DETAILED DESCRIPTION

Figure 1A:
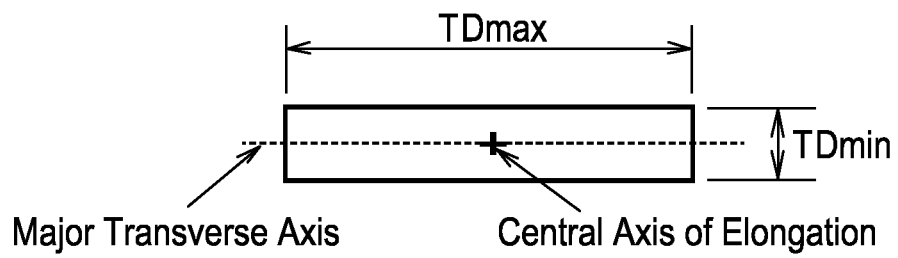
FIGS. 1a, 1b, and 1c are cross-sectional views of three differently-configured fibers, particularly illustrating how various measurements relating to the size and shape of the fibers are determined.

The present invention provides water-dispersible fibers and fibrous articles that show tensile strength, absorptivity, flexibility, and fabric integrity in the presence of moisture, especially upon exposure to human bodily fluids. The fibers and fibrous articles of our invention do not require the presence of oil, wax, or fatty acid finishes or the use of large amounts (typically 10 weight % or greater) of pigments or fillers to prevent blocking or fusing of the fibers during processing. In addition, the fibrous articles prepared from our novel fibers do not require a binder and readily disperse or dissolve in home or public sewerage systems.

In a general embodiment, our invention provides a water-dispersible fiber comprising a sulfopolyester having a glass transition temperature (Tg) of at least 25° C., wherein the sulfopolyester comprises:

(A) residues of one or more dicarboxylic acids;

(B) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;

(C) one or more diol residues wherein at least 25 mole %, based on the total diol residues, is a poly(ethylene glycol) having a structure

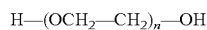

wherein n is an integer in the range of 2 to about 500; and 0 to about 25 mole %, based on the total repeating units, of residues of a branching monomer having 3 or more functional groups wherein the functional groups are hydroxyl, carboxyl, or a combination thereof. Our fiber may optionally include a water-dispersible polymer blended with the sulfopolyester and, optionally, a water non-dispersible polymer blended with the sulfopolyester with the proviso that the blend is an immiscible blend. Our fiber contains less than 10 weight % of a pigment or filler, based on the total weight of the fiber. The present invention also includes fibrous articles comprising these fibers and may include personal care products such as wipes, gauze, tissue, diapers, adult incontinence briefs, training pants, sanitary napkins, bandages, and surgical dressings. The fibrous articles may have one or more absorbent layers of fibers.

The fibers of our invention may be unicomponent fibers, bicomponent or multicomponent fibers. For example, the fibers of the present invention may be prepared by melt spinning a single sulfopolyester or sulfopolyester blend and include staple, monofilament, and multifilament fibers with a shaped cross-section. In addition, our invention provides multicomponent fibers, such as described, for example, in U.S. Pat. No. 5,916,678, which may be prepared by extruding the sulfopolyester and one or more water non-dispersible polymers, which are immiscible with the sulfopolyester, separately through a spinneret having a shaped or engineered transverse geometry such as, for example, an "islands-in-the-sea", sheath-core, side-by-side, ribbon (stripped), or segmented pie configuration. The sulfopolyester may be later removed by dissolving the interfacial layers or pie segments and leaving the smaller filaments or microdenier fibers of the water non-dispersible polymer(s).

These fibers of the water non-dispersible polymer have fiber size much smaller than the multicomponent fiber before removing the sulfopolyester. For example, the sulfopolyester and water non-dispersible polymers may be fed to a polymer distribution system where the polymers are introduced into a segmented spinneret plate. The polymers follow separate paths to the fiber spinneret and are combined at the spinneret hole which comprises either two concentric circular holes thus providing a sheath-core type fiber, or a circular spinneret hole divided along a diameter into multiple parts to provide a fiber having a side-by-side type. Alternatively, the immiscible water dispersible sulfopolyester and water non-dispersible polymers may be introduced separately into a spinneret having a plurality of radial channels to produce a multicomponent fiber having a segmented pie cross section. Typically, the sulfopolyester will form the "sheath" component of a sheath core configuration. In fiber cross sections having a plurality of segments, the water non-dispersible segments, typically, are substantially isolated from each other by the sulfopolyester. Alternatively, multicomponent fibers may be formed by melting the sulfopolyester and water non-dispersible polymers in separate extruders and directing the polymer flows into one spinneret with a plurality of distribution flow paths in form of small thin tubes or segments to provide a fiber having an islands-in-the-sea shaped cross section. An example of such a spinneret is described in U.S. Pat. No. 5,366,804. In the present invention, typically, the sulfopolyester will form the "sea" component and the water non-dispersible polymer will form the "islands" component.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "C1 to C5 hydrocarbons", is intended to specifically include and disclose C1 and C5 hydrocarbons as well as C2, C3, and C4 hydrocarbons.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The unicomponent fibers and fibrous articles produced from the unicomponent fibers of the present invention are water-dispersible and, typically, completely disperse at room temperature. Higher water temperatures can be used to accelerate their dispersibility or rate of removal from the nonwoven or multicomponent fiber. The term "water-dispersible", as used herein with respect to unicomponent fibers and fibrous articles prepared from unicomponent fibers, is intended to be synonymous with the terms "water-dissipatable", "water-disintegratable", "water-dissolvable", "water-dispellable", "water soluble", "water-removable", "hydrosoluble", and "hydrodispersible" and is intended to mean that the fiber or fibrous article is therein or therethrough dispersed or dissolved by the action of water. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, the fiber or fibrous article dissolves, disintegrates, or separates into a plurality of incoherent pieces or particles distributed more or less throughout the medium such that no recognizable filaments are recoverable from the medium upon removal of the water, for example, by filtration or evaporation. Thus, "water-dispersible", as used herein, is not intended to include the simple disintegration of an assembly of entangled or bound, but otherwise water insoluble or nondispersible, fibers wherein the fiber assembly simply breaks apart in water to produce a slurry of fibers in water which could be recovered by removal of the water. In the context of this invention, all of these terms refer to the activity of water or a mixture of water and a water-miscible cosolvent on the sulfopolyesters described herein. Examples of such water-miscible cosolvents includes alcohols, ketones, glycol ethers, esters and the like. It is intended for this terminology to include conditions where the sulfopolyester is dissolved to form a true solution as well as those where the sulfopolyester is dispersed within the aqueous medium. Often, due to the statistical nature of sulfopolyester compositions, it is possible to have a soluble fraction and a dispersed fraction when a single sulfopolyester sample is placed in an aqueous medium.

Similarly, the term "water-dispersible", as used herein in reference to the sulfopolyester as one component of a multicomponent fiber or fibrous article, also is intended to be synonymous with the terms "water-dissipatable", "water-disintegratable", "water-dissolvable", "water-dispellable", "water soluble", "water-removable", "hydrosoluble", and "hydrodispersible" and is intended to mean that the sulfopolyester component is sufficiently removed from the multicomponent fiber and is dispersed or dissolved by the action of water to enable the release and separation of the water non-dispersible fibers contained therein. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, sulfopolyester component dissolves, disintegrates, or separates from the multicomponent fiber, leaving behind a plurality of microdenier fibers from the water non-dispersible segments.

The term "segment" or "domain" or "zone" when used to describe the shaped cross section of a multicomponent fiber refers to the area within the cross section comprising the water non-dispersible polymers where these domains or segments are substantially isolated from each other by the water-dispersible sulfopolyester intervening between the segments or domains. The term "substantially isolated", as used herein, is intended to mean that the segments or domains are set apart from each other to permit the segments domains to form individual fibers upon removal of the sulfopolyester. Segments or domains or zones can be of similar size and shape or varying size and shape. Again, segments or domains or zones can be arranged in any configuration. These segments or domains or zones are "substantially continuous" along the length of the multicomponent extrudate or fiber. The term "substantially continuous" means continuous along at least 10 cm length of the multicomponent fiber. These segments, domains, or zones of the multicomponent fiber produce water non-dispersible polymer microfibers when the water dispersible sulfopolyester is removed.

As stated within this disclosure, the shaped cross section of a multicomponent fiber can, for example, be in the form of a sheath core, islands-in-the sea, segmented pie, hollow segmented pie; off-centered segmented pie, side-by-side, ribbon (stripped) etc.

The water-dispersible fiber of the present invention is prepared from polyesters or, more specifically sulfopolyesters, comprising dicarboxylic acid monomer residues, sulfomonomer residues, diol monomer residues, and repeating units. The sulfomonomer may be a dicarboxylic acid, a diol, or hydroxycarboxylic acid. Thus, the term "monomer residue", as used herein, means a residue of a dicarboxylic acid, a diol, or a hydroxycarboxylic acid. A "repeating unit", as used herein, means an organic structure having 2 monomer residues bonded through a carbonyloxy group. The sulfopolyesters of the present invention contain substantially equal molar proportions of acid residues (100 mole %) and diol residues (100 mole %) which react in substantially equal proportions such that the total moles of repeating units is equal to 100 mole %. The mole % ages provided in the present disclosure, therefore, may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that the sulfopolyester contains 30 mole % sulfomonomer out of a total of 100 mole % repeating units. Thus, there are 30 moles of sulfomonomer residues among every 100 moles of repeating units. Similarly, a sulfopolyester containing 30 mole % of a dicarboxylic acid sulfomonomer, based on the total acid residues, means the sulfopolyester contains 30 mole % sulfomonomer out of a total of 100 mole % acid residues. Thus, in this latter case, there are 30 moles of sulfomonomer residues among every 100 moles of acid residues.

The sulfopolyesters described herein have an inherent viscosity, abbreviated hereinafter as "Ih.V.", of at least about 0.1 dL/g, preferably about 0.2 to 0.3 dL/g, and most preferably greater than about 0.3 dL/g, measured in a 60/40 parts by weight solution of phenol/tetrachloroethane solvent at 25° C. and at a concentration of about 0.5 g of sulfopolyester in 100 mL of solvent. The term "polyester", as used herein, encompasses both "homopolyesters" and "copolyesters" and means a synthetic polymer prepared by the polycondensation of difunctional carboxylic acids with difunctional hydroxyl compound. As used herein, the term "sulfopolyester" means any polyester comprising a sulfomonomer. Typically the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be a aromatic nucleus bearing 2 hydroxy substituents such as, for example, hydroquinone. The term "residue", as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present invention includes one or more dicarboxylic acid residues. Depending on the type and concentration of the sulfomonomer, the dicarboxylic acid residue may comprise from about 60 to about 100 mole % of the acid residues. Other examples of concentration ranges of dicarboxylic acid residues are from about 60 mole % to about 95 mole %, and about 70 mole % to about 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include, but are not limited to, succinic; glutaric; adipic; azelaic; sebacic; fumaric; maleic; itaconic; 1,3-cyclohexanedicarboxylic; 1,4-cyclohexanedicarboxylic; diglycolic; 2,5-norbornane-dicarboxylic; phthalic; terephthalic; 1,4-naphthalenedicarboxylic; 2,5-naphthalenedicarboxylic; diphenic; 4,4'-oxydibenzoic; 4,4'-sulfonyidibenzoic; and isophthalic. The preferred dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexane-dicarboxylate with the residues of isophthalic and terephthalic acid being especially preferred. Although the dicarboxylic acid methyl ester is the most preferred embodiment, it is also acceptable to include higher order alkyl esters, such as ethyl, propyl, isopropyl, butyl, and so forth. In addition, aromatic esters, particularly phenyl, also may be employed.

The sulfopolyester includes about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof. Additional examples of concentration ranges for the sulfomonomer residues are about 4 to about 35 mole %, about 8 to about 30 mole %, and about 8 to about 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to a salt of a sulfonic acid having the structure "—SO$_3$M" wherein M is the cation of the sulfonate salt. The cation of the sulfonate salt may be a metal ion such as Li$^+$, Na$^+$, K$^+$, Mg$^{++}$, Ca$^{++}$, Ni$^{++}$, Fe$^{++}$, and the like. Alternatively, the cation of the sulfonate salt may be nonmetallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this invention for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomers residues include monomer residues where the sulfonate salt group is attached to an aromatic acid nucleus, such as, for example, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present invention are the metal sulfonate salt of sulfophthalic acid, sulfoterephthalic acid, sulfoisophthalic acid, or combinations thereof. Other examples of sulfomonomers which may be used are 5-sod iosulfoisophthalic acid and esters thereof. If the sulfomonomer residue is from 5-sodiosulfoisophthalic acid, typical sulfomonomer concentration ranges are about 4 to about 35 mole %, about 8 to about 30 mole %, and about 8 to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and means any dihydric alcohol. Examples of diols include, but are not limited to, ethylene glycol; diethylene glycol; triethylene glycol; polyethylene glycols; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propane-diol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol, or combinations of one or more of these glycols.

The diol residues may include from about 25 mole % to about 100 mole %, based on the total diol residues, of residue of a poly(ethylene glycol) having a structure

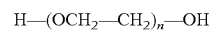

H—(OCH$_2$—CH$_2$)$_n$—OH wherein n is an integer in the range of 2 to about 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. Higher molecular weight polyethylene glycols (abbreviated herein as "PEG"), wherein n is from 7 to about 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to about 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 may constitute up to 10 mole % of the total diol, while a PEG having a molecular weight of 10,000 would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is carried out under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present invention may include from 0 to about 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 to about 20 mole % and from 0 to about 10 mole %. The presence of a branching monomer may result in a number of possible benefits to the sulfopolyester of the present invention, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

The sulfopolyester used for the fiber of the present invention has a glass transition temperature, abbreviated herein as "Tg", of at least 25° C. as measured on the dry polymer using standard techniques, such as differential scanning calorimetry ("DSC"), well known to persons skilled in the art. The Tg measurements of the sulfopolyesters of the present invention are conducted using a "dry polymer", that is, a polymer sample in which adventitious or absorbed water is driven off by heating to polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

Our novel fibers may consist essentially of or, consist of, the sulfopolyesters described hereinabove. In another embodiment, however, the sulfopolyesters of this invention may be a single polyester or may be blended with one or more supplemental polymers to modify the properties of the resulting fiber. The supplemental polymer may or may not be water-dispersible depending on the application and may be miscible or immiscible with the sulfopolyester. If the supplemental polymer is water non-dispersible, it is preferred that the blend with the sulfopolyester is immiscible. The term "miscible", as used herein, is intended to mean that the blend has a single, homogeneous amorphous phase as indicated by a single composition-dependent Tg. For example, a first polymer that is miscible with second polymer may be used to "plasticize" the second polymer as illustrated, for example, in U.S. Pat. No. 6,211,309. By contrast, the term "immiscible", as used herein, denotes a blend that shows at least 2, randomly mixed, phases and exhibits more than one Tg. Some polymers may be immiscible and yet compatible with the sulfopolyester. A further general description of miscible and immiscible polymer blends and the various analytical techniques for their characterization may be found in Polymer Blends Volumes 1 and 2, Edited by D. R. Paul and C. B. Bucknall, 2000, John Wiley & Sons, Inc.

Non-limiting examples of water-dispersible polymers that may be blended with the sulfopolyester are polymethacrylic acid, polyvinyl pyrrolidone, polyethylene-acrylic acid copolymers, polyvinyl methyl ether, polyvinyl alcohol, polyethylene oxide, hydroxy propyl cellulose, hydroxypropyl methyl cellulose, methyl cellulose, ethyl hydroxyethyl cellulose, isopropyl cellulose, methyl ether starch, polyacrylamides, poly(N-vinyl caprolactam), polyethyl oxazoline, poly(2-isopropyl-2-oxazoline), polyvinyl methyl oxazolidone, water-dispersible sulfopolyesters, polyvinyl methyl oxazolidimone, poly(2,4-dimethyl-6-triazinylethylene), and ethylene oxide-propylene oxide copolymers. Examples of polymers which are water non-dispersible that may be blended with the sulfopolyester include, but are not limited to, polyolefins, such as homo- and copolymers of polyethylene and polypropylene; poly(ethylene terephthalate); poly (butylene terephthalate); and polyamides, such as nylon-6; polylactides; caprolactone; Eastar Bio® (poly(tetramethylene adipate-co-terephthalate), a product of Eastman Chemical Company); polycarbonate; polyurethane; and polyvinyl chloride.

According to our invention, blends of more than one sulfopolyester may be used to tailor the end-use properties of the resulting fiber or fibrous article, for example, a nonwoven fabric or web. The blends of one or more sulfopolyesters will have Tg's of at least 25° C. for the water-dispersible, unicomponent fibers and at least 57° C. for the multicomponent fibers. Thus, blending may also be exploited to alter the processing characteristics of a sulfopolyester to facilitate the fabrication of a nonwoven. In another example, an immiscible blend of polypropylene and sulfopolyester may provide a conventional nonwoven web that will break apart and completely disperse in water as true solubility is not needed. In this latter example, the desired performance is related to maintaining the physical properties of the polypropylene while the sulfopolyester is only a spectator during the actual use of the product or, alternatively, the sulfopolyester is fugitive and is removed before the final form of the product is utilized.

The sulfopolyester and supplemental polymer may be blended in batch, semicontinuous, or continuous processes. Small scale batches may be readily prepared in any high-intensity mixing devices well-known to those skilled in the art, such as Banbury mixers, prior to melt-spinning fibers. The components may also be blended in solution in an appropriate solvent. The melt blending method includes blending the sulfopolyester and supplemental polymer at a temperature sufficient to melt the polymers. The blend may be cooled and pelletized for further use or the melt blend can be melt spun directly from this molten blend into fiber form. The term "melt" as used herein includes, but is not limited to, merely softening the polyester. For melt mixing methods generally known in the polymers art, see *Mixing and Compounding of Polymers* (I. Manas-Zloczower & Z. Tadmor editors, Carl Hanser Verlag Publisher, 1994, New York, N.Y.).

Our invention also provides a water-dispersible fiber comprising a sulfopolyester having a glass transition temperature (Tg) of at least 25° C., wherein the sulfopolyester comprises:

(A) about 50 to about 96 mole % of one or more residues of isophthalic acid or terephthalic acid, based on the total acid residues;

(B) about 4 to about 30 mole %, based on the total acid residues, of a residue of sod iosulfoisophthalic acid;

(C) one or more diol residues wherein at least 25 mole %, based on the total diol residues, is a poly(ethylene glycol) having a structure

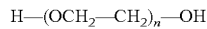

wherein n is an integer in the range of 2 to about 500; (iv) 0 to about 20 mole %, based on the total repeating units, of residues of a branching monomer having 3 or more functional groups wherein the functional groups are hydroxyl, carboxyl, or a combination thereof. As described hereinabove, the fiber may optionally include a first water-dispersible polymer blended with the sulfopolyester; and, optionally, a water non-dispersible polymer blended with the sulfopolyester such that the blend is an immiscible blend. Our fiber may contain less than 10 weight % of a pigment or filler, less than 8 weight %, or less than 6 weight % based on the total weight of the fiber. The first water-dispersible polymer is as described hereinabove. The sulfopolyester should have a glass transition temperature (Tg) of at least 25° C., but may have, for example, a Tg of about 35° C., about 48° C., about 55° C., about 65° C., about 70° C., about 75° C., about 85° C., and about 90° C. The sulfopolyester may contain other concentrations of isophthalic acid residues, for example, about 60 to about 95 mole %, and about 75 to about 95 mole %. Further examples of isophthalic acid residue concentrations ranges are about 70 to about 85 mole %, about 85 to about 95 mole % and about 90 to about 95 mole %. The sulfopolyester also may comprise about 25 to about 95 mole % of the residues of diethylene glycol. Further examples of diethylene glycol residue concentration ranges include about 50 to about 95 mole %, about 70 to about 95 mole %, and about 75 to about 95 mole %. The sulfopolyester also may include the residues of ethylene glycol and/or 1,4-cyclohexanedimethanol, abbreviated herein as "CHDM". Typical concentration ranges of CHDM residues are about 10 to about 75 mole %, about 25 to about 65 mole %, and about 40 to about 60 mole %. Typical concentration ranges of ethylene glycol residues are about 10 to about 75 mole %, about 25 to about 65 mole %, and about 40 to about 60 mole %. In another embodiment, the sulfopolyester comprises is about 75 to about 96 mole % of the residues of isophthalic acid and about 25 to about 95 mole % of the residues of diethylene glycol.

The sulfopolyesters of the instant invention are readily prepared from the appropriate dicarboxylic acids, esters, anhydrides, or salts, sulfomonomer, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the sulfopolyester may deteriorate in appearance if allowed to reside in a reactor at an elevated temperature for too long a duration.

The sulfopolyesters of the present invention are prepared by procedures known to persons skilled in the art. The sulfomonomer is most often added directly to the reaction mixture from which the polymer is made, although other processes are known and may also be employed, for example, as described in U. S. Pat. Nos. 3,018,272, 3,075,952, and 3,033,822. The reaction of the sulfomonomer, diol component and the dicarboxylic acid component may be carried out using conventional polyester polymerization conditions. For example, when preparing the sulfopolyesters by means of an ester interchange reaction, i.e., from the ester form of the dicarboxylic acid components, the reaction process may comprise two steps. In the first step, the diol component and the dicarboxylic acid component, such as, for example, dimethyl isophthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form sulfopolyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reactions of both stages are facilitated by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction mechanism is driven to completion, it is preferred to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of sulfopolyester by direct esterification, i.e., from the acid form of the dicarboxylic acid component, sulfopolyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight, linear or branched sulfopolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The water dispersible, multicomponent, and short cut fibers and fibrous articles made therefrom also may contain other conventional additives and ingredients which do not deleteriously affect their end use. For example, additives such as fillers, surface friction modifiers, light and heat stabilizers, extrusion aids, antistatic agents, colorants, dyes, pigments, fluorescent brighteners, antimicrobials, anticounterfeiting markers, hydrophobic and hydrophilic enhancers, viscosity modifiers, slip agents, tougheners, adhesion promoters, and the like may be used.

The fibers and fibrous articles of our invention do not require the presence of additives such as, for example, pigments, fillers, oils, waxes, or fatty acid finishes, to prevent blocking or fusing of the fibers during processing. The terms "blocking or fusing", as used herein, is understood to mean that the fibers or fibrous articles stick together or fuse into a mass such that the fiber cannot be processed or used for its intended purpose. Blocking and fusing can occur during processing of the fiber or fibrous article or during storage over a period of days or weeks and is exacerbated under hot, humid conditions.

In one embodiment of the invention, the fibers and fibrous articles will contain less than 10 weight % of such antiblocking additives, based on the total weight of the fiber or fibrous article. For example, the fibers and fibrous articles may contain less than 10 weight % of a pigment or filler. In other examples, the fibers and fibrous articles may contain less than 9 weight %, less than 5 weight %, less than 3 weight %, less than 1 weight %, and 0 weight % of a pigment or filler, based on the total weight of the fiber. Colorants, sometimes referred to as toners, may be added to impart a desired neutral hue and/or brightness to the sulfopolyester. When colored fibers are desired, pigments or colorants may be included in the sulfopolyester reaction mixture during the reaction of the diol monomer and the dicarboxylic acid monomer or they may be melt blended with the preformed sulfopolyester. A preferred method of including colorants is to use a colorant having thermally stable organic colored compounds having reactive groups such that the colorant is copolymerized and incorporated into the sulfopolyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the copolyester reaction process after an ester interchange or direct esterification reaction.

For the purposes of this invention, the term "fiber" refers to a polymeric body of high aspect ratio capable of being formed into two or three dimensional articles such as woven or nonwoven fabrics. In the context of the present invention, the term "fiber" is synonymous with "fibers" and intended to mean one or more fibers. The fibers of our invention may be unicomponent fibers, bicomponent, or multicomponent fibers. The term "unicomponent fiber", as used herein, is intended to mean a fiber prepared by melt spinning a single sulfopolyester, blends of one or more sulfopolyesters, or blends of one or more sulfopolyesters with one or more additional polymers and includes staple, monofilament, and multifilament fibers. "Unicomponent" is intended to be synonymous with the term "monocomponent" and includes "biconstituent" or "multiconstituent" fibers, and refers to fibers which have been formed from at least two polymers extruded from the same extruder as a blend. Unicomponent or biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Thus, the term "unicomponent" is not intended to exclude fibers formed from a polymer or blends of one or more polymers to which small amounts of additives may be added for coloration, anti-static properties, lubrication, hydrophilicity, etc.

By contrast, the term "multicomponent fiber", as used herein, intended to mean a fiber prepared by melting the two or more fiber forming polymers in separate extruders and by directing the resulting multiple polymer flows into one spinneret with a plurality of distribution flow paths but spun together to form one fiber. Multicomponent fibers are also sometimes referred to as conjugate or bicomponent fibers.

The polymers are arranged in substantially constantly positioned distinct segments or zones across the cross-section of the conjugate fibers and extend continuously along the length of the conjugate fibers. The configuration of such a multicomponent fiber may be, for example, a sheath/core arrangement wherein one polymer is surrounded by another or may be a side by side arrangement, a ribbon or stripped arrangement, a pie arrangement or an "islands-in-the-sea" arrangement. For example, a multicomponent fiber may be prepared by extruding the sulfopolyester and one or more water non-dispersible polymers separately through a spinneret having a shaped or engineered transverse geometry such as, for example, an "islands-in-the-sea" or segmented pie configuration. Multicomponent fibers, typically, are staple, monofilament or multifilament fibers that have a shaped or round cross-section. Most fiber forms are heatset. The fiber may include the various antioxidants, pigments, and additives as described herein.

Monofilament fibers generally range in size from about 15 to about 8000 denier per filament (abbreviated herein as "d/f"). Our novel fibers typically will have d/f values in the range of about 40 to about 5000. Monofilaments may be in the form of unicomponent or multicomponent fibers. The multifilament fibers of our invention will preferably range in size from about 1.5 micrometers for melt blown webs, about 0.5 to about 50 d/f for staple fibers, and up to about 5000 d/f for monofilament fibers. Multifilament fibers may also be used as crimped or uncrimped yarns and tows. Fibers used in melt blown web and melt spun fabrics may be produced in microdenier sizes. The term "microdenier", as used herein, is intended to mean a d/f value of 1 d/f or less. For example, the microdenier fibers of the instant invention typically have d/f values of 1 or less, 0.5 or less, or 0.1 or less. Nanofibers can also be produced by electrostatic spinning.

As noted hereinabove, the sulfopolyesters also are advantageous for the preparation of bicomponent and multicomponent fibers having a shaped cross section. We have discovered that sulfopolyesters or blends of sulfopolyesters having a glass transition temperature (Tg) of at least 57° C. are particularly useful for multicomponent fibers to prevent blocking and fusing of the fiber during spinning and take up. Thus, our invention provides a multicomponent fiber having shaped cross section, comprising:

(A) a water dispersible sulfopolyester having a glass transition temperature (Tg) of at least 57° C., the sulfopolyester comprising:
  (i) residues of one or more dicarboxylic acids;
  (ii) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
  (iii) one or more diol residues wherein at least 25 mole %, based on the total diol residues, is a poly(ethylene glycol) having a structure

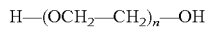

wherein n is an integer in the range of 2 to about 500; and
  (iv) 0 to about 25 mole %, based on the total repeating units, of residues of a branching monomer having 3 or more functional groups wherein the functional groups are hydroxyl, carboxyl, or a combination thereof; and
(B) a plurality of segments comprising one or more water non-dispersible polymers immiscible with the sulfopolyester, wherein the segments are substantially isolated from each other by the sulfopolyester intervening between the segments;

optionally, wherein the fiber has an islands-in-the-sea or segmented pie cross section and contains less than 10 weight % of a pigment or filler, based on the total weight of the fiber.

The dicarboxylic acids, diols, sulfopolyester, sulfomonomers, and branching monomers residues are as described previously for other embodiments of the invention. For multicomponent fibers, it is advantageous that the sulfopolyester have a Tg of at least 57° C. Further examples of glass transition temperatures that may be exhibited by the sulfopolyester or sulfopolyester blend of our multicomponent fiber are at least 60° C., at least 65° C., at least 70° C., at least 75° C., at least 80° C., at least 85° C., and at least 90° C. Further, to obtain a sulfopolyester with a Tg of at least 57° C., blends of one or more sulfopolyesters may be used in varying proportions to obtain a sulfopolyester blend having the desired Tg. The Tg of a sulfopolyester blend may be calculated by using a weighted average of the Tg's of the sulfopolyester components. For example, sulfopolyester having a Tg of 48° C. may be blended in a 25:75 wt:wt ratio with another sulfopolyester having Tg of 65° C. to give a sulfopolyester blend having a Tg of approximately 61° C.

In another embodiment of the invention, the water dispersible sulfopolyester component of the multicomponent fiber presents properties which allow at least one of the following:

(A) the multicomponent fibers to be spun to a desired low denier, (B) the sulfopolyester in these mulficomponent fibers is resistant to removal during hydroentangling of a web formed from the fibers but is efficiently removed at elevated temperatures after hydroentanglement, and (C) the multicomponent fibers are heat settable to yield a stable, strong fabric. Surprising and unexpected results were achieved in furtherance of these objectives using a sulfopolyester having a certain melt viscosity and level of sulfomonomer residues.

Therefore, in another embodiment of the invention, a multicomponent fiber is provided having a shaped cross section comprising:

(A) at least one water dispersible sulfopolyester; and
(B) a plurality of domains comprising one or more water non-dispersible polymers immiscible with the sulfopolyester, wherein the domains are substantially isolated from each other by the sulfopolyester intervening between the domains, optionally, wherein the fiber has an as-spun denier of less than about 6 denier per filament;

wherein the water dispersible sulfopolyesters exhibits a melt viscosity of less than about 12,000 poise measured at 240° C. at a strain rate of 1 rad/sec, and wherein the sulfopolyester comprises less than about 25 mole % of residues of at least one sulfomonomer, based on the total moles of diacid or diol residues.

The sulfopolyester utilized in these multicomponent fibers has a melt viscosity of generally less than about 12,000 poise. In other embodiments, the melt viscosity of the sulfopolyester is less than about 10,000 poise, less than about 6,000, or less than about 4,000 poise measured at 240° C. and 1 rad/sec shear rate. In another aspect, the sulfopolyester exhibits a melt viscosity of between about 1,000 to about 12,000 poise, between about 2,000 to about 6,000 poise, or between about 2,500 to about 4,000 poise measured at 240° C. and 1 rad/sec shear rate. Prior to determining the viscosity, the samples are dried at 60° C. in a vacuum oven for 2 days. The melt viscosity is measured on rheometer using a 25 mm diameter parallel-plate geometry at 1 mm gap setting. A dynamic frequency sweep is run at a strain rate range of 1 to 400 rad/sec and 10% strain amplitude. The viscosity is then measured at 240° C. and strain rate of 1 rad/sec.

The level of sulfomonomer residues in the sulfopolyester polymers for use in accordance with this aspect of the present invention is generally less than about 25 mole % or less than about 20 mole %, reported as a percentage of the total diacid or diol residues in the sulfopolyester. In other embodiments, this level is between about 4 to about 20 mole %, between about 5 to about 12 mole %, or between about 7 to about 10 mole %. Sulfomonomers for use with the invention preferably have 2 functional groups and one or more sulfonate groups attached to an aromatic or cycloaliphatic ring wherein the functional groups are hydroxyl, carboxyl, or a combination thereof. In one embodiment, a sodiosulfo-isophthalic acid monomer is utilized.

In addition to the sulfomonomer described previously, the sulfopolyester can comprise residues of one or more dicarboxylic acids, one or more diol residues wherein at least 25 mole %, based on the total diol residues, is a poly(ethylene glycol) having a structure

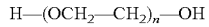

wherein n is an integer in the range of 2 to about 500, and 0 to about 20 mole %, based on the total repeating units, of residues of a branching monomer having 3 or more functional groups wherein the functional groups are hydroxyl, carboxyl, or a combination thereof.

In another embodiment, the sulfopolyester comprises from about 80-96 mole % dicarboxylic acid residues, from about 4 to about 20 mole % sulfomonomer residues, and 100 mole % diol residues (there being a total mole % of 200%, i.e., 100 mole % diacid and 100 mole % diol). More specifically, the dicarboxylic portion of the sulfopolyester comprises between about 60-80 mole % terephthalic acid, about 0-30 mole % isophthalic acid, and about 4-20 mole % 5-sodiosulfoisophthalic acid (5-SSIPA). The diol portion comprises from about 0-50 mole % diethylene glycol and from about 50-100 mole % ethylene glycol. An exemplary formulation according to this embodiment of the invention is set forth subsequently.

|  | Approximate Mole % (based on total moles of diol or diacid residues) |
| --- | --- |
| Terephthalic acid | 71 |
| Isophthalic acid | 20 |
| 5-SSIPA | 9 |
| Diethylene glycol | 35 |
| Ethylene glycol | 65 |

The water non-dispersible component of the multicomponent fiber may comprise any of those water non-dispersible polymers described herein. Spinning of the fiber may also occur according to any method described herein. However, the improved rheological properties of multicomponent fibers in accordance with this aspect of the invention provide for enhanced drawings speeds. When the sulfopolyester and water non-dispersible polymer are extruded to produce multicomponent extrudates, the multicomponent extrudate is capable of being melt drawn to produce the multicomponent fiber, using any of the methods disclosed herein, at a speed of at least about 2000 m/min, more preferably at least about 3000 m/min, even more preferably at least about 4000 m/min, and most preferably at least about 4500 m/min. Although not intending to be bound by theory, melt drawing of the multicomponent extrudates at these speeds results in at least some oriented crystallinity in the water non-dispersible component of the multicomponent fiber. This oriented crystallinity can increase the dimensional stability of non-woven materials made from the multicomponent fibers during subsequent processing.

Another advantage of the multicomponent extrudate is that it can be melt drawn to a multicomponent fiber having an as-spun denier of less than 6 deniers per filament. Other ranges of multicomponent fiber sizes include an as-spun denier of less than 4 deniers per filament and less than 2.5 deniers per filament.

Therefore, in another embodiment of the invention, a multicomponent extrudate having a shaped cross section, comprising:

(A) at least one water dispersible sulfopolyester; and (B) a plurality of domains comprising one or more water non-dispersible polymers immiscible with the sulfopolyester, wherein the domains are substantially isolated from each other by the sulfopolyester intervening between the domains, wherein the extrudate is capable of being melt drawn at a speed of at least about 2000 m/min.

The multicomponent fiber comprises a plurality of segments or domains of one or more water non-dispersible polymers immiscible with the sulfopolyester in which the segments or domains are substantially isolated from each other by the sulfopolyester intervening between the segments or domains. The term "substantially isolated", as used herein, is intended to mean that the segments or domains are set apart from each other to permit the segments domains to form individual fibers upon removal of the sulfopolyester. For example, the segments or domains may be touching each others as in, for example, a segmented pie configuration but can be split apart by impact or when the sulfopolyester is removed.

The ratio by weight of the sulfopolyester to water non-dispersible polymer component in the multicomponent fiber of the invention is generally in the range of about 60:40 to about 2:98 or, in another example, in the range of about 50:50 to about 5:95. Typically, the sulfopolyester comprises 50% by weight or less of the total weight of the multicomponent fiber.

The segments or domains of multicomponent fiber may comprise one of more water non-dispersible polymers. Examples of water non-dispersible polymers which may be used in segments of the multicomponent fiber include, but are not limited to, polyolefins, polyesters, polyamides, polylactides, polycaprolactone, polycarbonate, polyurethane, cellulose ester, and polyvinyl chloride. For example, the water non-dispersible polymer may be polyester such as poly(ethylene) terephthalate, poly(butylene) terephthalate, poly(cyclohexylene) cyclohexanedicarboxylate, poly(cyclohexylene) terephthalate, poly(trimethylene) terephthalate, and the like. In another example, the water non-dispersible polymer can be biodistintegratable as determined by DIN Standard 54900 and/or biodegradable as determined by ASTM Standard Method, D6340-98. Examples of biodegradable polyesters and polyester blends are disclosed in U.S. Pat. Nos. 5,599,858; 5,580,911; 5,446,079; and 5,559,171. The term "biodegradable", as used herein in reference to the water non-dispersible polymers of the present invention, is understood to mean that the polymers are degraded under environmental influences such as, for example, in a composting environment, in an appropriate and demonstrable time span as defined, for example, by ASTM Standard Method, D6340-98, entitled "Standard Test Methods for Determining Aerobic Biodegradation of Radiolabeled Plastic Materials in an Aqueous or Compost Environment". The water non-dispersible polymers of the present invention also may be "biodisintegratable", meaning that the polymers are easily fragmented in a composting environment as defined, for example, by DIN Standard 54900. For example, the biodegradable polymer is initially reduced in molecular weight in the environment by the action of heat, water, air, microbes and other factors. This reduction in molecular weight results in a loss of physical properties (tenacity) and often in fiber breakage. Once the molecular weight of the polymer is sufficiently low, the monomers and oligomers are then assimilated by the microbes. In an aerobic environment, these monomers or oligomers are ultimately oxidized to $CO_2$, $H_2O$, and new cell biomass. In an anaerobic environment, the monomers or oligomers are ultimately converted to $CO_2$, $H_2$, acetate, methane, and cell biomass.

For example, water non-dispersible polymer may be an aliphatic-aromatic polyester, abbreviated herein as "AAPS". The term "aliphatic-aromatic polyester", as used herein, means a polyester comprising a mixture of residues from aliphatic or cycloaliphatic dicarboxylic acids or diols and aromatic dicarboxylic acids or diols. The term "non-aromatic", as used herein with respect to the dicarboxylic acid and diol monomers of the present invention, means that carboxyl or hydroxyl groups of the monomer are not connected through an aromatic nucleus. For example, adipic acid contains no aromatic nucleus in its backbone, i.e., the chain of carbon atoms connecting the carboxylic acid groups, thus is "non-aromatic". By contrast, the term "aromatic" means the dicarboxylic acid or diol contains an aromatic nucleus in the backbone such as, for example, terephthalic acid or 2,6-naphthalene dicarboxylic acid. "Non-aromatic", therefore, is intended to include both aliphatic and cycloaliphatic structures such as, for example, diols and dicarboxylic acids, which contain as a backbone a straight or branched chain or cyclic arrangement of the constituent carbon atoms which may be saturated or paraffinic in nature, unsaturated, i.e., containing non-aromatic carbon-carbon double bonds, or acetylenic, i.e., containing carbon-carbon triple bonds. Thus, in the context of the description and the claims of the present invention, non-aromatic is intended to include linear and branched, chain structures (referred to herein as "aliphatic") and cyclic structures (referred to herein as "alicyclic" or "cycloaliphatic"). The term "non-aromatic", however, is not intended to exclude any aromatic substituents which may be attached to the backbone of an aliphatic or cycloaliphatic diol or dicarboxylic acid. In the present invention, the difunctional carboxylic acid typically is a aliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone.

The AAPE may be a linear or branched random copolyester and/or chain extended copolyester comprising diol residues which comprise the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will comprise 1 to about 4 substituents independently selected from halo, $C_6$-$C_{10}$ aryl, and $C_1$-$C_4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol with the preferred diols comprising one or more diols selected from 1,4-butanediol; 1,3-propanediol; ethylene glycol; 1,6-hexanediol; diethylene glycol; or 1,4-cyclohexanedimethanol. The AAPE also comprises diacid residues which contain about 35 to about 99 mole %, based on the total moles of diacid residues, of the residues of one or more substituted or unsubstituted, linear or branched, non-aromatic dicarboxylic acids selected from aliphatic dicarboxylic acids containing 2 to about 12 carbon atoms and cycloaliphatic acids containing about 5 to about 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of non-aromatic diacids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. In addition to the non-aromatic dicarboxylic acids, the AAPE comprises about 1 to about 65 mole %, based on the total moles of diacid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$-$C_{10}$ aryl, and $C_1$-$C_4$ alkoxy. Non-limiting examples of aromatic dicarboxylic acids which may be used in the AAPE of our invention are terephthalic acid, isophthalic acid, salts of 5-sulfoisophthalic acid, and 2,6-naphthalenedicarboxylic acid. More preferably, the non-aromatic dicarboxylic acid will comprise adipic acid, the aromatic dicarboxylic acid will comprise terephthalic acid, and the diol will comprise 1,4-butanediol.

Other possible compositions for the AAPE's of our invention are those prepared from the following diols and dicarboxylic acids (or polyester-forming equivalents thereof such as diesters) in the following mole %ages, based on 100 mole % of a diacid component and 100 mole % of a diol component:

(1) glutaric acid (about 30 to about 75%); terephthalic acid (about 25 to about 70%); 1,4-butanediol (about 90 to 100%); and modifying diol (0 about 10%);

(2) succinic acid (about 30 to about 95%); terephthalic acid (about 5 to about 70%); 1,4-butanediol (about 90 to 100%); and modifying diol (0 to about 10%); and (3) adipic acid (about 30 to about 75%); terephthalic acid (about 25 to about 70%); 1,4-butanediol (about 90 to 100%); and modifying diol (0 to about 10%).

The modifying diol preferably is selected from 1,4-cyclohexanedimethanol, triethylene glycol, polyethylene glycol and neopentyl glycol. The most preferred AAPE's are linear, branched or chain extended copolyesters comprising about 50 to about 60 mole % adipic acid residues, about 40 to about 50 mole % terephthalic acid residues, and at least 95 mole % 1,4-butanediol residues. Even more preferably, the adipic acid residues comprise about 55 to about 60 mole %, the terephthalic acid residues comprise about 40 to about 45 mole %, and the diol residues comprise about 95 mole %

1,4-butanediol residues. Such compositions are commercially available under the trademark EASTAR B10® copolyester from Eastman Chemical Company, Kingsport, Tenn., and under the trademark ECOFLEX® from BASF Corporation.

Additional, specific examples of preferred AAPE's include a poly(tetramethylene glutarate-co-terephthalate) containing (a) 50 mole percent glutaric acid residues, 50 mole percent terephthalic acid residues, and 100 mole percent 1,4-butanediol residues, (b) 60 mole percent glutaric acid residues, 40 mole percent terephthalic acid residues, and 100 mole percent 1,4-butanediol residues or (c) 40 mole percent glutaric acid residues, 60 mole percent terephthalic acid residues, and 100 mole percent 1,4-butanediol residues; a poly(tetramethylene succinate-co-terephthalate) containing (a) 85 mole percent succinic acid residues, 15 mole percent terephthalic acid residues, and 100 mole percent 1,4-butanediol residues or (b) 70 mole percent succinic acid residues, 30 mole percent terephthalic acid residues, and 100 mole percent 1,4-butanediol residues; a poly(ethylene succinate-co-terephthalate) containing 70 mole percent succinic acid residues, 30 mole percent terephthalic acid residues, and 100 mole percent ethylene glycol residues; and a poly(tetramethylene adipate-co-terephthalate) containing (a) 85 mole percent adipic acid residues, 15 mole percent terephthalic acid residues, and 100 mole percent 1,4-butanediol residues; or (b) 55 mole percent adipic acid residues, 45 mole percent terephthalic acid residues, and 100 mole percent 1,4-butanediol residues.

The AAPE preferably comprises from about 10 to about 1,000 repeating units and preferably, from about 15 to about 600 repeating units. The AAPE may have an inherent viscosity of about 0.4 to about 2.0 dL/g, or more preferably about 0.7 to about 1.6 dL/g, as measured at a temperature of 25° C. using a concentration of 0.5 gram copolyester in 100 ml of a 60/40 by weight solution of phenol/tetrachloroethane.

The AAPE, optionally, may contain the residues of a branching agent. The mole % age ranges for the branching agent are from about 0 to about 2 mole %, preferably about 0.1 to about 1 mole %, and most preferably about 0.1 to about 0.5 mole % based on the total moles of diacid or diol residues (depending on whether the branching agent contains carboxyl or hydroxyl groups). The branching agent preferably has a weight average molecular weight of about 50 to about 5000, more preferably about 92 to about 3000, and a functionality of about 3 to about 6. The branching agent, for example, may be the esterified residue of a polyol having 3 to 6 hydroxyl groups, a polycarboxylic acid having 3 or 4 carboxyl groups (or ester-forming equivalent groups) or a hydroxy acid having a total of 3 to 6 hydroxyl and carboxyl groups. In addition, the AAPE may be branched by the addition of a peroxide during reactive extrusion.

Each segment of the water non-dispersible polymer may be different from others in fineness and may be arranged in any shaped or engineered cross-sectional geometry known to persons skilled in the art. For example, the sulfopolyester and a water non-dispersible polymer may be used to prepare a bicomponent fiber having an engineered geometry such as, for example, a side-by-side, "islands-in-the-sea", segmented pie, sheath/core, ribbon (stripped), or other configurations known to persons skilled in the art. Other multicomponent configurations are also possible. Subsequent removal of a side, the "sea", or a portion of the "pie" can result in very fine fibers. The process of preparing bicomponent fibers also is well known to persons skilled in the art. In a bicomponent fiber, the sulfopolyester fibers of this invention may be present in amounts of about 10 to about 90 weight % and will generally be used in the sheath portion of sheath/core fibers. Typically, when a water-insoluble or water non-dispersible polymer is used, the resulting bicomponent or multicomponent fiber is not completely water-dispersible. Side by side combinations with significant differences in thermal shrinkage can be utilized for the development of a spiral crimp. If crimping is desired, a saw tooth or stuffer box crimp is generally suitable for many applications. If the second polymer component is in the core of a sheath/core configuration, such a core optionally may be stabilized.

The sulfopolyesters are particularly useful for fibers having an "islands-in-the-sea" or "segmented pie" cross section as they only requires neutral or slightly acidic (i.e., "soft") water) to disperse, as compared to the caustic-containing solutions that are sometimes required to remove other water dispersible polymers from multicomponent fibers. The term "soft water" as used in this disclosure means that the water has up to 5 grains per gallon as $CaCO_3$ (1 grain of $CaCO_3$ per gallon is equivalent to 17.1 ppm).

Another aspect of our invention is a multicomponent fiber, comprising:

(A) a water dispersible sulfopolyester having a glass transition temperature (Tg) of at least 57° C., the sulfopolyester comprising:
(i) about 50 to about 96 mole % of one or more residues of isophthalic acid or terephthalic acid, based on the total acid residues;
(ii) about 4 to about 30 mole %, based on the total acid residues, of a residue of sod iosulfoisophthalic acid;
(iii) one or more diol residues wherein at least 25 mole %, based on the total diol residues, is a poly(ethylene glycol) having a structure

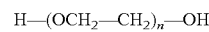

wherein n is an integer in the range of 2 to about 500;
(iv) 0 to about 20 mole %, based on the total repeating units, of residues of a branching monomer having 3 or more functional groups wherein the functional groups are hydroxyl, carboxyl, or a combination thereof; and (B) a plurality of segments comprising one or more water non-dispersible polymers immiscible with the sulfopolyester, wherein the segments are substantially isolated from each other by the sulfopolyester intervening between the segments.

In one embodiment, the multicomponent fiber has an islands-in-the-sea or segmented pie cross section and contains less than 10 weight % of a pigment or filler, based on the total weight of the fiber.

The dicarboxylic acids, diols, sulfopolyester, sulfomonomers, branching monomers residues, and water non-dispersible polymers are as described previously. For multicomponent fibers, it is advantageous that sulfopolyester have a Tg of at least 57° C. The sulfopolyester may be a single sulfopolyester or a blend of one or more sulfopolyester polymers. Further examples of glass transition temperatures that may be exhibited by the sulfopolyester or sulfopolyester blends are at least 65° C., at least 70° C., at least 75° C., at least 85° C., and at least 90° C. For example, the sulfopolyester may comprise about 75 to about 96 mole % of one or more residues of isophthalic acid or terephthalic acid and about 25 to about 95 mole % of a residue of diethylene glycol. As described hereinabove, examples of the water non-dispersible polymers are polyolefins, polyesters, polyamides, polylactides, polycaprolactones, polycarbonates, polyurethanes, cellulose esters, and polyvinyl chlorides. In addition, the water non-dispersible polymer may be biodegradable or biodisintegratable. For example, the water non-dispersible polymer may be an aliphatic-aromatic polyester as described previously.

Our novel multicomponent fiber may be prepared by any number of methods known to persons skilled in the art. The present invention thus provides a process for a multicomponent fiber having a shaped cross section comprising: spinning a water dispersible sulfopolyester having a glass transition temperature (Tg) of at least 57° C. and one or more water non-dispersible polymers immiscible with the sulfopolyester into a fiber, the sulfopolyester comprising:

(A) residues of one or more dicarboxylic acids;
(B) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
(C) one or more diol residues wherein at least 25 mole %, based on the total diol residues, is a poly(ethylene glycol) having a structure

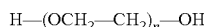

wherein n is an integer in the range of 2 to about 500; and
(D) 0 to about 25 mole %, based on the total repeating units, of residues of a branching monomer having 3 or more functional groups wherein the functional groups are hydroxyl, carboxyl, or a combination thereof;

wherein the fiber has a plurality of segments comprising the water non-dispersible polymers and the segments are substantially isolated from each other by the sulfopolyester intervening between the segments. In one embodiment, the fiber contains less than 10 weight % of a pigment or filler, based on the total weight of the fiber. For example, the multicomponent fiber may be prepared by melting the sulfopolyester and one or more water non-dispersible polymers in separate extruders and directing the individual polymer flows into one spinneret or extrusion die with a plurality of distribution flow paths such that the water non-dispersible polymer component form small segments or thin strands which are substantially isolated from each other by the intervening sulfopolyester. The cross section of such a fiber may be, for example, a segmented pie arrangement or an islands-in-the-sea arrangement. In another example, the sulfopolyester and one or more water non-dispersible polymers are separately fed to the spinneret orifices and then extruded in sheath-core form in which the water non-dispersible polymer forms a "core" that is substantially enclosed by the sulfopolyester "sheath" polymer. In the case of such concentric fibers, the orifice supplying the "core" polymer is in the center of the spinning orifice outlet and flow conditions of core polymer fluid are strictly controlled to maintain the concentricity of both components when spinning. Modifications in spinneret orifices enable different shapes of core and/or sheath to be obtained within the fiber cross-section. In yet another example, a multicomponent fiber having a side-by-side cross section or configuration may be produced (1) by coextruding the water dispersible sulfopolyester and water non-dispersible polymer through orifices separately and converging the separate polymer streams at substantially the same speed to merge side-by-side as a combined stream below the face of the spinneret; or (2) by feeding the two polymer streams separately through orifices, which converge at the surface of the spinneret, at substantially the same speed to merge side-by-side as a combined stream at the surface of the spinneret. In both cases, the velocity of each polymer stream, at the point of merge, is determined by its metering pump speed, the number of orifices, and the size of the orifice.

The dicarboxylic acids, diols, sulfopolyester, sulfomonomers, branching monomers residues, and water non-dispersible polymers are as described previously. The sulfopolyester has a glass transition temperature of at least 57° C. Further examples of glass transition temperatures that may be exhibited by the sulfopolyester or sulfopolyester blend are at least 65° C., at least 70° C., at least 75° C., at least 85° C., and at least 90° C. In one example, the sulfopolyester may comprise about 50 to about 96 mole % of one or more residues of isophthalic acid or terephthalic acid, based on the total acid residues; and about 4 to about 30 mole %, based on the total acid residues, of a residue of sod iosulfoisophthalic acid; and 0 to about 20 mole %, based on the total repeating units, of residues of a branching monomer having 3 or more functional groups wherein the functional groups are hydroxyl, carboxyl, or a combination thereof. In another example, the sulfopolyester may comprise about 75 to about 96 mole % of one or more residues of isophthalic acid or terephthalic acid and about 25 to about 95 mole % of a residue of diethylene glycol. As described hereinabove, examples of the water non-dispersible polymers are polyolefins, polyesters, polyamides, polylactides, polycaprolactone, polycarbonate, polyurethane, and polyvinyl chloride. In addition, the water non-dispersible polymer may be biodegradable or biodisintegratable. For example, the water non-dispersible polymer may be an aliphatic-aromatic polyester as described previously. Examples of shaped cross sections include, but are not limited to, islands-in-the-sea, side-by-side, sheath-core, segmented pie, or ribbon (stripped) configurations.

In another embodiment of the invention, a process for making a multicomponent fiber having a shaped cross section is provided comprising: spinning at least one water dispersible sulfopolyester and one or more water non-dispersible polymers immiscible with the sulfopolyester to produce a multicomponent fiber, wherein the multicomponent fiber has a plurality of domains comprising the water non-dispersible polymers and the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues. In another embodiment, the multicomponent fiber has an as-spun denier of less than about 6 denier per filament.

The sulfopolyester utilized in these multicomponent fiber and the water non-dispersible polymers were discussed previously in this disclosure.

In another embodiment of this invention, a process for making a multicomponent fiber having a shaped cross section is provided comprising:

(A) extruding at least one water dispersible sulfopolyester and one or more water non-dispersible polymers immiscible with the sulfopolyester to produce a multicomponent extrudate, wherein the multicomponent extrudate has a plurality of domains comprising the water non-dispersible polymers and the domains are substantially isolated from each other by the sulfopolyester intervening between the domains; and (B) melt drawing the multicomponent extrudate at a speed of at least about 2000 m/min to produce the multicomponent fiber.

It is also a feature of this embodiment of the invention that the process includes the step of melt drawing the multicomponent extrudate at a speed of at least about 2000 m/min, at least about 3000 m/min, or at least 4500 m/min.

Typically, upon exiting the spinneret, the fibers are quenched with a cross flow of air whereupon the fibers solidify. Various finishes and sizes may be applied to the fiber at this stage. The cooled fibers, typically, are subsequently drawn and wound up on a take up spool. Other additives may be incorporated in the finish in effective amounts like emulsifiers, antistatics, antimicrobials, antifoams, lubricants, thermostabilizers, UV stabilizers, and the like.

Optionally, the drawn fibers may be textured and wound-up to form a bulky continuous filament. This one-step technique is known in the art as spin-draw-texturing. Other embodiments include flat filament (non-textured) yarns, or cut staple fiber, either crimped or uncrimped.

The sulfopolyester may be later removed by dissolving the interfacial layers or pie segments and leaving the smaller filaments or microdenier fibers of the water non-dispersible polymer(s). Our invention thus provides a process for microdenier fibers comprising:

(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
  (i) about 50 to about 96 mole % of one or more residues of isophthalic acid or terephthalic acid, based on the total acid residues;
  (ii) about 4 to about 30 mole %, based on the total acid residues, of a residue of sod iosulfoisophthalic acid;
  (iii) one or more diol residues wherein at least 25 mole %, based on the total diol residues, is a poly(ethylene glycol) having a structure

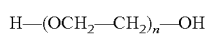

wherein n is an integer in the range of 2 to about 500; and
  (iv) 0 to about 20 mole %, based on the total repeating units, of residues of a branching monomer having 3 or more functional groups wherein the functional groups are hydroxyl, carboxyl, or a combination thereof;
wherein the fibers have a plurality of segments comprising the water non-dispersible polymers wherein the segments are substantially isolated from each other by the sulfopolyester intervening between the segments; and
(B) contacting the multicomponent fibers with water to remove the sulfopolyester thereby forming microdenier fibers.

In another embodiment, the multicomponent fibers contain less than 10 weight % of a pigment or filler, based on the total weight of the fibers.

Typically, the multicomponent fiber is contacted with water at a temperature in a range of about 25° C. to about 100° C. or in a range of about 50° C. to about 80° C. for a time period of from about 10 to about 600 seconds whereby the sulfopolyester is dissipated or dissolved. After removal of the sulfopolyester, the remaining water non-dispersible polymer microfibers typically will have an average fineness of 1 d/f or less, typically, 0.5 d/f or less, or more typically, 0.1 d/f or less.

Typical applications of these remaining water non-dispersible polymer microfibers include nonwoven fabrics, such as, for example, artificial leathers, suedes, wipes, and filter media. Filter media produce from these microfibers can be utilized to filter air or liquids. Filter media for liquids include, but are not limited to, water, bodily fluids, solvents, and hydrocarbons. The ionic nature of sulfopolyesters also results in advantageously poor "solubility" in saline media, such as body fluids. Such properties are desirable in personal care products and cleaning wipes that are flushable or otherwise disposed in sanitary sewage systems. Selected sulfopolyesters have also been utilized as dispersing agents in dye baths and soil redeposition preventative agents during laundry cycles.

In another embodiment of the present invention, a process for making microdenier fibers is provided comprising spinning at least one water dispersible sulfopolyester and one or more water non-dispersible polymers immiscible with the water dispersible sulfopolyester into multicomponent fibers, wherein the multicomponent fibers have a plurality of domains comprising the water non-dispersible polymers wherein the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues; and contacting the multicomponent fibers with water to remove the water dispersible sulfopolyester thereby forming microdenier fibers. In one embodiment, the multicomponent fiber has an as-spun denier of less than about 6 denier per filament.

In another embodiment of the invention, a process for making microdenier fibers is provided comprising:
(A) extruding at least one water dispersible sulfopolyester and one or more water non-dispersible polymers immiscible with the water dispersible sulfopolyester to produce multicomponent extrudates, wherein the multicomponent extrudates have a plurality of domains comprising the water non-dispersible polymers wherein the domains are substantially isolated from each other by the sulfopolyester intervening between the domains;
(B) melt drawing the multicomponent extrudates at a speed of at least about 2000 m/min to form multicomponent fibers; and
(C) contacting the multicomponent fibers with water to remove the water dispersible sulfopolyester thereby forming microdenier fibers.

The multicomponent extrudates can be drawn at a speed of at least about 2000 m/min, at least about 3000 m/min, or at least 4500 m/min.

Such sulfomonomers and sulfopolyesters suitable for use in accordance with the invention are described above.

In one embodiment, that the water used to remove the sulfopolyester from the multicomponent fibers is above room temperature. In other embodiments, the water used to remove the sulfopolyester is at least about 45° C., at least about 60° C., or at least about 80° C.

In another embodiment of this invention, another process is provided to produce cut water non-dispersible polymer microfibers. The process comprises:
(A) cutting a multicomponent fiber into cut multicomponent fibers;
(B) contacting a fiber-containing feedstock with water to produce a fiber mix slurry; wherein the fiber-containing feedstock comprises cut multicomponent fibers;
(C) heating the fiber mix slurry to produce a heated fiber mix slurry;

(D) optionally, mixing the fiber mix slurry in a shearing zone;

(E) removing at least a portion of the sulfopolyester from the cut multicomponent fiber to produce a slurry mixture comprising a sulfopolyester dispersion and the water non-dispersible polymer microfibers; and (F) separating the water non-dispersible polymer microfibers from the slurry mixture.

The multicomponent fiber can be cut into any length that can be utilized to produce nonwoven articles. In one embodiment of the invention, the multicomponent fiber is cut into lengths ranging from about 1 mm to about 50 mm. In other embodiments, the multicomponent fiber can be cut into lengths ranging from about 1 mm to about 25 mm, from about 1 mm to about 20 mm, from about 1 mm to about 15 mm, from about 1 mm to about 10 mm, from about 1 mm to about 6 mm, from about 1 mm to about 5 mm, from about 1 mm to about 5 mm. In another embodiment, the cut multicomponent fiber is cut into lengths of less than about 25 mm, less than about 20 mm, less than about 15 mm, less than about 10 mm, or less than about 5 mm.

In another aspect of the invention, the multicomponent fiber can be cut into a mixture of different lengths.

As used in this disclosure, the term "staple fiber" is used to define fiber cut into lengths of greater than 25 mm to about 50 mm. The term "short-cut fiber" is used to define fiber cut to lengths of about 25 mm or less.

The fiber-containing feedstock can comprise any other type of fiber that is useful in the production of nonwoven articles. In one embodiment, the fiber-containing feedstock further comprises at least one fiber selected from the group consisting of cellulosic fiber pulp, glass fiber, polyester fibers, nylon fibers, polyolefin fibers, rayon fibers and cellulose ester fibers.

The fiber-containing feedstock is mixed with water to produce a fiber mix slurry. Preferably, to facilitate the removal of the water-dispersible sulfopolyester, the water utilized can be soft water or deionized water. Soft water has been previously defined in this disclosure. In one embodiment of this invention, at least one water softening agent may be used to facilitate the removal of the water-dispersible sulfopolyester from the multicomponent fiber. Any water softening agent known in the art can be utilized. In one embodiment, the water softening agent is a chelating agent or calcium ion sequestrant. Applicable chelating agents or calcium ion sequestrants are compounds containing a plurality of carboxylic acid groups per molecule where the carboxylic groups in the molecular structure of the chelating agent are separated by 2 to 6 atoms. Tetrasodium ethylene diamine tetraacetic acid (EDTA) is an example of the most common chelating agent, containing four carboxylic acid moieties per molecular structure with a separation of 3 atoms between adjacent carboxylic acid groups. Poly acrylic acid, sodium salt is an example of a calcium sequestrant containing carboxylic acid groups separated by two atoms between carboxylic groups. Sodium salts of maleic acid or succinic acid are examples of the most basic chelating agent compounds. Further examples of applicable chelating agents include compounds which have in common the presence of multiple carboxylic acid groups in the molecular structure where the carboxylic acid groups are separated by the required distance (2 to 6 atom units) which yield a favorable steric interaction with di- or multi-valent cations such as calcium which cause the chelating agent to preferentially bind to di- or multi valent cations. Such compounds include, but are not limited to, diethylenetriaminepentaacetic acid; diethylenetriamine-N,N,N',N',N"-pentaacetic acid; pentetic acid; N,N-bis(2-(bis-(carboxymethyl)amino)ethylyglycine; diethylenetriamine pentaacetic acid; [[(carboxymethyl)imino]bis(ethylenenitrilo)]-tetra-acetic acid; edetic acid; ethyl enedinitrilotetraacetic acid; EDTA, free base; EDTA free acid; ethylenediamine-N,N,N',N'-tetraacetic acid; hampene; versene; N,N'-1,2-ethane diylbis-(N-(carboxymethyl)glycine); ethylenediamine tetra-acetic acid; N,N-bis(carboxymethyl)glycine; triglycollamic acid; trilone A; alpha,alpha',alpha"-trimethylaminetricarboxylic acid; tri (carboxymethyl)amine; aminotriacetic acid; hampshire NTA acid; nitrilo-2,2',2"-triacetic acid; titriplex i; nitrilotriacetic acid; and mixtures thereof.

The amount of water softening agent needed depends on the hardness of the water utilized in terms of $Ca^{++}$ and other multivalent ions.

The fiber mix slurry is heated to produce a heated fiber mix slurry. The temperature is that which is sufficient to remove a portion of the sulfopolyester from the multicomponent fiber. In one embodiment of the invention, the fiber mix slurry is heated to a temperature ranging from about 50° C. to about 100° C. Other temperature ranges are from about 70° C. to about 100° C., about 80° C. to about 100° C., and about 90° C. to about 100° C.

Optionally, the fiber mix slurry is mixed in a shearing zone. The amount of mixing is that which is sufficient to disperse and remove a portion of the water dispersible sulfopolyester from the multicomponent fiber and separate the water non-dispersible polymer microfibers. In one embodiment of the invention, 90% of the sulfopolyester is removed. In another embodiment, 95% of the sulfopolyester is removed, and in yet another embodiment, 98% or greater of the sulfopolyester is removed. The shearing zone can comprise any type of equipment that can provide shearing action necessary to disperse and remove a portion of the water dispersible sulfopolyester from the multicomponent fiber and separate the water non-dispersible polymer microfibers. Examples of such equipment include, but is not limited to, pulpers and refiners.

The water dispersible sulfopolyester in the multicomponent fiber after contact with water and heating will disperse and separate from the water non-dispersible polymer fiber to produce a slurry mixture comprising a sulfopolyester dispersion and the water non-dispersible polymer microfibers. The water non-dispersible polymer microfibers can then be separated from the sulfopolyester dispersion by any means known in the art. For examples, the slurry mixture can be routed through separating equipment, such as for example, screens and filters. Optionally, the water non-dispersible polymer microfibers may be washed once or numerous times to remove more of the water-dispersible sulfopolyester.

The removal of the water-dispersible sulfopolyester can be determined by physical observation of the slurry mixture. The water utilized to rinse the water non-dispersible polymer microfibers is clear if the water-dispersible sulfopolyester has been mostly removed. If the water-dispersible sulfopolyester is still being removed, the water utilized to rinse the water non-dispersible polymer microfibers can be milky. Further, if water-dispersible sulfopolyester remains on the water non-dispersible polymer microfibers, the microfibers can be somewhat sticky to the touch.

The water-dispersible sulfopolyester can be recovered from the sulfopolyester dispersion by any method known in the art.

In another embodiment of this invention, a water non-dispersible polymer microfiber is provided comprising at least one water non-dispersible polymer wherein the water non-dispersible polymer microfiber has an equivalent diameter of less than 5 microns and length of less than 25 millimeters. This water non-dispersible polymer microfiber is produced by the processes previously described to produce microfibers. In another aspect of the invention, the water non-dispersible polymer microfiber has an equivalent diameter of less than 3 microns and length of less than 25 millimeters. In other embodiments of the invention, the water non-dispersible polymer microfiber has an equivalent diameter of less than 5 microns or less than 3 microns. In other embodiments of the invention, the water non-dispersible polymer microfiber can have lengths of less than 12 millimeters; less than 10 millimeters, less than 6.5 millimeters, and less than 3.5 millimeters. The domains or segments in the multicomponent fiber once separated yield the water non-dispersible polymer microfibers.

The instant invention also includes a fibrous article comprising the water-dispersible fiber, the multicomponent fiber, microdenier fibers, or water non-dispersible polymer microfibers described hereinabove. The term "fibrous article" is understood to mean any article having or resembling fibers. Non-limiting examples of fibrous articles include multifilament fibers, yarns, cords, tapes, fabrics, wet-laid webs, dry-laid webs, melt blown webs, spunbonded webs, thermobonded webs, hydroentangled webs, nonwoven webs and fabrics, and combinations thereof; items having one or more layers of fibers, such as, for example, multilayer nonwovens, laminates, and composites from such fibers, gauzes, bandages, diapers, training pants, tampons, surgical gowns and masks, feminine napkins; and the like. In addition, the water non-dispersible microdfibers can be utilized in filter media for air filtration, liquid filtration, filtration for food preparation, filtration for medical applications, and for paper making processes and paper products. Further, the fibrous articles may include replacement inserts for various personal hygiene and cleaning products. The fibrous article of the present invention may be bonded, laminated, attached to, or used in conjunction with other materials which may or may not be water-dispersible. The fibrous article, for example, a nonwoven fabric layer, may be bonded to a flexible plastic film or backing of a water non-dispersible material, such as polyethylene. Such an assembly, for example, could be used as one component of a disposable diaper. In addition, the fibrous article may result from overblowing fibers onto another substrate to form highly assorted combinations of engineered melt blown, spunbond, film, or membrane structures.

The fibrous articles of the instant invention include nonwoven fabrics and webs. A nonwoven fabric is defined as a fabric made directly from fibrous webs without weaving or knitting operations. The Textile Institute defines nonwovens as textile structures made directly from fiber rather than yarn. These fabrics are normally made from continuous filaments or from fibre webs or batts strengthened by bonding using various techniques, which include, but are not limited to, adhesive bonding, mechanical interlocking by needling or fluid jet entanglement, thermal bonding, and stitch bonding. For example, the multicomponent fiber of the present invention may be formed into a fabric by any known fabric forming process. The resulting fabric or web may be converted into a microdenier fiber web by exerting sufficient force to cause the multicomponent fibers to split or by contacting the web with water to remove the sulfopolyester leaving the remaining microdenier fibers behind.

In another embodiment of the invention, a process is provided for producing a microdenier fiber web, comprising:
(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
(i) about 50 to about 96 mole % of one or more residues of isophthalic acid or terephthalic acid, based on the total acid residues;
(ii) about 4 to about 30 mole %, based on the total acid residues, of a residue of sod iosulfoisophthalic acid;
(iii) one or more diol residues wherein at least 25 mole %, based on the total diol residues, is a poly(ethylene glycol) having a structure

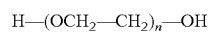

wherein n is an integer in the range of 2 to about 500; and
(iv) 0 to about 20 mole %, based on the total repeating units, of residues of a branching monomer having 3 or more functional groups wherein the functional groups are hydroxyl, carboxyl, or a combination thereof.

wherein the multicomponent fibers have a plurality of segments comprising the water non-dispersible polymers wherein the segments are substantially isolated from each other by the sulfopolyester intervening between the segments;
(B) overlapping and collecting the multicomponent fibers of Step A to form a nonwoven web; and
(C) contacting the nonwoven web with water to remove the sulfopolyester thereby forming a microdenier fiber web.

In another embodiment of the invention, the multicomponent fiber utilized contains less than 10 weight % of a pigment or filler, based on the total weight of the fiber.

In another embodiment of the invention, a process for a microdenier fiber web is provided which comprises:
(A) spinning at least one water dispersible sulfopolyester and one or more water non-dispersible polymers immiscible with the sulfopolyester into multicomponent fibers, the multicomponent fibers have a plurality of domains comprising the water non-dispersible polymers wherein the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues;
(B) collecting the multicomponent fibers of Step A) to form a non-woven web; and
(C) contacting the non-woven web with water to remove the sulfopolyester thereby forming a microdenier fiber web.
In another embodiment, the multicomponent fiber utilized has an as-spun denier of less than about 6 denier per filament.

In another embodiment of the invention, a process for a microdenier fiber web is provided which comprises:
(A) extruding at least one water dispersible sulfopolyester and one or more water non-dispersible polymers immiscible with the water dispersible sulfopolyester into multicomponent extrudates, the multicomponent extrudates have a plurality of domains comprising the water non-dispersible polymers wherein the domains are substantially isolated from each other by the water dispersible sulfopolyester intervening between the domains;
(B) melt drawing the multicomponent extrudates at a speed of at least about 2000 m/min to produce multicomponent fibers;

(C) collecting the multicomponent fibers of Step (B) to form a non-woven web; and (D) contacting the non-woven web with water to remove the sulfopolyester thereby forming a microdenier fiber web.

Prior to Step (C), the process can further comprise the step of hydroentangling the multicomponent fibers of the non-woven web. In one embodiment of the invention, the hydroentangling step results in a loss of less than about 20 weight % of the sulfopolyester contained in the multicomponent fibers, or less than 15 weight %, or less than 10 weight %. In furtherance of the goal of reducing the loss of sulfopolyester during hydroentanglement, the water used during this process can have a temperature of less than about 45° C., less than about 35° C., or less than about 30° C. In one embodiment of the invention, to minimize loss of sulfopolyester from the multicomponent fibers, the water used during hydroentanglement is as close to room temperature as possible. Conversely, removal of the sulfopolyester polymer during Step (D) can be carried out using water having a temperature of at least about 45° C., at least about 60° C., or at least about 80° C.

After hydroentanglement and prior to Step (D), the non-woven web may under go a heat setting step comprising heating the non-woven web to a temperature of at least about 100° C. or at least about 120° C. The heat setting step relaxes out internal fiber stresses and aids in producing a dimensionally stable fabric product. In other embodiments of the invention, when the heat set material is reheated to the temperature to which it was heated during the heat setting step that it exhibits surface area shrinkage of less than about 5% of its original surface area, less than about 2% of the original surface area, or less than about 1% of its original surface area.

The sulfopolyester used in the multicomponent fiber can be any of those described herein. In one embodiment, the sulfopolyester has a melt viscosity of less than about 6000 poise measured at 240° C. at a strain rate of 1 rad/sec and comprises less than about 12 mole %, based on the total repeating units, of residues of at least one sulfomonomer. These types of sulfopolyesters are previously described herein.

Furthermore, the inventive method can comprise the step of drawing the multicomponent fiber at a fiber velocity of at least 2000 m/min, at least about 3000 m/min, at least about 4000 m/min, or at least about 5000 m/min.

In another embodiment of this invention, nonwoven articles comprising water non-dispersible polymer microfibers can be produced. The nonwoven article comprises water non-dispersible polymer microfibers and is produced by a process selected from the group consisting of a dry-laid process and a wet-laid process. Multicomponent fibers and processes for producing water non-dispersible polymer microfibers were previously disclosed in the specification.

In one embodiment of the invention, at least 1% of the water non-dispersible polymer microfiber is contained in the nonwoven article. Other amounts of water non-dispersible polymer microfiber contained in the nonwoven article are at least 10%, at least 25%, and at least 50%.

In another aspect of the invention, the nonwoven article can further comprise at least one other fiber. The other fiber can be any that is known in the art depending on the type of nonwoven article to be produced. In one embodiment of the invention, the other fiber can be selected from the group consisting cellulosic fiber pulp, glass fiber, polyester fibers, nylon fibers, polyolefin fibers, rayon fibers cellulose ester fibers, and mixtures thereof.

The nonwoven article can also further comprise at least one additive. Additives include, but are not limited to, starches, fillers, and binders. Other additives are discussed in other sections of this disclosure.

Generally, manufacturing processes to produce these nonwoven articles from water non-dispersible microfibers produced from multicomponent fibers can be split into the following groups: dry-laid webs, wet-laid webs, and combinations of these processes with each other or other nonwoven processes.

Generally, dry-laid nonwoven articles are made with staple fiber processing machinery which is designed to manipulate fibers in the dry state. These include mechanical processes, such as, carding, aerodynamic, and other air-laid routes. Also included in this category are nonwoven articles made from filaments in the form of tow, and fabrics composed of staple fibers and stitching filaments or yards i.e. stitchbonded nonwovens. Carding is the process of disentangling, cleaning, and intermixing fibers to make a web for further processing into a nonwoven article. The process predominantly aligns the fibers which are held together as a web by mechanical entanglement and fiber-fiber friction. Cards are generally configured with one or more main cylinders, roller or stationary tops, one or more doffers, or various combinations of these principal components. One example of a card is a roller card. The carding action is the combing or working of the cut multicomponent fibers or the water non-dispersible polymer microfibers between the points of the card on a series of interworking card rollers. Other types of cards include woolen, cotton, and random cards. Garnetts can also be used to align these fibers.

The cut multicomponent fibers or water non-dispersible polymer microfibers in the dried-laid process can also be aligned by air-laying. These fibers are directed by air current onto a collector which can be a flat conveyor or a drum.

Extrusion-formed webs can also be produced from the multicomponents fibers of this invention. Examples include spunbonded and melt-blown. Extrusion technology is used to produce spunbond, meltblown, and porous-film nonwoven articles. These nonwoven articles are made with machinery associated with polymer extrusion methods such as melt spinning, film casting, and extrusion coating. The nonwoven article is then contacted with water to remove the water dispersible sulfopolyester thus producing a nonwoven article comprising water non-dispersible polymer microfibers.

In the spunbond process, the water dispersible sulfopolyester and water non-dispersible polymer are transformed directly to fabric by extruding multicomponent filaments, orienting them as bundles or groupings, layering them on a conveying screen, and interlocking them. The interlocking can be conducted by thermal fusion, mechanical entanglement, hydroentangling, chemical binders, or combinations of these processes.

Meltblown fabrics are also made directly from the water dispersible sulfopolyester and the water non-dispersible polymer. The polymers are melted and extruded. When the melt passes through the extrusion orifice, it is blown with air at high temperature. The air stream attenuates and solidifies the molten polymers. The multicomponent fibers can then be separated from the air stream as a web and compressed between heated rolls.

Combined spunbond and meltbond processes can also be utilized to produce nonwoven articles.

Wet laid processes involve the use of papermaking technology to produce nonwoven articles. These nonwoven articles are made with machinery associated with pulp fiberizing, such as hammer mills, and paperforming. For example, slurry pumping onto continuous screens which are designed to manipulate short fibers in a fluid.

In one embodiment of the wet laid process, water non-dispersible polymer microfibers are suspended in water, brought to a forming unit where the water is drained off through a forming screen, and the fibers are deposited on the screen wire.

In another embodiment of the wet laid process, water non-dispersible polymer microfibers are dewatered on a sieve or a wire mesh which revolves at the beginning of hydraulic formers over dewatering modules (suction boxes, foils and curatures) at high speeds of up to 1500 meters per minute. The sheet is then set on this wire mesh or sieve and dewatering proceeds to a solid content of approximately 20-30 weight %. The sheet can then be pressed and dried.

In another embodiment of the wet-laid process, a process is provided comprising:

(A) optionally, rinsing the water non-dispersible polymer microfibers with water;

(B) adding water to the water non-dispersible polymer microfibers to produce a water non-dispersible polymer microfiber slurry;

(C) optionally, adding other fibers and/or additives to the water non-dispersible polymer microfibers or slurry; and (D) transferring the water non-dispersible polymer microfibers containing slurry to a wet-laid nonwoven zone to produce the nonwoven article.

In Step a), the number of rinses depends on the particular use chosen for the water non-dispersible polymer microfibers. In Step b), sufficient water is added to the microfibers to allow them to be routed to the wet-laid nonwoven zone.

The wet-laid nonwoven zone comprises any equipment known in the art to produce wet-laid nonwoven articles. In one embodiment of the invention, the wet-laid nonwoven zone comprises at least one screen, mesh, or sieve in order to remove the water from the water non-dispersible polymer microfiber slurry.

In another embodiment of the wet laid process, a process is provided comprising:

(A) contacting a cut multicomponent fiber with water to remove a portion of the water dispersible sulfopolyester to produce a water non-dispersible polymer microfiber slurry; wherein the water non-dispersible polymer microfiber slurry comprises water non-dispersible polymer microfibers and water dispersible sulfopolyester;

(B) optionally, rinsing the water non-dispersible polymer microfibers with water;

(C) optionally, adding other fibers and/or additives to the water non-dispersible polymer slurry; and (D) transferring the water non-dispersible polymer microfibers containing slurry to a wet-laid nonwoven zone to produce the nonwoven article.

In another embodiment of the invention, the water non-dispersible polymer microfiber slurry is mixed prior to transferring to the wet-laid nonwoven zone.

Web-bonding processes can also be utilized to produce nonwoven articles. These can be split into chemical and physical processes. Chemical bonding refers to the use of water-based and solvent-based polymers to bind together the fibers and/or fibrous webs. These binders can be applied by saturation, impregnation, spraying, printing, or application as a foam. Physical bonding processes include thermal processes such as calendaring and hot air bonding, and mechanical processes such as needling and hydroentangling. Needling or needle-punching processes mechanically interlock the fibers by physically moving some of the fibers from a near-horizontal to a near-vertical position. Needle-punching can be conducted by a needleloom. A needleloom generally contains a web-feeding mechanism, a needle beam which comprises a needleboard which holds the needles, a stripper plate, a bed plate, and a fabric take-up mechanism.

Stitchbonding is a mechanical bonding method that uses knitting elements, with or without yarn, to interlock the fiber webs. Examples of stitchbonding machines include, but are not limited to, Maliwatt, Arachne, Malivlies, and Arabeva.

The nonwoven article can be held together by 1) mechanical fiber cohesion and interlocking in a web or mat; 2) various techniques of fusing of fibers, including the use of binder fibers, utilizing the thermoplastic properties of certain polymers and polymer blends; 3) use of a binding resin such as starch, casein, a cellulose derivative, or a synthetic resin, such as an acrylic latex or urethane; 4) powder adhesive binders; or 5) combinations thereof. The fibers are often deposited in a random manner, although orientation in one direction is possible, followed by bonding using one of the methods described above.

The fibrous articles of our invention also may comprise one or more layers of water-dispersible fibers, multicomponent fibers, or microdenier fibers. The fiber layers may be one or more nonwoven fabric layers, a layer of loosely bound overlapping fibers, or a combination thereof. In addition, the fibrous articles may include personal and health care products such as, but not limited to, child care products, such as infant diapers; child training pants; adult care products, such as adult diapers and adult incontinence pads; feminine care products, such as feminine napkins, panty liners, and tampons; wipes; fiber-containing cleaning products; medical and surgical care products, such as medical wipes, tissues, gauzes, examination bed coverings, surgical masks, gowns, bandages, and wound dressings; fabrics; elastomeric yarns, wipes, tapes, other protective barriers, and packaging material. The fibrous articles may be used to absorb liquids or may be pre-moistened with various liquid compositions and used to deliver these compositions to a surface. Non-limiting examples of liquid compositions include detergents; wetting agents; cleaning agents; skin care products, such as cosmetics, ointments, medications, emollients, and fragrances. The fibrous articles also may include various powders and particulates to improve absorbency or as delivery vehicles. Examples of powders and particulates include, but are not limited to, talc, starches, various water absorbent, water-dispersible, or water swellable polymers, such as super absorbent polymers, sulfopolyesters, and poly(vinylalcohols), silica, pigments, and microcapsules. Additives may also be present, but are not required, as needed for specific applications. Examples of additives include, but are not limited to, oxidative stabilizers, UV absorbers, colorants, pigments, opacifiers (delustrants), optical brighteners, fillers, nucleating agents, plasticizers, viscosity modifiers, surface modifiers, antimicrobials, disinfectants, cold flow inhibitors, branching agents, and catalysts.

In addition to being water-dispersible, the fibrous articles described above may be flushable. The term "flushable" as used herein means capable of being flushed in a conventional toilet, and being introduced into a municipal sewage or residential septic system, without causing an obstruction or blockage in the toilet or sewage system.

The fibrous article may further comprise a water-dispersible film comprising a second water-dispersible polymer. The second water-dispersible polymer may be the same as or different from the previously described water-dispersible polymers used in the fibers and fibrous articles of the present invention. In one embodiment, for example, the second water-dispersible polymer may be an additional sulfopolyester which, in turn, comprises:

(A) about 50 to about 96 mole % of one or more residues of isophthalic acid or terephthalic acid, based on the total acid residues;

(B) about 4 to about 30 mole %, based on the total acid residues, of a residue of sod iosulfoisophthalic acid;

(C) one or more diol residues wherein at least 15 mole %, based on the total diol residues, is a poly(ethylene glycol) having a structure

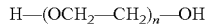

wherein n is an integer in the range of 2 to about 500;

(D) 0 to about 20 mole %, based on the total repeating units, of residues of a branching monomer having 3 or more functional groups wherein the functional groups are hydroxyl, carboxyl, or a combination thereof. The additional sulfopolyester may be blended with one or more supplemental polymers, as described hereinabove, to modify the properties of the resulting fibrous article. The supplemental polymer may or may not be water-dispersible depending on the application. The supplemental polymer may be miscible or immiscible with the additional sulfopolyester.

The additional sulfopolyester may contain other concentrations of isophthalic acid residues, for example, about 60 to about 95 mole %, and about 75 to about 95 mole %. Further examples of isophthalic acid residue concentrations ranges are about 70 to about 85 mole %, about 85 to about 95 mole % and about 90 to about 95 mole %. The additional sulfopolyester also may comprise about 25 to about 95 mole % of the residues of diethylene glycol. Further examples of diethylene glycol residue concentration ranges include about 50 to about 95 mole %, about 70 to about 95 mole %, and about 75 to about 95 mole %. The additional sulfopolyester also may include the residues of ethylene glycol and/or 1,4-cyclohexanedimethanol. Typical concentration ranges of CHDM residues are about 10 to about 75 mole %, about 25 to about 65 mole %, and about 40 to about 60 mole %. Typical concentration ranges of ethylene glycol residues are about 10 to about 75 mole %, about 25 to about 65 mole %, and about 40 to about 60 mole %. In another embodiment, the additional sulfopolyester comprises is about 75 to about 96 mole % of the residues of isophthalic acid and about 25 to about 95 mole % of the residues of diethylene glycol.

According to the invention, the sulfopolyester film component of the fibrous article may be produced as a monolayer or multilayer film. The monolayer film may be produced by conventional casting techniques. The multilayered films may be produced by conventional lamination methods or the like. The film may be of any convenient thickness, but total thickness will normally be between about 2 and about 50 mil.

The film-containing fibrous articles may include one or more layers of water-dispersible fibers as described above. The fiber layers may be one or more nonwoven fabric layers, a layer of loosely bound overlapping fibers, or a combination thereof. In addition, the film-containing fibrous articles may include personal and health care products as described hereinabove.

As described previously, the fibrous articles also may include various powders and particulates to improve absorbency or as delivery vehicles. Thus, in one embodiment, our fibrous article comprises a powder comprising a third water-dispersible polymer that may be the same as or different from the water-dispersible polymer components described previously herein. Other examples of powders and particulates include, but are not limited to, talc, starches, various water absorbent, water-dispersible, or water swellable polymers, such as poly(acrylonitriles), sulfopolyesters, and poly (vinyl alcohols), silica, pigments, and microcapsules.

Our novel fiber and fibrous articles have many possible uses in addition to the applications described above. One novel application involves the melt blowing a film or nonwoven fabric onto flat, curved, or shaped surfaces to provide a protective layer. One such layer might provide surface protection to durable equipment during shipping. At the destination, before putting the equipment into service, the outer layers of sulfopolyester could be washed off. A further embodiment of this general application concept could involve articles of personal protection to provide temporary barrier layers for some reusable or limited use garments or coverings. For the military, activated carbon and chemical absorbers could be sprayed onto the attenuating filament pattern just prior to the collector to allow the melt blown matrix to anchor these entities on the exposed surface. The chemical absorbers can even be changed in the forward operations area as the threat evolves by melt blowing on another layer.

A major advantage inherent to sulfopolyesters is the facile ability to remove or recover the polymer from aqueous dispersions via flocculation or precipitation by adding ionic moieties (i.e., salts). Other methods, such as pH adjustment, adding nonsolvents, freezing, and so forth may also be employed. Therefore, fibrous articles, such as outer wear protective garments, after successful protective barrier use and even if the polymer is rendered as hazardous waste, can potentially be handled safely at much lower volumes for disposal using accepted protocols, such as incineration.

Undissolved or dried sulfopolyesters are known to form strong adhesive bonds to a wide array of substrates, including, but not limited to fluff pulp, cotton, acrylics, rayon, lyocell, PLA (polylactides), cellulose acetate, cellulose acetate propionate, poly(ethylene) terephthalate, poly(butylene) terephthalate, poly(trimethylene) terephthalate, poly (cyclohexylene) terephthalate, copolyesters, polyamides (nylons), stainless steel, aluminum, treated polyolefins, PAN (polyacrylonitriles), and polycarbonates. Thus, our nonwoven fabrics may be used as laminating adhesives or binders that may be bonded by known techniques, such as thermal, radio frequency (RF), microwave, and ultrasonic methods. Adaptation of sulfopolyesters to enable RF activation is disclosed in a number of recent patents. Thus, our novel nonwoven fabrics may have dual or even multifunctionality in addition to adhesive properties. For example, a disposable baby diaper could be obtained where a nonwoven of the present invention serves as both an water-responsive adhesive as well as a fluid managing component of the final assembly.

Our invention also provides a process for water-dispersible fibers comprising:

(A) heating a water-dispersible polymer composition to a temperature above its flow point, wherein the polymer composition comprises:

(i) residues of one or more dicarboxylic acids;

(ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof; and (iii) one or more diol residues wherein at least 20 mole %, based on the total diol residues, is a poly(ethylene glycol) having a structure

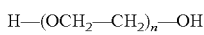

wherein n is an integer in the range of 2 to about 500; (iv) 0 to about 25 mole based on the total repeating units, of residues of a branching monomer having 3 or more functional groups wherein the functional groups are hydroxyl, carboxyl, or a combination thereof; wherein the polymer composition contains less than 10 weight % of a pigment or filler, based on the total weight of the polymer composition; and (II) melt spinning filaments. As described hereinabove, a water-dispersible polymer, optionally, may be blended with the sulfopolyester. In addition, a water non-dispersible polymer, optionally, may be blended with the sulfopolyester to form a blend such that blend is an immiscible blend. The term "flow point", as used herein, means the temperature at which the viscosity of the polymer composition permits extrusion or other forms of processing through a spinneret or extrusion die.

The dicarboxylic acid residue may comprise from about 60 to about 100 mole % of the acid residues depending on the type and concentration of the sulfomonomer. Other examples of concentration ranges of dicarboxylic acid residues are from about 60 mole % to about 95 mole % and about 70 mole % to about 95 mole %. The preferred dicarboxylic acid residues are isophthalic, terephthalic, and 1,4-cyclohexanedicarboxylic acids or if diesters are used, dimethyl terephthalate, dimethyl isophthalate, and dimethyl-1,4-cyclohexane dicarboxylate with the residues of isophthalic and terephthalic acid being especially preferred.

The sulfomonomer may be a dicarboxylic acid or ester thereof containing a sulfonate group, a diol containing a sulfonate group, or a hydroxy acid containing a sulfonate group. Additional examples of concentration ranges for the sulfomonomer residues are about 4 to about 25 mole %, about 4 to about 20 mole %, about 4 to about 15 mole %, and about 4 to about 10 mole %, based on the total repeating units. The cation of the sulfonate salt may be a metal ion such as $Li^+$, $Na^+$, $K^+$, $Mg^{++}$, $Ca^{++}$, $Ni^{++}$, $Fe^{++}$, and the like. Alternatively, the cation of the sulfonate salt may be non-metallic such as a nitrogenous base as described previously. Examples of sulfomonomer residues which may be used in the process of the present invention are the metal sulfonate salt of sulfophthalic acid, sulfoterephthalic acid, sulfoisophthalic acid, or combinations thereof. Another example of sulfomonomer which may be used is 5-sod iosulfoisophthalic acid or esters thereof. If the sulfomonomer residue is from 5-sod iosulfoisophthalic acid, typical sulfomonomer concentration ranges are about 4 to about 35 mole %, about 8 to about 30 mole %, and about 10 to 25 mole %, based on the total acid residues.

The sulfopolyester of our includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. The sulfopolyester may optionally include a branching monomer. Examples of branching monomers are as described hereinabove. Further examples of branching monomer concentration ranges are from 0 to about 20 mole % and from 0 to about 10 mole %. The sulfopolyester of our novel process has a Tg of at least 25° C. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

The water-dispersible fibers can be prepared by a melt blowing process. The polymer is melted in an extruder and forced through a die. The extrudate exiting the die is rapidly attenuated to ultrafine diameters by hot, high velocity air. The orientation, rate of cooling, glass transition temperature ($T_g$), and rate of crystallization of the fiber are important because they affect the viscosity and processing properties of the polymer during attenuation. The filament is collected on a renewable surface, such as a moving belt, cylindrical drum, rotating mandrel, and so forth. Predrying of pellets (if needed), extruder zone temperature, melt temperature, screw design, throughput rate, air temperature, air flow (velocity), die air gap and set back, nose tip hole size, die temperature, die-to-collector (DCP) distance, quenching environment, collector speed, and post treatments are all factors that influence product characteristics such as filament diameters, basis weight, web thickness, pore size, softness, and shrinkage. The high velocity air also may be used to move the filaments in a somewhat random fashion that results in extensive interlacing. If a moving belt is passed under the die, a nonwoven fabric can be produced by a combination of over-lapping laydown, mechanical cohesiveness, and thermal bonding of the filaments. Overblowing onto another substrate, such as a spunbond or backing layer, is also possible. If the filaments are taken up on an rotating mandrel, a cylindrical product is formed. A water-dispersible fiber lay-down can also be prepared by the spunbond process.

The instant invention, therefore, further provides a process for water-dispersible, nonwoven fabric comprising:

(A) heating a water-dispersible polymer composition to a temperature above its flow point, wherein the polymer composition comprises:
  (i) residues of one or more dicarboxylic acids;
  (ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;
  (iii) one or more diol residues wherein at least 20 mole %, based on the total diol residues, is a poly(ethylene glycol) having a structure

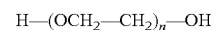

wherein n is an integer in the range of 2 to about 500;
  (iv) 0 to about 25 mole %, based on the total repeating units, of residues of a branching monomer having 3 or more functional groups wherein the functional groups are hydroxyl, carboxyl, or
(A) combination thereof; wherein the sulfopolyester has a glass transition temperature (Tg) of at least 25° C.; wherein the polymer composition contains less than 10 weight % of a pigment or filler, based on the total weight of the polymer composition;

(B) melt-spinning filaments; and (C) overlapping and collecting the filaments of Step (B) to form a nonwoven fabric. As described hereinabove, a water-dispersible polymer, optionally, may be blended with the sulfopolyester. In addition, a water non-dispersible polymer, optionally, may be blended with the sulfopolyester to form a blend such that blend is an immiscible blend. The dicarboxylic acid, sulfomonomer, and branching monomer residues are as described previously. The sulfopolyester has a Tg of at least 25° C. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

In certain embodiments of the present invention, the water-wet microfibrous product (wet lap) produced after the multicomponent fibers have been cut, washed, and drained of excess water can be directly used (i.e., without further drying) in a wet-laid nonwoven process. Direct use of the wet lap product in a wet-laid nonwoven process avoids the need for complete drying of the wet lap, thereby saving significant energy and equipment costs. When the wet lap production facility is located remotely from the facility for making wet-laid nonwovens, the wet lap can be packaged and transported from the wet lap production location to the nonwoven production location. Such a wet lap composition is described in further detail immediately below.

One embodiment of the present invention is directed to a wet lap composition comprising water and a plurality of synthetic fibers. Water can make up at least 50, 55, or 60 weight % and/or not more than 90, 85, or 80 weight % of the wet lap composition. The synthetic fibers can make up at least 10, 15, or 20 weight % and/or not more than 50, 45, or 40 weight % of the wet lap composition. The water and the synthetic fibers in combination make up at least 95, 98, or 99 weight % of the wet lap composition. The synthetic fibers can have a length of at least 0.25, 0.5, or 1 millimeter and/or not more than 25, 10, or 2 millimeters. The synthetic fibers can have a minimum transverse dimension at least 0.1, 0.5, or 0.75 microns and/or not more than 10, 5, or 2 microns.

Figure 1B:
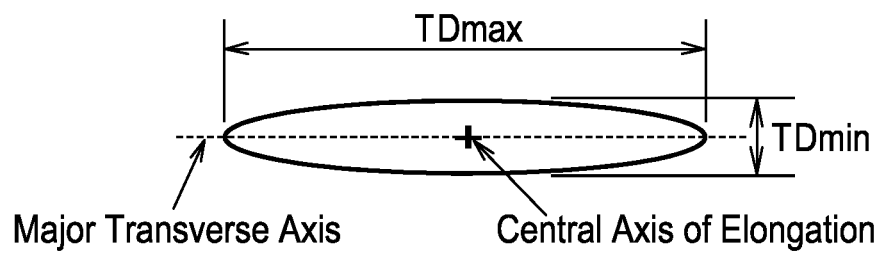
Figure 1C:
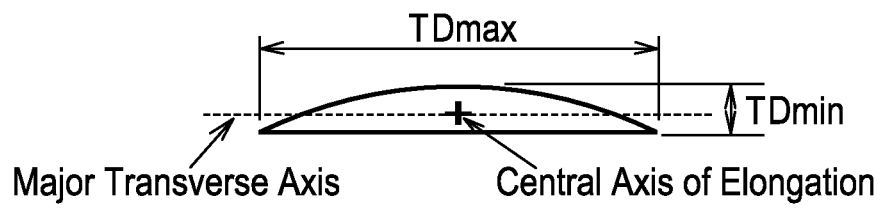

As used herein, "minimum transverse dimension" denotes the minimum dimension of a fiber measured perpendicular to the axis of elongation of the fiber by an external caliper method. As used herein, "maximum transverse dimension" is the maximum dimension of a fiber measured perpendicular to the axis of elongation of the fiber by the external caliper. FIGS. 1a, 1b, and 1c depict how these dimensions may be measured in various fiber cross-sections. In FIGS. 1a, 1a, and 1c, "TDmin" is the minimum transverse dimension and "TDmax" is the maximum transverse dimension. As used herein, "external caliper method" denotes a method of measuring an outer dimension of a fiber where the measured dimension is the distance separating two coplanar parallel lines between which the fiber is located and where each of the parallel lines touches the external surface of the fiber on generally opposite sides of the fiber. All fiber dimensions provided herein (e.g., length, minimum transverse dimension, and maximum transverse dimension) are the average dimensions of the fibers belonging to the specified group.

The wet lap composition can further comprise a fiber finishing composition in an amount of at least 10, 50, or 100 ppmw and/or not more than 1,000, 500, 250 ppmw. In one embodiment, the fiber finishing composition can comprise an oil, a wax, and/or a fatty acid. In another embodiment, the fiber finishing composition can comprise a naturally-derived fatty acid and/or a naturally-derived oil. In yet another embodiment, the wherein the fiber finishing composition comprises mineral oil, stearate esters, sorbitan esters, and/or neatsfoot oil. In still another embodiment, the fiber finishing composition comprises mineral oil.

The wet lap composition can further comprise a water dispersible polymer in an amount of at least 0.001, 0.01, or 0.1 and/or not more than 5, 2, or 1 weight %. In one embodiment the water dispersible polymer comprises at least one sulfopolyester. Sulfopolyesters were previously described in this disclosure.

The sulfopolyester can comprise:
 (A) about 50 to about 96 percent, based on the total acid residues, of residues of one or more dicarboxylic acids, wherein the one or more dicarboxylic acids comprise terephthalic acid and isophthalic acid,
 (B) about 4 to about 40 mole %, based on the total acid residues, of residues of at least one sulfomonomer having two functional groups and one or more sulfonate groups attached to an aromatic or cycloaliphatic ring wherein the functional groups are hydroxyl, carboxyl, or a combination thereof, and
 (C) one or more diol residues, The sulfopolyester can have a glass transition temperature (Tg) of at least 40° C. or at least 50° C., an inherent viscosity of at least 0.2 dL/g measured in a 60/40 parts by weight solution of phenol/tetrachloroethane solvent at 40° C. and at a concentration of 0.5 grams of sulfopolyester in 100 mL of solvent, and a melt viscosity of less than about 12,000, 8,000, or 6,000 poise measured at 240° C. at a strain rate of 1 rad/sec.

The water non-dispersible synthetic polymer of the wet lap compostition can be selected from the group consisting of polyolefins, polyesters, copolyesters, polyamides, polylactides, polycaprolactones, polycarbonates, polyurethanes, cellulose esters, acrylics, polyvinyl chlorides, and blends thereof. In one embodiment, the water non-dispersible synthetic polymer is selected from the group consisting of polyethylene terephthalate homopolymer, polyethylene terephthalate copolymers, polybutylene terephthalate, polypropylene terephthalate, nylon 6, nylon 66, and blends thereof.

The wet-lap composition can be made by a process comprising the following steps:
 (A) producing multicomponent fibers comprising at least one water dispersible sulfopolyester and one or more water non-dispersible synthetic polymers immiscible with the water dispersible sulfopolyester, wherein the multicomponent fibers have an as-spun denier of less than 15 dpf;
 (B) cutting the multicomponent fibers into cut multicomponent fibers having a length of less than 25 millimeters;
 (C) contacting the cut multicomponent fibers with wash water to remove the water dispersible sulfopolyester thereby forming a slurry of synthetic fibers in a sulfopolyester dispersion, wherein the sulfopolyester dispersion comprises water and at least a portion of the sulfopolyester; and
 (D) removing at least a portion of the sulfopolyester dispersion from the slurry to thereby producing a wet lap composition.

As discussed above, the wet lap composition can be used directly in a wet-laid process to make a nonwoven articles. In order to use the wet lap in a wet-laid process, the wet lap compostion is transferred from its place of production to a wet-laid nonwoven zone. The wet lap composition can be combined with additional fibers in the wet-laid nonwoven zone and/or immediately upstream of the wet-laid nonwoven zone. The additional fibers can be selected from a group consisting of cellulosic fiber pulp, inorganic fibers, polyester fibers, nylon fibers, lyocell fibers, polyolefin fibers, rayon fibers, cellulose ester fibers, and combinations thereof.

As part of the wet-laid process, the wet lap composition can be combined with dilution water in the wet-laid nonwoven zone and/or immediately upstream of the wet-laid nonwoven zone. The dilution water and wet lap can be combined in amounts such that at least 50, 75, 90, or 95 parts by weight of the dilution water is used per one part of the wetlap.

In other embodiments of the invention, as shown in FIGS. 2, 3a, 3b, and 4, processes for producing a microfiber product stream are provided. Multicomponent fibers were previously discussed in this disclosure. Further disclosures concerning multicomponent fibers are provided in the following patents and patents applications: U.S. Pat. Nos. 6,989,193; 7,635,745; 7,902,094; 7,892,993; 7,687,143; and U.S. patent application Ser. Nos. 12/199,304; 12/909,574; 13/273,692; 13/273,648; 13/273,710; 13/273,720; 13/273,929, 13/273,937; 13/273,727, 13/273,737; 13/273,745; 13/273,749; 12/966,502; 12/966,507; 12/975,450; 12/975,452; 12/975,456; 13/053,615; 13/352,362; 13/433,812; 13/433,854; 61/471,259; 61/472,964; and 61/558,744, which are all hereby incorporated by reference to the extent they do not contradict the statements herein.

The terms "wet lap" and "microfiber product stream" will be used interchangeably in this disclosure.

Figure 2:
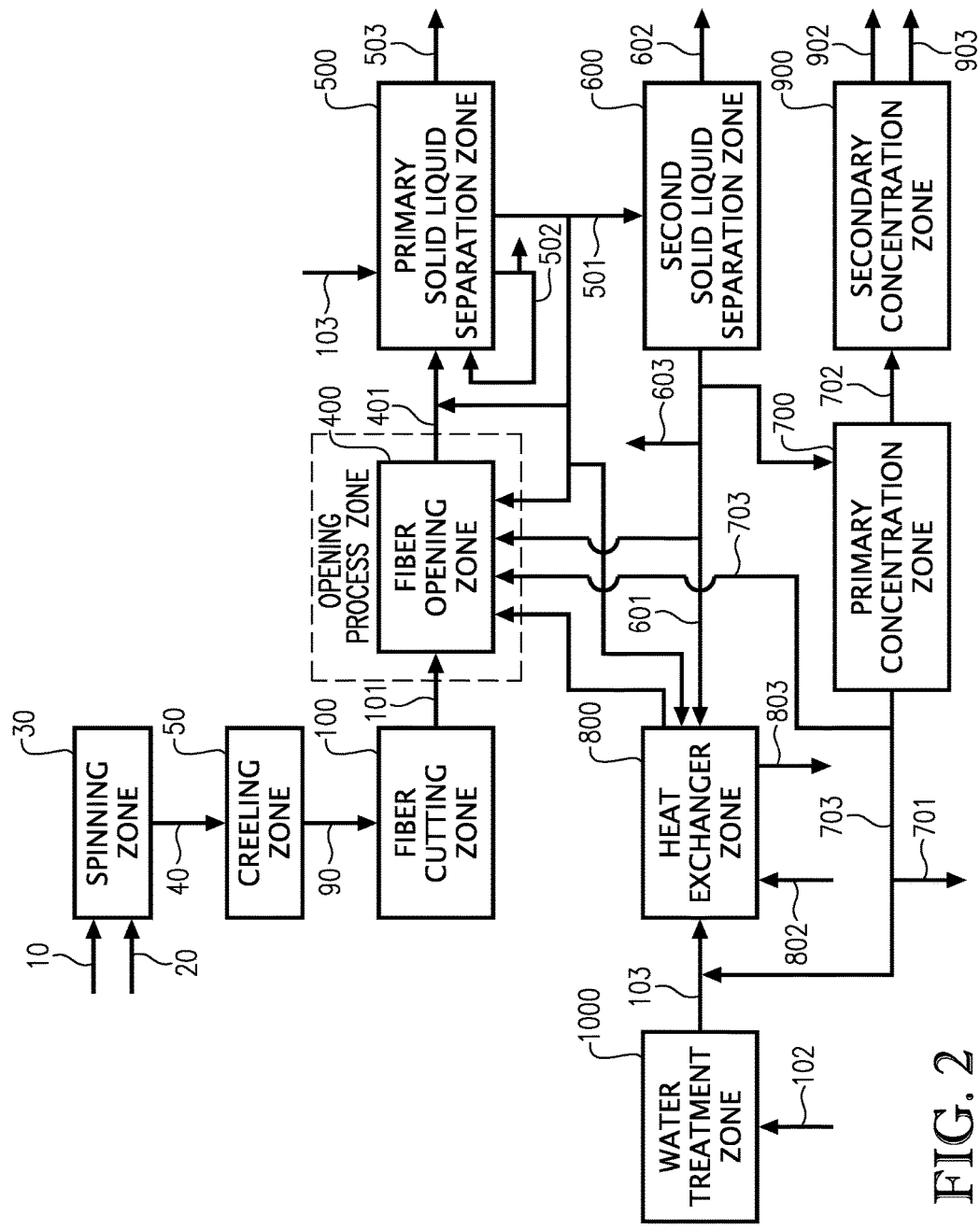
FIG. 2 illustrates an embodiment of the invention wherein the microfiber product stream is produced in a one step opening zone.

In one embodiment of the invention as shown in FIG. 2, a process for producing a microfiber product stream is provided. The process comprises:

(A) contacting short cut multicomponent fibers 101 having a length of less than 25 millimeters with a heated aqueous stream 801 in a fiber opening zone 400 to remove a portion of the water dispersible sulfopolyester to produce an opened microfiber slurry 401; wherein the short cut multicomponent fibers comprise at least one water dispersible sulfopolyester and at least one water non-dispersible synthetic polymer immiscible with the water dispersible sulfopolyester; wherein the heated aqueous stream 801 is at a temperature of at least 40° C.; wherein the opened microfiber slurry 401 comprises water, microfiber, and water dispersible sulfopolyester; and (B) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

Figure 4:
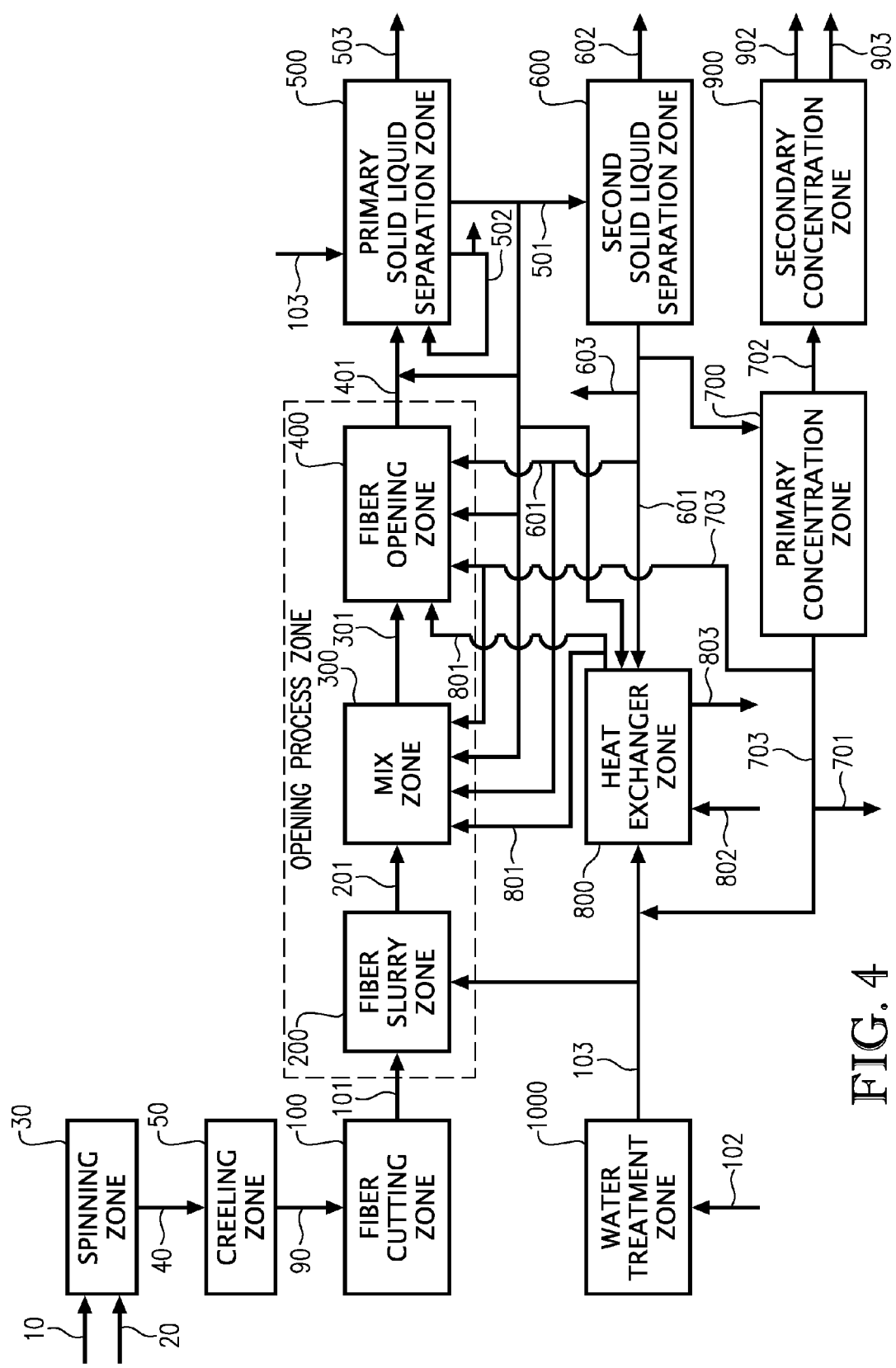
FIG. 4 illustrates an embodiment of the invention wherein the microfiber product stream is produced in a three step opening zone.

In this embodiment of the invention, the fiber slurry zone 200, mix zone 300, and the fiber opening zone 400 as shown in FIG. 4 have been combined into one unit operation in the opening process zone 1100. The opening process zone 1100 comprises a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800 to produce a heated aqueous stream. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, a portion of the primary recovered water stream 703, a portion of the first mother liquor stream 501, and a portion the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800. The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the heated treated aqueous stream 801 are routed to a fiber opening zone 400 to generate opened microfiber slurry 401.

One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Figure 5:
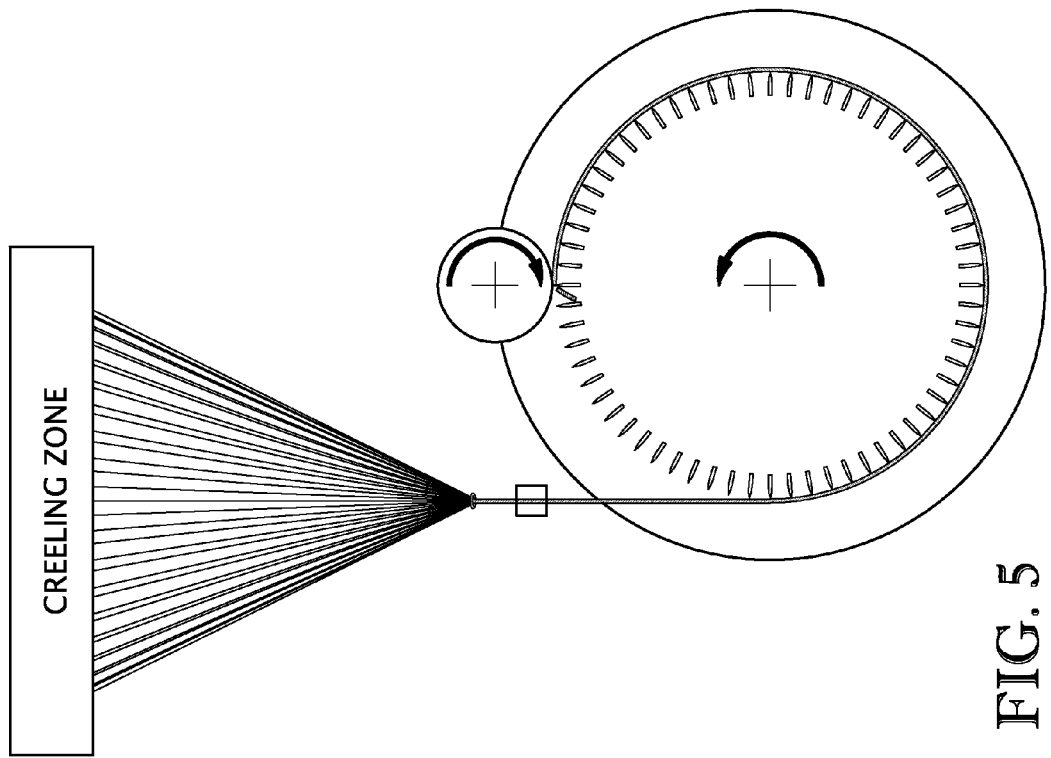
FIG. 5 illustrates an embodiment of the process for cutting multicomponent fibers to produce short cut multicomponent fibers.

In this embodiment of the invention, fiber slurry zone 200, mix zone 300, and fiber opening zone 400 as shown in FIG. 4 are combined and accomplished in a single unit operation as shown in FIG. 2. In this embodiment, the cut multicomponent fiber stream 101 is routed directly to single unit operation where it mixed with the heated aqueous stream 801 within fiber opening zone 400. For example, a batch mixing device where the opening or washing of the cut multicomponent fibers is accomplished in a single batch mixing device wherein cut multicomponent fiber stream 101 and the heated aqueous stream 801 are added directly to the in the fiber opening zone 400. The fiber opening zone can comprise at least one mix tank. In this embodiment, the combined functions of zones 200, 300 and 400 may be accomplished in a continuous stirred tank reactor as shown in FIGS. 5b and 5c. In this embodiment, the combined functions of zones 200, 300 and 400 may be accomplished in any batch or continuous mixing device capable of achieving the functional requirements of residence time, temperature, and mixing shear forces required for proper function of zones 200, 300, and 400.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Figure 6A:
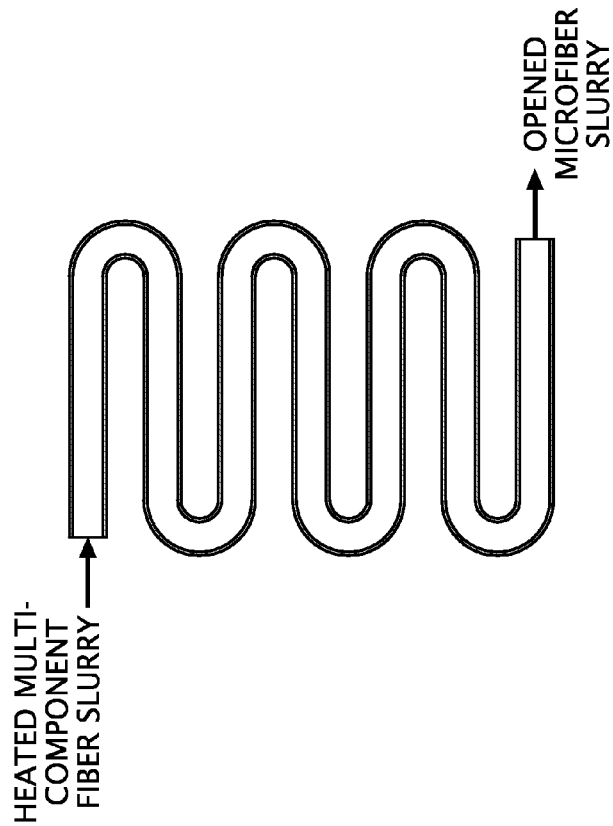
FIG. 6a illustrates an embodiment of the opening zone wherein the opening zone comprises a pipe.
Figure 6C:
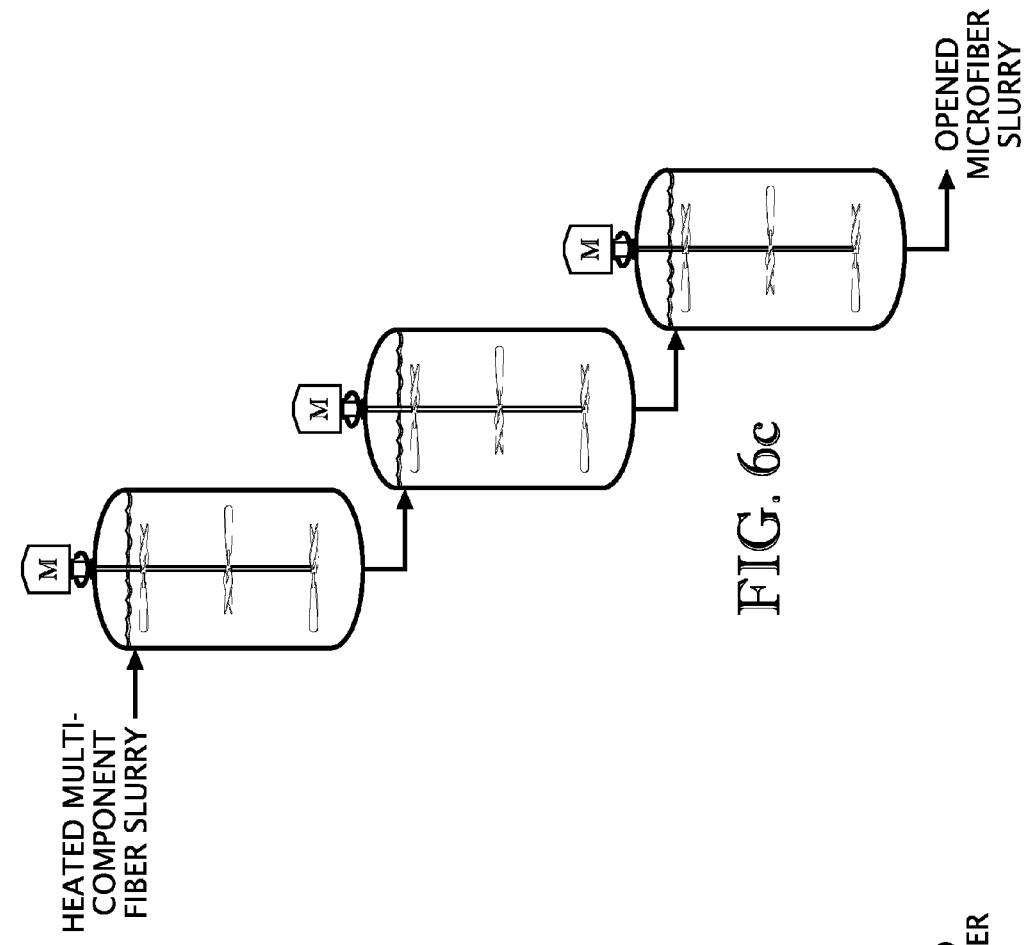
FIG. 6c illustrates an embodiment of the opening zone wherein the opening zone comprises more than one continuous stirred tanks.
Figure 6B:
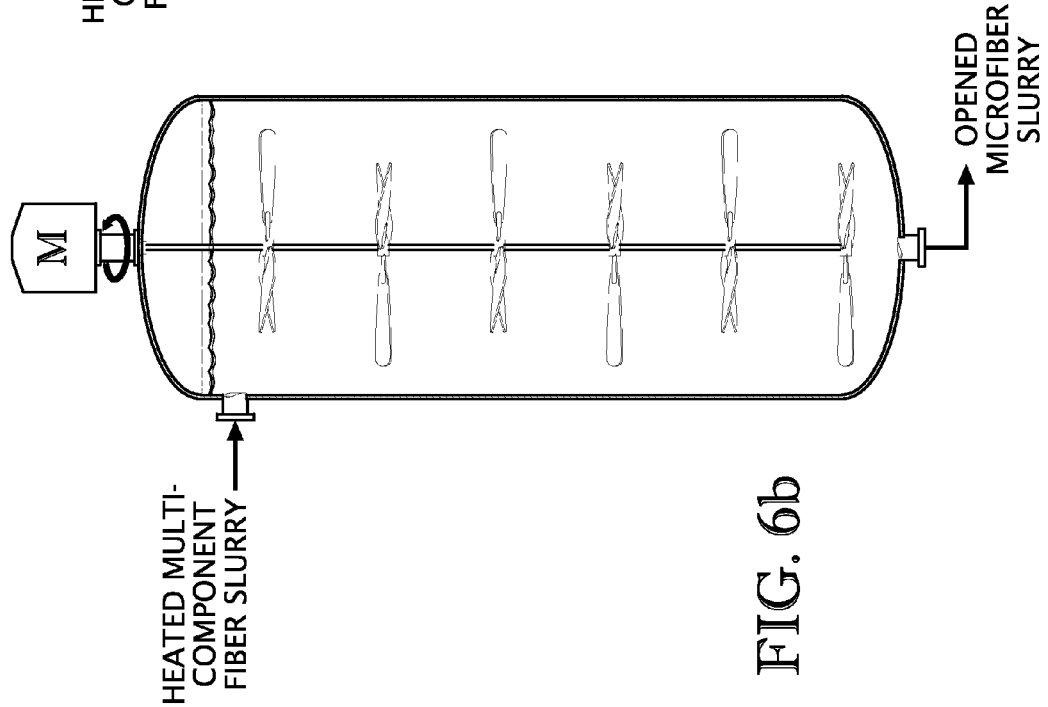
FIG. 6b illustrates an embodiment of the opening zone wherein the opening zone comprises a continuous stirred tank.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{v A}$$

Where:
$D_H$ is the hydraulic diameter of the pipe; L, (m).
Q is the volumetric flow rate (m$^3$/s).
A is the pipe cross-sectional area (m$^2$).
v is the mean velocity of the object relative to the fluid (SI units: m/s).
$\mu$ is the dynamic viscosity of the fluid (Pa·s or N·s/m$^2$ or kg/(m·s)).
v is the kinematic viscosity (v=$\mu$/$\rho$) (m$^2$/s).
$\rho$ is the density of the fluid (kg/m$^3$).
For flow in a pipe of diameter D, experimental observations show that for fully developed flow, laminar flow occurs when $Re_D$<2000, and turbulent flow occurs when $Re_D > 4000$. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm² of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber sturry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one set of pressure rollers.

In other embodiments of the invention, the force exerted by mechanical dewatering for each set of pressure rollers can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

Figure 7A:
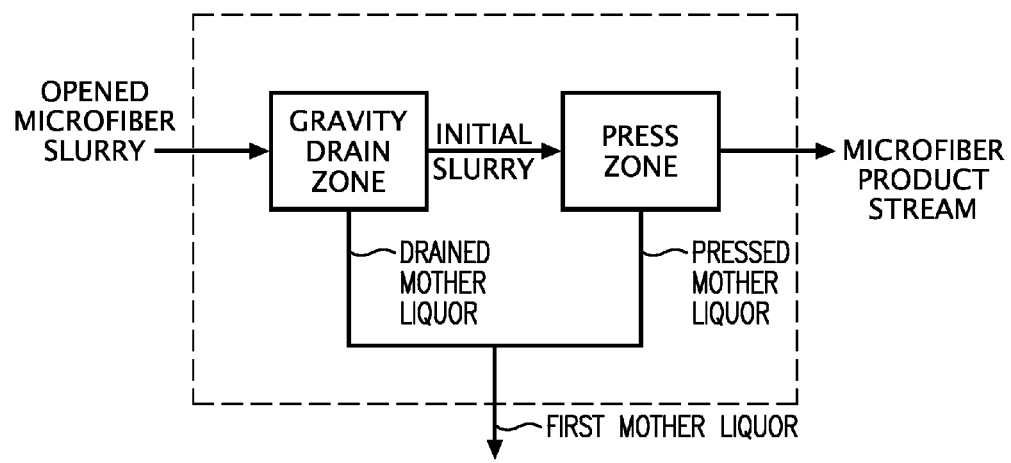
FIGS. 7a and 7b illustrate an embodiment of the primary solid liquid separation zone.
Figure 7B:
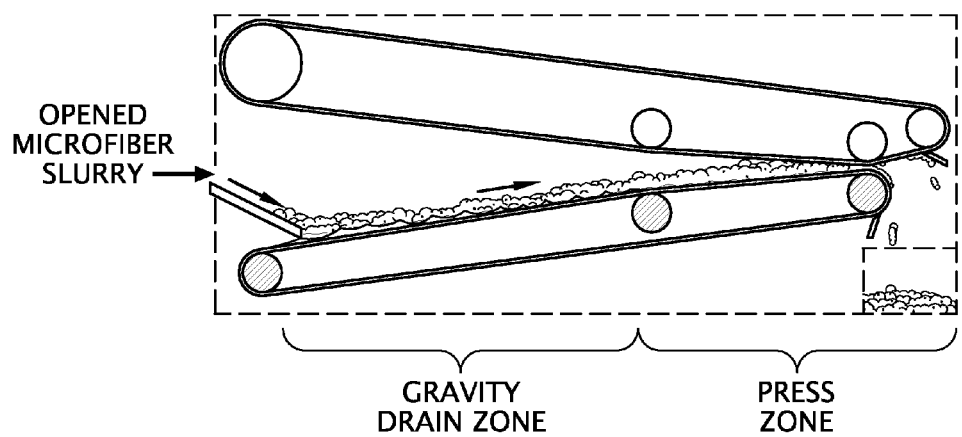

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the fiber opening zone 400, or the heat exchanger zone 800 prior to being routed to Zone 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function. \

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber opening zone 400, or the heat exchanger zone 800 prior to being routed to Zone 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber opening zone 400, or the heat exchanger zone 800 prior to being routed to Zone 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentration stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

Figure 3A:
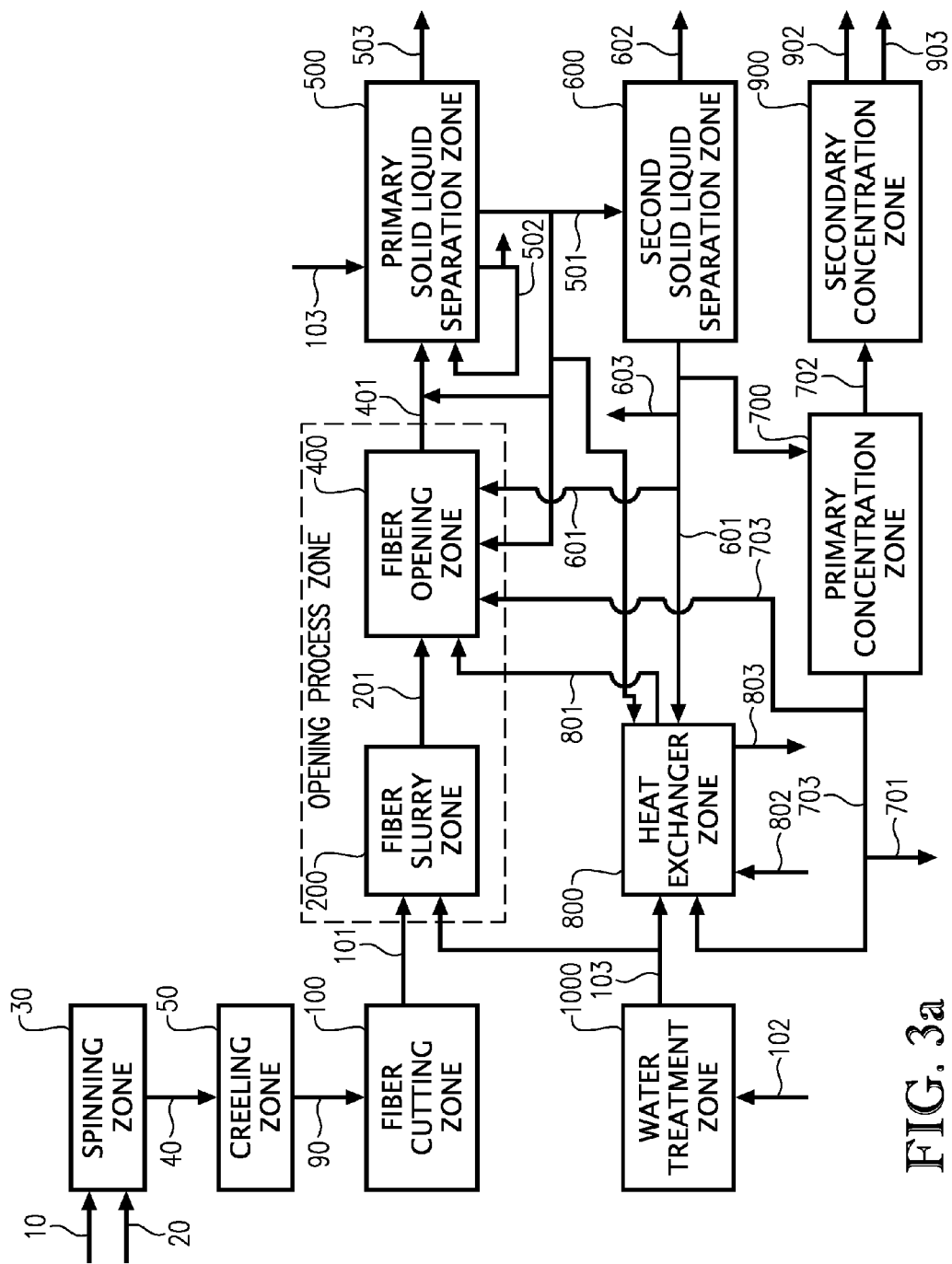
FIGS. 3a and 3b illustrate an embodiment of the invention wherein the microfiber product stream is produced in a two step opening zone.

In another embodiment of the invention, as shown in FIG. 3a, a process for producing a microfiber product stream is provided. The process comprises:
(A) contacting short cut multicomponent fibers 101 having a length of less than 25 millimeters with a treated aqueous stream 103 in a fiber slurry zone 200 to produce a short cut multicomponent fiber slurry 201; wherein the short cut multicomponent fibers 101 comprise at least one water dispersible sulfopolyester and at least one water non-dispersible synthetic polymer immiscible with the water dispersible sulfopolyester; and wherein the treated aqueous stream 103 is at a temperature of less than 40° C.;
(B) contacting the short cut multicomponent fiber slurry 201 and a heated aqueous stream 801 in a fiber opening zone 400 to remove a portion of the water dispersible sulfopolyester to produce an opened microfiber slurry 401; wherein the opened microfiber slurry comprises water non-dispersible polymer microfiber, water dispersible sulfopolyester, and water; and
(C) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention, the mix zone 300 and the fiber opening zone 400 as shown in FIG. 4 have been combined into one unit operation in the opening process zone 1100. The opening process zone 1100 comprises a fiber slurry zone 200 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a fiber slurry zone 200. In another embodiment, at least a portion of the treated aqueous stream 103 is routed to heat exchanger zone 800 and at least a portion of the treated aqueous stream 103 is routed to the fiber slurry zone 200. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800. The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the treated aqueous stream 103 are routed to a fiber slurry zone 200 to generate a cut multicomponent fiber slurry 201 comprising water and cut multicomponent fibers. In one embodiment, the weight % of cut multicomponent fibers in the cut multicomponent fiber slurry 201 can range from about 35 weight % to about 1% weight %, from about 25 weight % to about 1 weight %, from about 15 weight % to about 1 weight %, or from about 7 weight % to about 1 weight %.

The temperature of the cut multicomponent fiber slurry 201 can range from about 5 degrees centigrade to about 45 degrees centigrade, from about 10 degrees centigrade to about 35 degrees centigrade, or from about 10 degrees centigrade to about 25 degrees centigrade. In one embodiment, fiber slurry zone 200 comprises a tank with sufficient agitation to generate a suspension of cut multicomponent fiber in a continuous aqueous phase.

Any equipment known in the art suitable for mixing a solid with water and maintaining the resulting suspension of cut multicomponent fibers in the continuous phase may be used in the fiber slurry zone 200. The fiber slurry zone 200 can comprise batch or continuous mixing devices operated in continuous or batch mode. Suitable devices for use in the fiber slurry zone 200 include, but are not limited to, a hydro-pulper, a continuous stirred tank reactor, a tank with agitation operated in batch mode.

The cut multicomponent fiber slurry 201 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{vA}$$

Where:
$D_H$ is the hydraulic diameter of the pipe; L, (m).
Q is the volumetric flow rate (m³/s).
A is the pipe cross-sectional area (m²).

v is the mean velocity of the object relative to the fluid (SI units: m/s).

$\mu$ is the dynamic viscosity of the fluid (Pa·s or N·s/m$^2$ or kg/(m·s)).

$v$ is the kinematic viscosity ($v=\mu/\rho$) (m$^2$/s).

$\rho$ is the density of the fluid (kg/m$^3$).

For flow in a pipe of diameter D, experimental observations show that for fully developed flow, laminar flow occurs when $Re_D<2000$, and turbulent flow occurs when $Re_D>4000$. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm$^2$ of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber sturry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one set of pressure rollers.

In other embodiments of the invention, the force exerted by mechanical dewatering for each set of pressure rollers can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6*b*. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the fiber slurry zone 200, the fiber opening zone 400, or the heat exchanger zone 800 prior to being routed to Zones 200 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the fiber opening zone 400, or the heat exchanger zone 800 prior to being routed to Zones 200 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber slurry zone 200, the fiber opening zone 400, or the heat exchanger zone 800 prior to being routed to Zones 200 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentration stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

Figure 3B:
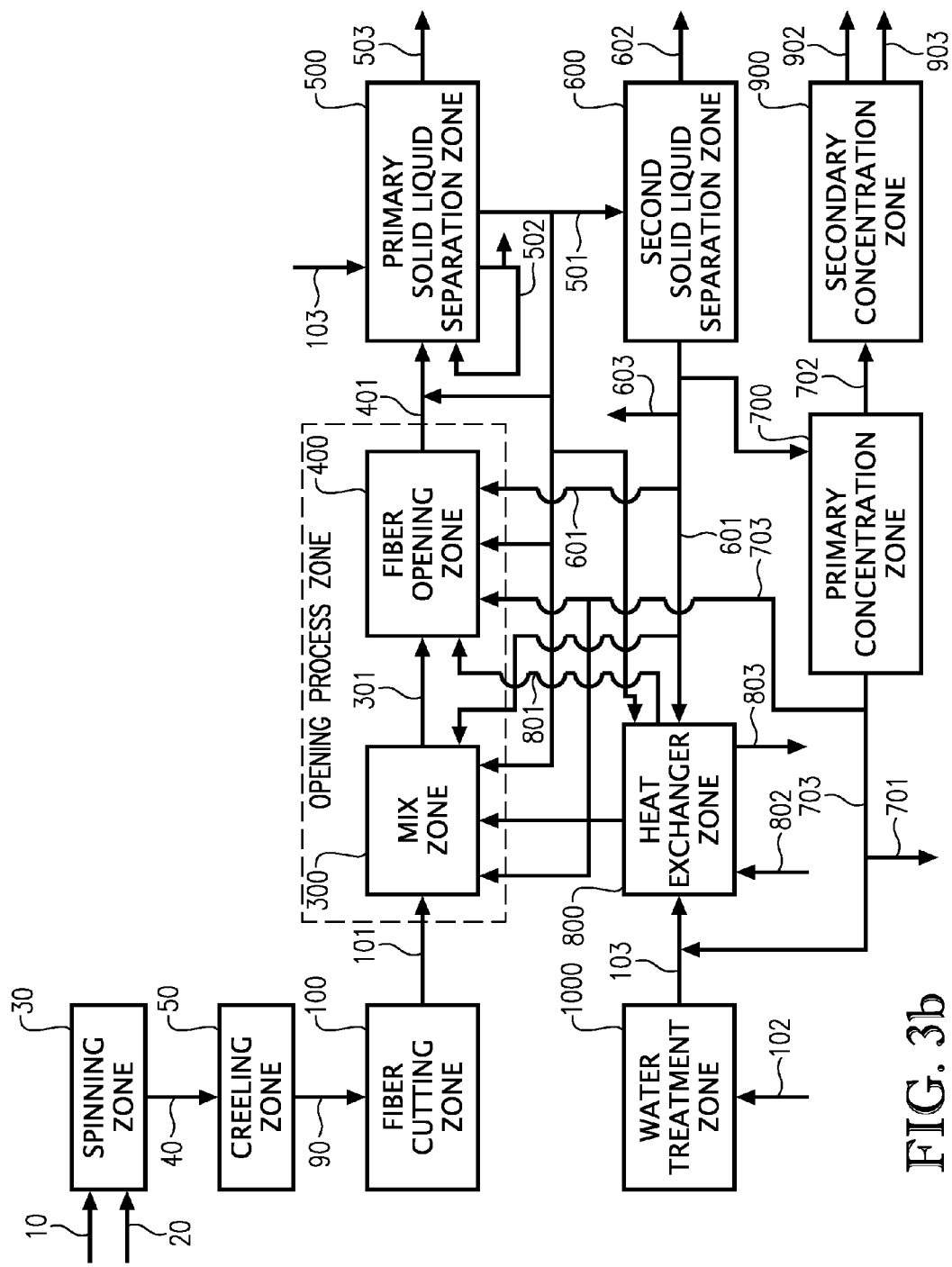

In another embodiment of the invention, as shown in FIG. 3b, a process for producing a microfiber product stream is provided. The process comprises:

(A) contacting short cut multicomponent fibers 101 having a length of less than 25 millimeters with a heated aqueous stream 801 in a mix zone to produce a short cut multicomponent fiber slurry 301; wherein the short cut multicomponent fibers 101 comprise at least one water dispersible sulfopolyester and at least one water non-dispersible polymer immiscible with the water dispersible sulfopolyester; and wherein the heated aqueous stream 801 is at a temperature of 40° C. or greater;

(B) routing the short cut multicomponent fiber slurry 301 and optionally, a heated aqueous stream 801, to a fiber opening zone 400 to remove a portion of the water dispersible sulfopolyester to produce an opened microfiber slurry 401; wherein the opened microfiber slurry 401 comprises water non-dispersible polymer microfiber, water dispersible sulfopolyester, and water; and (C) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention as shown in FIG. 3b, the fiber slurry zone 200 and the fiber mix zone 300 have been combined into one unit operation in the opening process zone 1100. The opening process zone 1100 comprises a mix zone 200 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a mix zone 300. In another embodiment, at least a portion of the treated aqueous stream 103 is routed to heat exchanger zone 800 and at least a portion of the treated aqueous stream 103 is routed to the mix zone 300. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800, The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the heated aqueous stream 801 are routed to a mix zone 300 to generate a heated multicomponent fiber slurry 301 comprising water and cut multicomponent fibers The temperature of the heated multicomponent fiber slurry 301 influences the separation of the water dispersible sulfopolyester portion of the cut multicomponent fiber from the water non-dispersible polymer portion of the cut multicomponent fiber in fiber opening zone 400. In other embodiments of the invention, the temperature of the heated multicomponent fiber slurry 301 can range from about 55 degrees centigrade to about 100 degrees centigrade, from about 60 degrees centigrade to about 90 degrees centigrade, or from about 65 degrees centigrade to about 80 degrees centigrade.

The weight % of cut multicomponent fiber in the heated multicomponent fiber slurry 301 can be controlled. In other embodiments, the weight % of cut multicomponent fibers in the heated multicomponent fiber slurry 301 can range from about 10 weight % to about 0.1% weight %, from about 5 weight % to about 0.2 weight %, from about 3 weight % to about 0.3 weight %, or from about 2 weight % to about 0.4 weight %.

Any device known in the art capable of mixing the heated aqueous stream 801 with the cut multicomponent fibers 101 may be used in mix zone 300. Suitable devices include both continuous and batch mixing devices. In one embodiment, a suitable mixing device for mix zone 300 comprises a tank and an agitator. In another embodiment, a suitable mixing device comprises a pipe or conduit.

In other embodiments, a suitable mixing device in mix zone 300 comprises a pipe or conduit with a diameter such that the speed in the conduit is sufficient to mix the cut multicomponent fiber slurry 201 and the heated aqueous stream 801 wherein less than about 2 weight %, less than about 1 weight %, or less than about 0.5 weight of cut multicomponent mass entering the conduit per minute settles out and accumulates in the conduit.

The heated multicomponent fiber slurry 301 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6*b* and 6*c*, and a pipe with sufficient flow to minimize solids from settling out of the slurry as shown in FIG. 6*a*. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{vA}$$

Where:

$D_H$ is the hydraulic diameter of the pipe; L, (m).

Q is the volumetric flow rate (m$^3$/s).

A is the pipe cross-sectional area (m$^2$).

v is the mean velocity of the object relative to the fluid (SI units: m/s).

$\mu$ is the dynamic viscosity of the fluid (Pa·s or N·s/m$^2$ or kg/(m·s)).

v is the kinematic viscosity (v=$\mu/\rho$) (m$^2$/s).

$\rho$ is the density of the fluid (kg/m$^3$).

For flow in a pipe of diameter D, experimental observations show that for fully developed flow, laminar flow occurs when $Re_D$<2000, and turbulent flow occurs when $Re_D$>4000. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm$^2$ of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber sturry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one pressure roller and a fixed surface.

In other embodiments of the invention, the force exerted by mechanical dewatering can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the mix zone 300, the fiber opening zone 400, or the heat exchanger zone 800 prior to being routed to Zones 200, 300 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentration stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

In another embodiment of the invention, as shown in FIG. 4, a process for producing a microfiber product stream is provided. The process comprises:
(A) contacting short cut multicomponent fibers 101 having a length of less than 25 millimeters with a treated aqueous stream 103 in a fiber slurry zone 200 to produce a short cut multicomponent fiber slurry 201; wherein the short cut multicomponent fibers 101 comprise at least one water dispersible sulfopolyester and at least one water non-dispersible synthetic polymer immiscible with the water dispersible sulfopolyester; and wherein the treated aqueous stream 103 is at a temperature of less than 40° C.;
(B) contacting the short cut multicomponent fiber slurry 201 with a heated aqueous stream 801 in a mix zone 300 to produce a heated multicomponent fiber slurry 301;
(C) routing the heated multicomponent fiber slurry 301 to a fiber opening zone 400 to remove a portion of the water dispersible sulfopolyester to produce an opened microfiber slurry 401; and
(D) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention as shown in FIG. 4, the opening process zone 1100 comprises a fiber slurry zone 200, mix zone 300 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a fiber slurry zone 200. In another embodiment, at least a portion of the treated aqueous stream 103 is routed to heat exchanger zone 800 and at least a portion of the treated aqueous stream 103 is routed to the fiber slurry zone 200. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800.

The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the treated aqueous stream 103 are routed to a fiber slurry zone 200 to generate a cut multicomponent fiber slurry 201 comprising water and cut multicomponent fibers. In one embodiment, the weight % of cut multicomponent fibers in the cut multicomponent fiber slurry 201 can range from about 35 weight % to about 1% weight %, from about 25 weight % to about 1 weight %, from about 15 weight % to about 1 weight %, or from about 7 weight % to about 1 weight %.

The temperature of the cut multicomponent fiber slurry 201 can range from about 5 degrees centigrade to about 45 degrees centigrade, from about 10 degrees centigrade to about 35 degrees centigrade, or from about 10 degrees centigrade to about 25 degrees centigrade. In one embodiment, fiber slurry zone 200 comprises a tank with sufficient agitation to generate a suspension of cut multicomponent fiber in a continuous aqueous phase.

Any equipment known in the art suitable for mixing a solid with water and maintaining the resulting suspension of cut multicomponent fibers in the continuous phase may be used in the fiber slurry zone 200. The fiber slurry zone 200 can comprise batch or continuous mixing devices operated in continuous or batch mode. Suitable devices for use in the fiber slurry zone 200 include, but are not limited to, a hydro-pulper, a continuous stirred tank reactor, a tank with agitation operated in batch mode.

The cut multicomponent fiber slurry 201 and a heated aqueous stream 801 are routed to a mix zone 300 and combined to generate a heated multicomponent fiber slurry 301. The temperature of the heated multicomponent fiber slurry 301 influences the separation of the water dispersible sulfopolyester portion of the cut multicomponent fiber from the water non-dispersible polymer portion of the cut multicomponent fiber in fiber opening zone 400. In other embodiments of the invention, the temperature of the heated multicomponent fiber slurry 301 can range from about 55 degrees centigrade to about 100 degrees centigrade, from about 60 degrees centigrade to about 90 degrees centigrade, or from about 65 degrees centigrade to about 80 degrees centigrade.

The weight % of cut multicomponent fiber in the heated multicomponent fiber slurry 301 can be controlled. In other embodiments, the weight % of cut multicomponent fibers in the heated multicomponent fiber slurry 301 can range from about 10 weight % to about 0.1% weight %, from about 5 weight % to about 0.2 weight %, from about 3 weight % to about 0.3 weight %, or from about 2 weight % to about 0.4 weight %.

Any device known in the art capable of mixing the heated aqueous stream 801 with the cut multicomponent fiber slurry 201 may be used in mix zone 300. Suitable devices include both continuous and batch mixing devices. In one embodiment, a suitable mixing device for mix zone 300 comprises a tank and an agitator. In another embodiment, a suitable mixing device comprises a pipe or conduit.

In other embodiments, a suitable mixing device in mix zone 300 comprises a pipe or conduit with a diameter such that the speed in the conduit is sufficient to mix the cut multicomponent fiber slurry 201 and the heated aqueous stream 801 wherein less than about 2 weight %, less than about 1 weight %, or less than about 0.5 weight of cut multicomponent mass entering the conduit per minute settles out and accumulates in the conduit.

The heated multicomponent fiber slurry 301 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{\nu} = \frac{Q D_H}{\nu A}$$

Where:
$D_H$ is the hydraulic diameter of the pipe; L, (m).
Q is the volumetric flow rate (m³/s).
A is the pipe cross-sectional area (m²).
v is the mean velocity of the object relative to the fluid (SI units: m/s).
μ is the dynamic viscosity of the fluid (Pa·s or N·s/m² or kg/(m·s)).
ν is the kinematic viscosity (ν=μ/ρ) (m²/s).
ρ is the density of the fluid (kg/m³).

For flow in a pipe of diameter D, experimental observations show that for fully developed flow, laminar flow occurs when $Re_D$<2000, and turbulent flow occurs when $Re_D$>4000. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. Wash liquor stream 502 can contain microfiber. In one embodiment, the grams of microfiber mass breaking though the filter media with openings up to 2000 microns in the primary solid liquid separation zone 500 ranges from about 1 to 2 grams/cm² of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber sturry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one pressure roller and a fixed surface.

In other embodiments of the invention, the force exerted by mechanical dewatering can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquor stream 501 can be recycled to the fiber slurry zone 200, the mix zone 300, the fiber opening zone 400, or the heat exchanger zone 800 prior to being routed to Zones 200, 300 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone can be subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

In one embodiment of the invention, a process is provided to recover a primary polymer concentrate stream (702) comprising routing the second mother liquor stream (601) to a primary concentration zone (700) to remove water from the second mother liquor stream (601) to produce the primary polymer concentrate stream (702) and the primary recovered water stream (703); wherein the primary concentration zone (700) comprises at least one ultrafiltration membrane. The term "membrane" or "filter" as used in this disclosure refers to a thin, film-like structure that separates two fluids. It acts as a selective barrier, allowing some particles or chemicals to pass through, but not others. A membrane is a layer of material which serves as a selective barrier between two phases and remains impermeable to specific particles, molecules, or substances when exposed to the action of a driving force. Some components are allowed passage by the membrane into a permeate stream, whereas others are retained by it and accumulate in the retentate stream.

Figure 8:
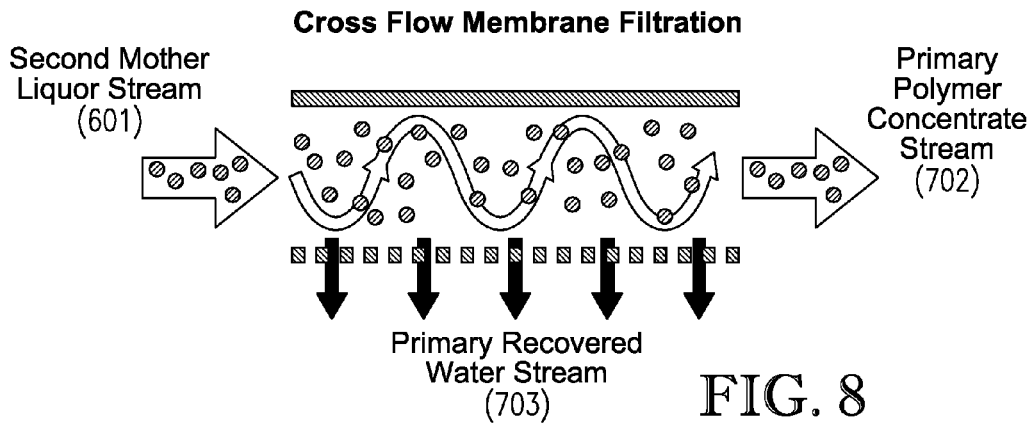
FIG. 8 illustrates an embodiment of the primary concentration zone (700) comprising a cross-flow membrane.

Membranes can be utilized in a cross flow filtration device as illustrated in FIG. 8. Cross flow filtration involves contacting a feed liquid with a membrane surface while the feed liquid flows across or parallel to the membrane surface. A feed pump and a valve on the retentate stream create a positive trans-membrane pressure that forces a portion of the feed stream to pass through the membrane, forming permeate. Any components of the feed stream than do not pass through the membrane, and remain behind generate the retentate stream. Membrane surface properties including charge and hydrophobicity, membrane polymer type, and membrane pore sizes influence the separation. It is desirable to have sufficient flow velocity past the membrane surface to minimize the membrane fouling rate caused by solids collecting and concentrating near or in the membrane. Available membrane technology includes, but is not limited to, reverse osmosis (RO), nanofiltration (NF), ultrafiltration (UF), and microfiltration (MF). Generally, nanofiltration (NF) is a cross-flow filtration technology which ranges between ultrafiltration (UF) and reverse osmosis (RO). Nanofiltration membranes are typically rated by molecular weight cut-off (MWCO), which is defined as the smallest particle that will pass through a membrane to become permeate where retention of the larger particles is greater than 90%. Nanofiltration MWCO is typically less than about 1000 atomic mass units (daltons). Generally, ultrafiltration (UF) is a cross-flow filtration technology which ranges between nanofiltration (NF) and microfiltration (MF). Ultrafilter membranes are typically rated by molecular weight cut-off (MWCO). Ultrafiltration MWCO typically ranges from about $10^3$ to about $10^6$ atomic mass units (daltons).

In one embodiment of the invention, the second mother liquor stream (601) is routed to a primary concentration zone (700) comprising at least one cross-flow membrane utilized in cross-flow filtration. The cross-flow membrane utilized in the primary separation zone (700) can be an ultrafiltration membrane. The functional selective barrier in the ultrafiltration membrane comprises at least one polymer. The polymer can be selected from the following: polysulfone (PS), polyethersulfone (PES), polyamide (PA), fluoro polymer, cellulosic polymer, and blends of these polymers. The temperature of the second mother liquor stream (601) can range from about 10° C. to about 70° C., about 15° C. to about 70° C., about 20° C. to about 70° C., about 25° C. to about 70° C., about 35° C. to about 70° C., and about 45° C. to about 70° C. There is no limitation to the volumetric flow of the second mother liquor stream.

The configuration of the cross-flow membrane in the primary concentration zone (700) can be any that is known in the art. In one embodiment of the invention, at least one cross-flow membrane is contained in at least one spiral membrane cartridge. Multiple spiral membrane cartridges can be utilized in the primary concentration zone (700) and can be placed in series.

The primary recovered water stream (703) comprises water in a weight % greater than the wt. % water in the second mother liquor stream (601). The weight percent of sulfopolyester in the primary recovered water stream (703) can range from 0 to about 1 wt. %, from 0 to about 0.5 wt. %, from 0 to about 0.1 wt. %, from 0 to about 0.08 wt. %, from 0 to about 0.05 wt. %, from 0 to about 0.04 wt. %, and from 0 to about 0.01 wt. %. In one embodiment, the weight % of sulfopolyester in the primary recovered water stream (703) is less than 0.02%.

The primary polymer concentrate stream (702) comprises sulfopolyester polymer in a weight % greater than the wt. % of sulfopolyester polymer in the second mother liquor stream (601). The permeate flux (primary recovered water stream 703) is defined as the liters/square meter of filter area/hr. The permeate flux rate (primary recovered water stream 703) generally decreases as the sulfopolyester concentration increases in the second mother liquor stream (601). For example, at 1 wt % sulfopolyester in the second mother liquor stream (601) and 110 psi average pressure utilizing cross flow filtration in the primary concentration zone (700), the permeate flux rate (primary recovered water stream 703) can range from about 50 (L/m² hr) to about 370 (L/m² hr). At 15 wt % sulfopolyester in the second mother liquor stream and 110 psi average pressure utilizing cross flow filtration in the primary concentration zone (700), the permeate flux rate (primary recovered water stream 703) can range from about 30 (L/m² hr) to about 90 (L/m² hr). At 30% sulfopolyester in the second mother liquor stream (601) and 110 psi average pressure utilizing cross flow filtration in the primary concentration zone (700), the permeate flux rate (primary recovered water stream 703) can range from about 16 (L/m² hr) to about 50 (L/m² hr). One object of this invention is to generate a primary recovered water stream comprising water with a very low concentration of sulfopolyester. In one embodiment of the invention, the weight percent of sulfopolyester in the primary recovered water stream (703) utilizing a primary concentration zone (700) having ultrafiltration membranes ranges from about 0.01 wt. % to about 0.08 wt. %.

Figure 9:
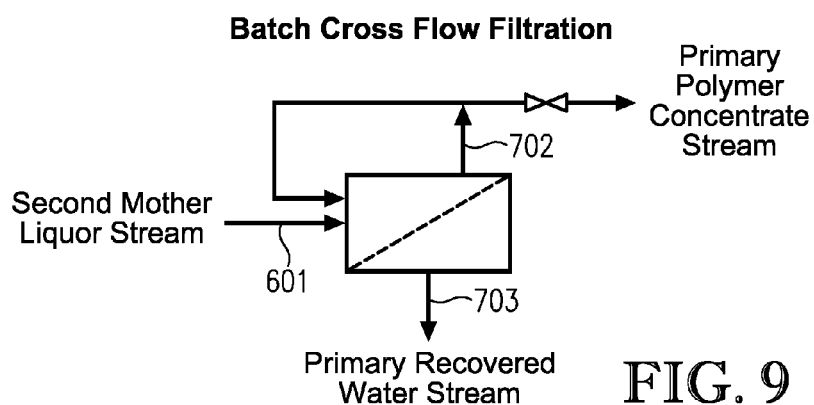
FIG. 9 illustrates an embodiment of the primary concentration zone (700) comprising a batch cross-flow membrane process.

The cross flow filtration in the primary concentration zone (700) can be accomplished in a batch or continuous fashion. In one embodiment of this invention, the cross flow filtration zone comprises at least one ultrafiltration membrane in a batch operation as illustrated in FIG. 9. A second mother liquor stream (601) is routed to the primary concentration zone (700) comprising at least one ultrafiltration membrane. Primary polymer concentrate (702) is recycled to the feed to the primary concentration zone (700) until the desired sulfopolyester concentration is reached. The primary polymer concentrate (702) becomes increasing concentrated in sulfopolyester molecules that will not cross the ultrafiltration membrane into the primary recovered water stream (703).

Figure 10:
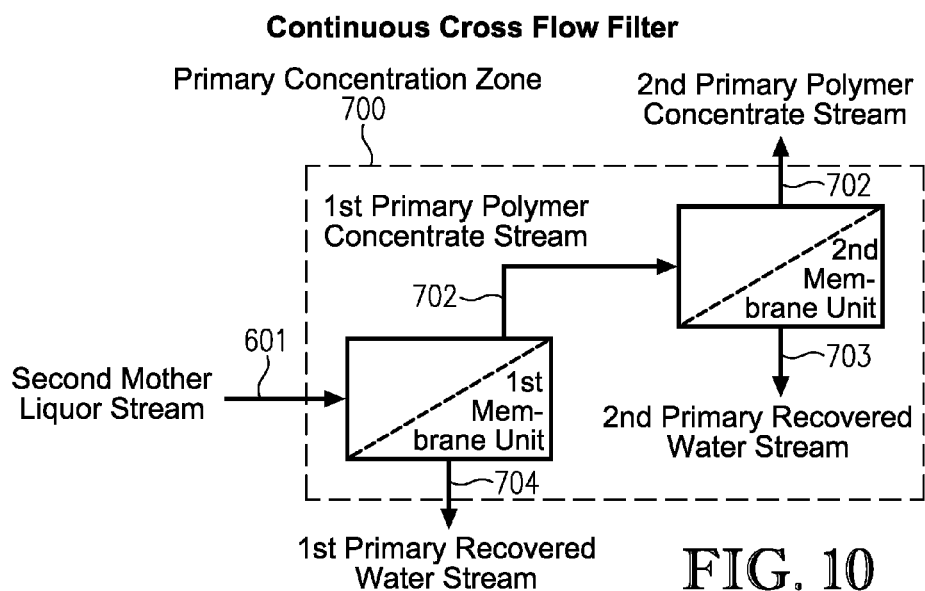
FIG. 10 illustrates an embodiment of the primary concentration zone (700) comprising a continuous cross-flow membrane process with a first membrane unit and a second membrane unit.

In another embodiment of this invention, the cross flow filtration in the primary concentration zone (700) is accomplished in a continuous membrane filtration system that comprises one or more membrane units in series relative to the flow path as illustrated in FIG. 10. In one embodiment of the invention, each membrane unit comprises at least one ultrafiltration membrane and may contain multiple ultrafiltration membranes in parallel to achieve the desired membrane filtration area needed to accommodate the feed rate of the second mother liquor stream (601). In another embodiment, membrane units downstream of the first membrane unit may comprise membranes other than ultrafiltration membranes. For example, a continuous cross flow filtration unit for the generation of the primary polymer concentrate (702) from the second mother liquor stream (601) can comprise two membrane units in series wherein the first membrane unit comprises at least one ultrafiltration membrane and the second membrane unit comprises at least one nanofiltration membrane. However, embodiments of this invention are not limited to two membrane unit zones. Multiple membrane unit zones may be utilized, and these membrane unit zones can be operated at different pressures.

In one embodiment, a fouled membrane can be regenerated to allow the membrane to be reused. A fouled membrane is defined as a membrane in which the permeate flux (primary recovered water stream 703) for a given trans membrane pressure has decreased relative to a new membrane by about 5% to about 10%, about 5% to about 15%, about 8% to about 20%, and about 10% to about 30%. The regeneration of the fouled membrane can be accomplished by any method known in the art. In one embodiment of the invention, the regenerating process comprises: (1) flushing the fouled membrane with treated water, (2) circulating an aqueous detergent solution compatible with the membrane; and 3) flushing the membrane with treated water to displace the aqueous detergent solution.

Treated water (103) used to wash the fouled membrane comprises water in which the concentration of monovalent metal cations is less than 1000 ppm, less than 500 ppm, less than 100 ppm, and less than 50 ppm and the concentration of divalent and multivalent cations is less than 50 ppm. In another embodiment of this invention, the concentration of divalent and multivalent cations in stream 103 is less than 25 ppm. Acceptable sources of treated water comprise distilled water and deionized water.

In one embodiment of the invention, the aqueous detergent solution comprises at least one anionic detergent and water. The concentration of the anionic detergent in the aqueous detergent solution can range from about 0.1 wt % to about 5 wt %, from about 0.5 wt % to about 4 wt %, from about 1 wt % to about 3 wt %. Typically, the water utilized is treated water as described previously. An example of an anionic detergent is alkylbenzene sulfonate detergents having a $C_{10}$-$C_{16}$ alkyl group. A specific formulation of an aqueous alkylbenzene sulfonate detergent solution comprises the ingredients shown in Table 1.

TABLE 1

| Ingredient | Wt % |
| --- | --- |
| Water | 40-60% |
| Sodium ($C_{10}$-$C_{16}$) Alkylbenzene Sulfonate | 10-20% |
| Alcohol Ethoxylate | 1-5% |
| Coconut Diethyanolamide | 1-5% |
| Sodium Xylene Sulfonate | 2-7% |
| Tripotassium EDTA | 1-5% |

Commercial examples of aqueous detergent solutions or detergents that can be utilized to produce aqueous detergent solutions include, but are not limited to, Liqui-Nox® detergent and Alcanoedetergent obtained from Alconox Company in White Plains, N.Y.

The regenerating process for a fouled membrane can be conducted at a temperature ranging from about 20° C. to about 70° C. or from about 40° C. to about 60° C. The first step of the membrane cleaning procedure comprises displacing the primary polymer concentrate stream (702) with deionized water. Next, the fouled surface of the membrane is contacted with an aqueous anionic detergent with a residence time sufficient to recover at least about 80% of the original clean membrane flux rate. In other embodiments of the invention, the fouled surface of the membrane is contacted with an aqueous anionic detergent for a residence time ranging from about 2 to about 6 hours or from about 3 to about 4 hours.

In one embodiment of the regenerating process, the fouled membrane is regenerated by a process comprising: 1) flushing the fouled membrane with treated water to displace the primary polymer concentrate stream (702); 2) circulating 1 wt % Liqui-Nox® detergent solution in deionized water for 3 hours at 50° C., (3) flushing the system with treated water to displace the Liqui-Nox® detergent solution, and (4) circulating treated water for 1 hour at 50° C. In another embodiment of the membrane regenerating method, Alconox® detergent is the cleaning agent instead of Liqui-Nox® detergent.

The frequency of membrane regeneration is determined by the decrease in permeate flux rate (primary recovered water stream 703) over time during operation of the primary concentration zone (700) but generally ranges from about 12 hours to about 24 hours, from about 12 hours to about 48 hours, from about 12 hours to about 72 hours, and from about 12 hours to about 100 hours. In one embodiment of the invention, the polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

The invention is further illustrated by the following examples.

EXAMPLES

All experiments were completed using commercially available membranes shown in Table 2 and a M20 cross-flow membrane unit from Alfa Laval. The M20 cross-flow unit allowed screening of multiple flat sheet membranes simultaneously. Sulfopolyester dispersions of 15 wt % and 30 wt % solids were produced in the lab using distilled water. A 1 wt % sulfopolyester dispersion was produced by diluting the higher solids dispersions. A Lauda E630 circulating bath was connected to a heat exchanger to maintain temperature during the experiments.

TABLE 2

| Alfa Laval Membranes Evaluated | | |
|---|---|---|
| Membrane | MWCO[1] | Description |
| ETNA01PP | 1000 | Fluoro Polymer, (hydrophobic) |
| GR95PP | 2000 | Polyethersulphone, (hydrophilic) |
| UFX5pHT | 5000 | Polysulphone, (hydrophilic) |
| GR81PP | 10000 | Polyethersulphone, (hydrophilic) |
| ETNA10PP | 10000 | Fluoro Polymer, (hydrophobic) |
| UFX10pHT | 10000 | Polysulphone, (hydrophilic) |
| GR61PP | 20000 | Polysulphone, (hydrophilic) |
| GR51PP | 50000 | Polysulphone, (hydrophilic) |
| NF99HF | 400 | Polyamide, (hydrophobic) |

[1]Molecular weight cut off

The following procedure was utilized in all of the examples. One set of flat sheet membranes from each type was installed in the M20 resulting in groups of 2-4 membrane sets per experiment. The area for each set of membranes was 0.035 m². New membranes were flushed with deionized water for about 1 hr at 40° C. prior to use. For each set of membranes, flux versus pressure was determined using deionized water. Flux is a measure of rate/unit area expressed as $L/m^2*hr$. All rate experiments were conducted at ~40° C. The pump rate was held at 11 L/min for most of the experiments, and a limited number of experiments were conducted at 18 L/min. Permeate flux vs. pressure was measured using 1 wt %, 15 wt % and 30 wt % sulfopolyester dispersions.

Once the rate experiments were completed, studies to determine the effect of sulfopolyester dispersion concentration on the rate of fouling were conducted. Fouling experiments were conducted as follows: 1) a sulfopolyester dispersion of known concentration was charged to the feed vessel, 2) the experimental conditions were set (pump rate, pressure and temperature), and 3) the M20 cross-flow membrane unit operated on full recycle (permeate and retentate returned to the feed vessel). Periodically, the permeation rate for each membrane was measured and recorded. The duration of the experiments was 24-96 hrs. Once each experiment was completed, the feed vessel was drained, a cleaning cycle was completed to remove fouling, and the water flux was measured to evaluate the cleaning procedure. For many processes utilizing a cross-flow filtration process, a cleaning process that restores performance cycle after cycle is desirable. The manufacturer recommends weak caustic for cleaning the membranes so the initial studies were completed using 0.1 M sodium hydroxide; however, subsequent studies examined Alconox® and Liqui-Nox® detergents manufactured by Alconox Company in New York. Generally, manufacturers suggest cleaning on a daily basis which results in increased downtime for a system, so experiments were completed to examine the frequency that cleaning was needed to maintain performance in order to produce the primary polymer concentrate.

Example 1

Permeate Flux (Primary Recovered Water Stream 703) at 1 wt % Sulfopolyester in Feed Stream (Second Mother Liquor Stream 601)

Figure 11:
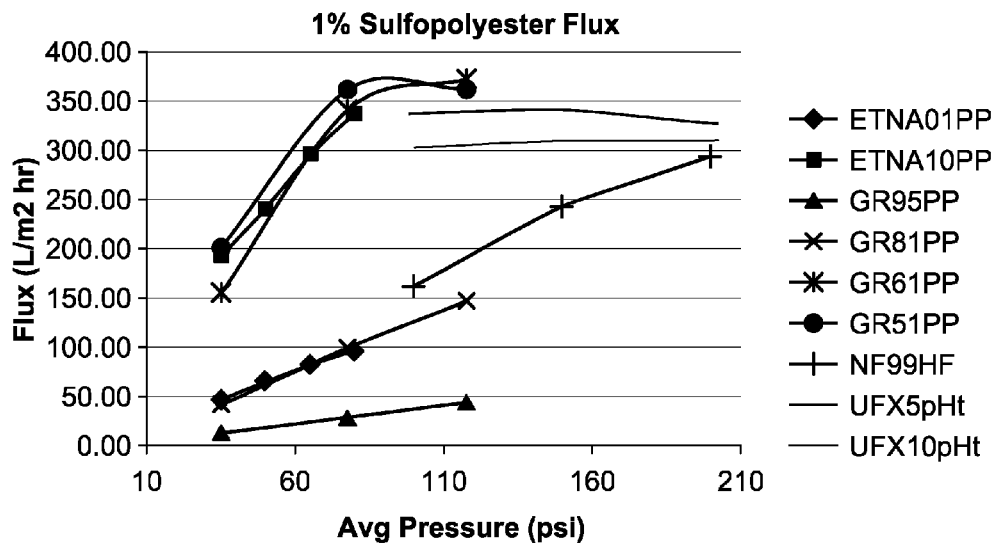
FIGS. 11-14 show the flux (L/m2 hr) for particular ultrafiltration membranes at 1 wt %, 15 wt %, and 30 wt % sulfopolyester concentration in the second mother liquor stream (601).

Flux was determined for each of the membranes listed previously with an 1 wt % sulfopolyester dispersion. Data are illustrated in FIG. 11. All membranes tested were fresh and unused. It is clear to see that ultrafiltration membranes affected the desired separation of permeate. Five of the ultrafiltration membranes exhibited a higher flux at a lower pressure than the control NF99HF nano-filtration membrane.

Example 2

Permeate Flux (Primary Recovered Water Stream 703) at 15 wt % Sulfopolyester in Feed Stream (Second Mother Liquor Stream 601)

Figure 12:
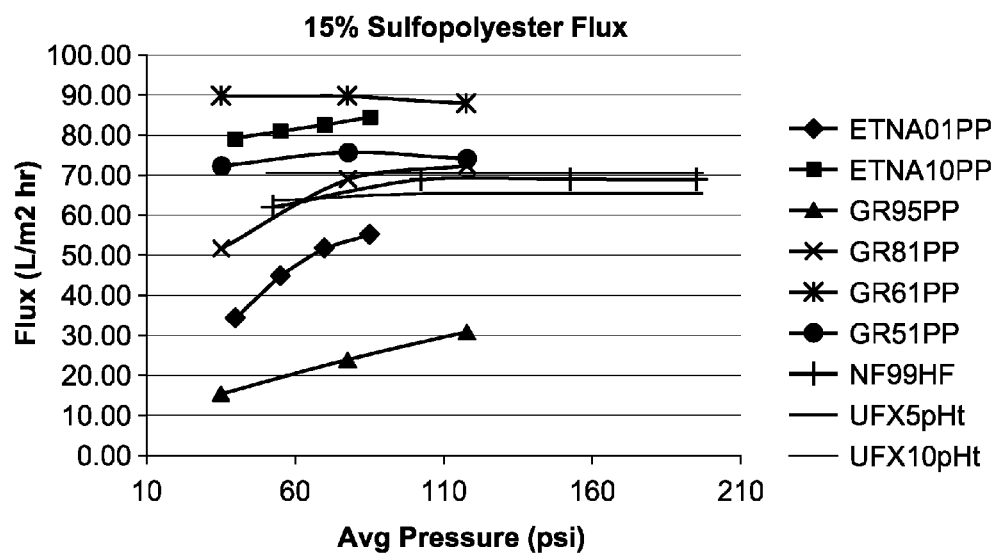

Flux was determined for each of the membranes listed previously with 15 wt % sulfopolyester. Data are illustrated in FIG. 12. It is clear to see that ultrafiltration membranes affected the desired separation of permeate. Five of the ultrafiltration membranes exhibited a higher flux at a lower pressure than the control NF99HF nanofiltration membrane.

Example 3

Permeate Flux (Primary Recovered Water Stream 703) at 30 wt % Sulfopolyester in Feed Stream (Second Mother Liquor Stream 601)

Figure 13:
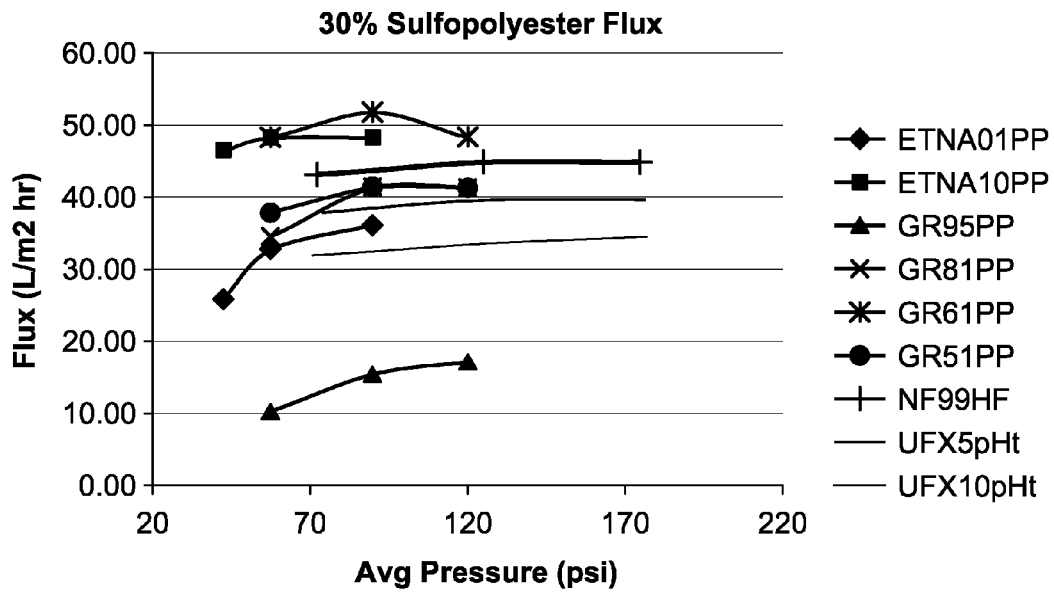

Permeate flux was determined for each of the membranes listed previously with 30 wt % sulfopolyester. Data are illustrated in FIG. 13. It is clear to see that ultrafiltration membranes can affect the desired separation of permeate. Two of the ultrafiltration membranes exhibited a higher flux at a lower pressure than the NF99HF nanofiltration membrane.

Figure 14:
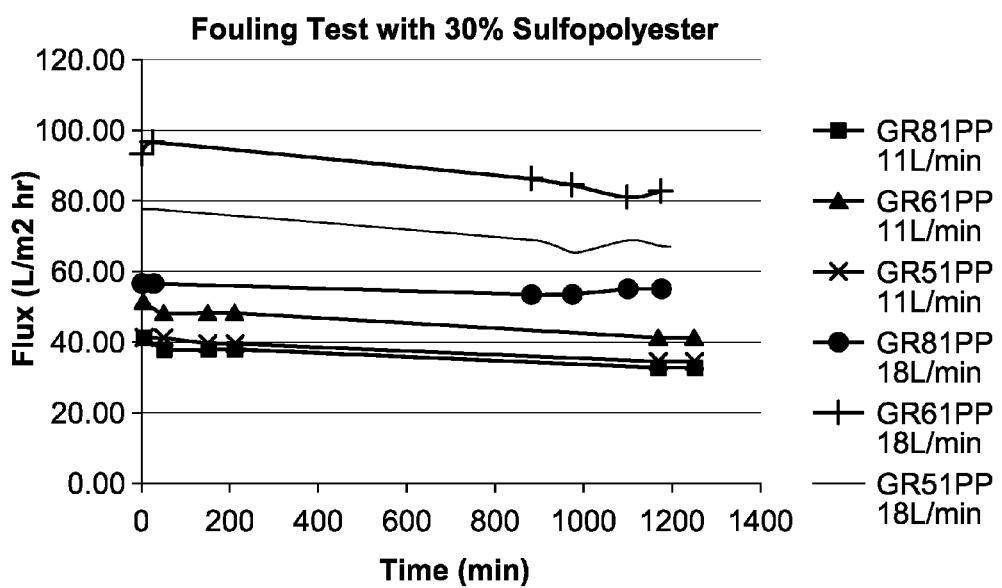
Figure 15:
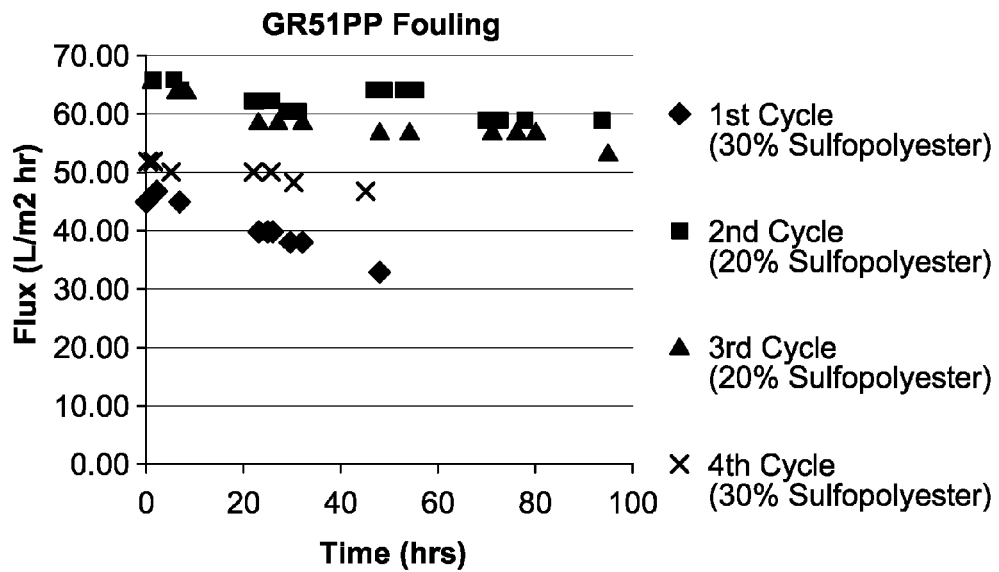
FIGS. 15-18 show fouling studies for particular ultrafiltration membranes.
Figure 16:
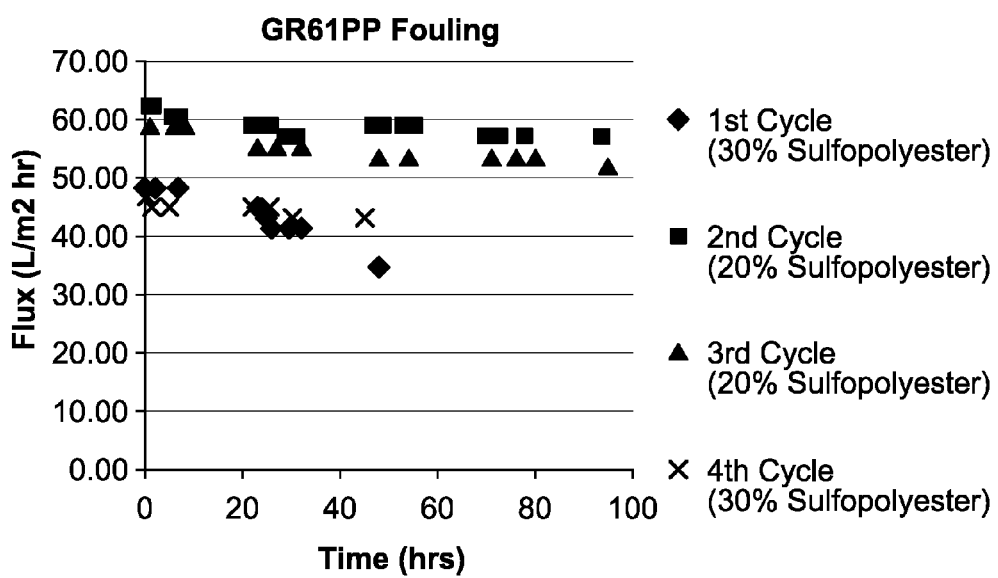
Figure 17:
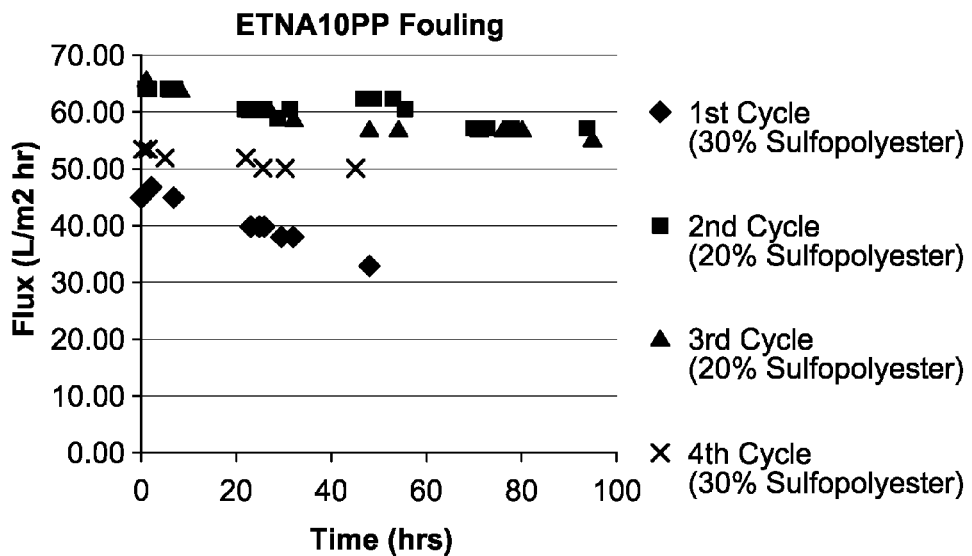
Figure 18:
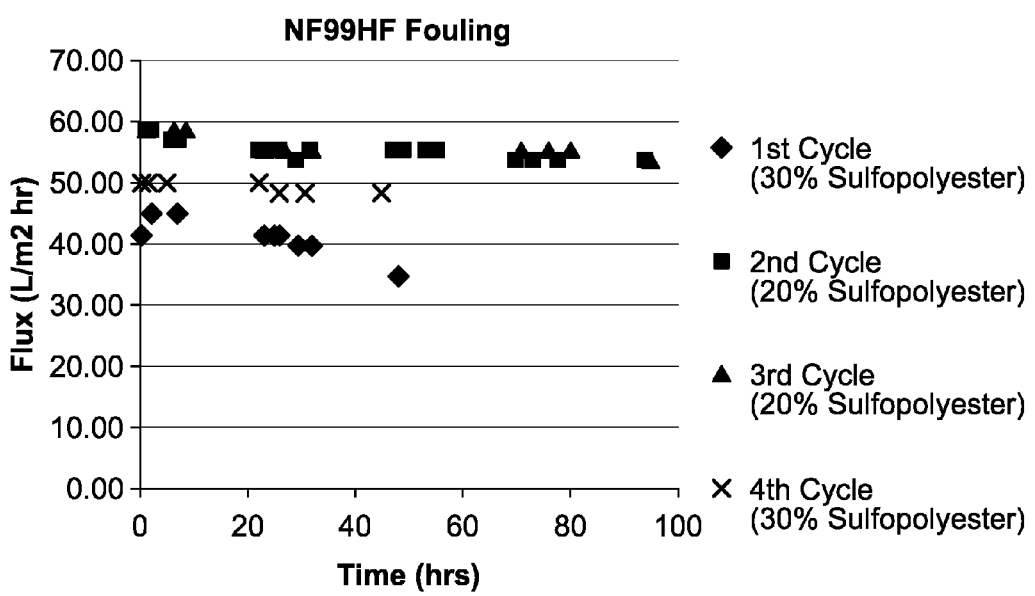

To allow for comparison with the data presented in Examples 1-3, the average pressure for this experiment was ~80 psi. The effect was significant with flux increases of 50% or greater at the higher flow rate (FIG. 14).

Example 4

Determination of Membrane Fouling Rates

Extensive fouling studies were conducted using four membranes selected on the basis of flux performance: GR51 PP, GR61 PP, ETNA10PP, and NF99HF. Multiple fouling cycles were completed for this group of membranes using 20 wt % and 30 wt % sulfopolyester dispersions. Between fouling cycles, a cleaning cycle was conducted, and water flux was compared to results for the new membranes. If the water flux was not within 80-100% of the water flux rate for a new membrane, the cleaning procedure was repeated. Note that fouling cycles were performed at sulfopolyester concentrations of 20 wt % and 30 wt %. All experiments were run at a constant flow rate (11 L/min), temperature (40° C.) and average pressure (40 psi).

Within the group of membranes tested, performance was very similar both in flux and rate of fouling. At a 20 wt % sulfopolyester concentration of the sulfopolyester dispersion (second mother liquor stream (601)), flux dropped about 20% after 96 hours of run time. At a 30% sulfopolyester concentration of the sulfopolyester dispersion (second mother liquor stream (601)), flux dropped about 20% after 48 hours of run time.

Experiment 5

Regeneration of Fouled Membranes

During the initial membrane screening experiments, three detergents were evaluated: 0.1 M sodium hydroxide, 0.1% Alconox® detergent obtained from Alconox Company in New York, and 0.1% Liqui-Nox® detergent also obtained from Alconox Company in New York. 0.1 M sodium hydroxide is the standard membrane wash reagent recommended by Alfa Laval. In addition to the detergents, temperature and rinse time were evaluated. The regeneration or cleaning experiment started with a distilled water flush followed by circulation of the detergent, and then final deionized water flush to remove the detergent. Temperatures as high as 70° C. were evaluated; however, due evidence of possible membrane damage, the cleaning temperature was set at 50° C. After preliminary experiments, Liqui-Nox® was chosen as the detergent. Examination of the membranes following experiments using 0.1 M sodium hydroxide revealed the presence of precipitated material thought to comprise sulfopolyester. This can be a negative outcome because solids can accumulate and irreversibly foul the membrane. It was determined that the standard vendor recommended detergent was not acceptable for cleaning fouled membranes used to concentrate the sulfopolyester dispersion. A dilute solution of Liqui-Nox® detergent for this application was utilized because it performs well and is more easily diluted in water compared to the Alconox® detergent. FIGS. 8-11 show the results of the regeneration experiments conducted during the fouling studies. Following each fouling/cleaning cycle, water flux vs. pressure was determined to evaluate the effectiveness of the regeneration procedure. Within the group of membranes tested, performance was very similar both in flux and rate of fouling. At a 20 wt % sulfopolyester concentration, flux dropped about 20% after 96 hours of run time. At a 30 wt % sulfopolyester concentration, flux dropped about 20% after 48 hours of run time. The volumetric flow rate of the cleaning solution in FIG. 7 contacting the membrane surface is recorded in (l/min) for the cleaning of 0.105 square meters of membrane area.

That which is claimed is:

1. A process for recovering a primary polymer concentrate stream, said process comprising:
    (A) contacting cut multicomponent fibers having a length of less than 25 millimeters with a treated aqueous stream in a fiber slurry zone to produce a cut multicomponent fiber slurry; wherein said cut multicomponent fibers comprise at least one water dispersible sulfopolyester and at least one water non-dispersible synthetic polymer immiscible with said water dispersible sulfopolyester; and wherein said treated aqueous stream is at a temperature of less than 40° C.;
    (B) contacting said cut multicomponent fiber slurry with a heated aqueous stream in a mix zone to produce a heated multicomponent fiber slurry;
    (C) routing said heated multicomponent fiber slurry to a fiber opening zone to remove a portion of said water dispersible sulfopolyester to produce an opened microfiber slurry;
    (D) routing said opened microfiber slurry to a primary solid liquid separation zone to produce said microfiber product stream and a first mother liquor stream; wherein said first mother liquor stream comprises water and said water dispersible sulfopolyester;
    (E) routing at least a portion of said first mother liquor stream to a second solid liquid separation zone to produce a secondary wet cake stream and a second mother liquor stream; wherein said second mother liquor stream comprises water and water dispersible sulfopolyester; and wherein said secondary wet cake stream comprises microfiber; and (F) routing said second mother liquor stream to a primary concentration zone to remove water from said second mother liquor stream to produce said primary polymer concentrate stream; wherein said primary concentration zone comprises at least one ultrafiltration membrane.

2. The process for recovering a primary polymer concentrate stream according to claim 1 further comprising recycling at least a portion of said primary polymer concentrate stream to said primary concentration zone to increase the water-dispersible sulfopolyester concentration of said primary polymer concentrate stream.

3. The process for recovering a primary polymer concentrate stream according to claim 1 further comprising recovering at least a portion of said sulfopolyester from said primary polymer concentrate stream in a secondary concentration zone to produce a melted polymer stream.

4. The process for recovering a primary polymer concentrate stream according to claim 1 further comprising regenerating said at least one ultrafiltration membrane.

5. The process for recovering a primary polymer concentrate stream according to claim 1 wherein said sulfopolyester in said second mother liquor stream ranges from about 0.01 wt. % to about 7 wt. %.

6. The process for recovering a primary polymer concentrate stream according to claim 1 wherein said sulfopolyester in said second mother liquor stream ranges from about 0.5 wt. % to about 10 wt. %.

7. The process for recovering a primary polymer concentrate stream according to claim 1 wherein said primary concentration zone comprises a cross flow filtration device.

8. The process for recovering a primary polymer concentrate stream according to claim 1 wherein said ultrafiltration membrane comprises at least one polymer selected from the group consisting of polysulfone (PS), polyethersulfone (PES), polyamide (PA), fluoro polymer, and cellulosic polymer.

9. The process for recovering a primary polymer concentrate stream according to claim 1 wherein the temperature of said second mother liquor stream ranges from about 10° C. to about 70° C.

10. The process for recovering a primary polymer concentrate stream according to claim 1 wherein said primary concentration zone comprises at least one ultrafiltration membrane followed by at least one nanofiltration membrane.

11. The process for recovering a primary polymer concentrate stream according to claim 1 wherein said ultrafiltration membrane in said primary concentration zone is contained in at least one spiral membrane cartridge.

12. The process for recovering a primary polymer concentrate stream according to claim 1 wherein the weight percent of sulfopolyester in said primary recovered water stream ranges from 0 to about 1 wt. %.

13. The process for recovering a primary polymer concentrate stream according to claim 1 wherein said primary polymer concentrate has a sulfopolyester concentration of at least 2 times that of said second mother liquor stream.

14. The process for recovering a primary polymer concentrate stream according to claim 13 wherein said primary polymer concentrate has a sulfopolyester concentration of at least 5 times that of said second mother liquor stream.

15. The process for recovering a primary polymer concentrate stream according to claim 1 wherein the cross flow filtration in the primary concentration zone is operated in batch or continuous mode.

16. The process for recovering a primary polymer concentrate stream according to claim 1 further comprising regenerating said at least one ultrafiltration membrane, wherein said ultrafiltration membrane is fouled.

17. The process for recovering primary polymer concentrate stream according to claim 16 wherein said regenerating comprises: (1) flushing said ultrafiltration membrane with treated water, (2) circulating an aqueous detergent solution compatible with said ultrafiltration membrane; and 3) flushing said ultrafiltration membrane with treated water to displace the aqueous detergent solution.

18. The process for recovering a primary polymer concentrate stream according to claim 17 wherein said aqueous detergent solution is at least one anionic detergent and water.

19. The process for recovering a primary polymer concentrate stream according to claim 18 wherein the concentration of said anionic detergent in the aqueous detergent solution can range from about 0.1 wt. % to about 5 wt. %.

20. The process for recovering a primary polymer concentrate stream according to claim 18 wherein said anionic detergent comprises alkylbenzene sulfonate having a $C_{10}$-$C_{16}$ alkyl group.

* * * * *